United States Patent
Zong et al.

(10) Patent No.: US 11,930,406 B2
(45) Date of Patent: *Mar. 12, 2024

(54) HANDOVER METHOD AND APPARATUS

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,993

(22) Filed: Jan. 26, 2022

(65) Prior Publication Data

US 2022/0225178 A1    Jul. 14, 2022

Related U.S. Application Data

(63) Continuation of application No. 16/992,880, filed on Aug. 13, 2020, now Pat. No. 11,259,220, which is a (Continued)

(30) Foreign Application Priority Data

Feb. 14, 2018    (CN) .......................... 201810152399.3

(51) Int. Cl.
   *H04W 36/00*    (2009.01)
   *H04W 76/11*    (2018.01)
   *H04W 76/12*    (2018.01)

(52) U.S. Cl.
   CPC ... *H04W 36/0055* (2013.01); *H04W 36/0016* (2013.01); *H04W 76/11* (2018.02); *H04W 76/12* (2018.02)

(58) Field of Classification Search
   CPC . H04W 36/0055; H04W 76/12; H04W 76/11; H04W 36/0016
   (Continued)

(56) References Cited

U.S. PATENT DOCUMENTS 6,636,502 B1    10/2003    Lager et al.
8,537,754 B2    9/2013    Lundin
(Continued)

FOREIGN PATENT DOCUMENTS

CN    107018542 A    8/2017
WO    2015160329 A1    10/2015

OTHER PUBLICATIONS

Huawei, "Pseudo-CR on PGW/SMF address information mapping," 3GPP TSG CT WG4 #80 C4-175146, Oct. 23-27, 2017, 2 pages.
(Continued)

*Primary Examiner* — Nghi H Ly
(74) *Attorney, Agent, or Firm* — Conley Rose, P.C.

(57) ABSTRACT

A handover method and apparatus, where the method includes: determining, by a first control plane function network element, at least one bearer that needs to be established when a protocol data unit (PDU) session of a terminal in a first network is to be switched to a packet data network (PDN) connection in a second network; and obtaining, by the first control plane function network element, tunnel information of the PDN connection, where the tunnel information of the PDN connection includes user plane tunnel information corresponding to each of the at least one bearer.

20 Claims, 26 Drawing Sheets

Related U.S. Application Data continuation of application No. PCT/CN2019/074825, filed on Feb. 12, 2019.

(58) Field of Classification Search
USPC ....... 370/331, 329, 328, 338, 341, 345, 350; 455/436, 442
See application file for complete search history.

(56) References Cited

U.S. PATENT DOCUMENTS

| | | | |
|---|---|---|---|
| 8,743,696 | B2 | 6/2014 | Chowdhury |
| 11,259,220 | B2* | 2/2022 | Zong ................. H04W 36/0016 |
| 2009/0268722 | A1 | 10/2009 | Gallagher et al. |
| 2011/0058479 | A1 | 3/2011 | Chowdhury |
| 2017/0034749 | A1 | 2/2017 | Chandramouli et al. |
| 2018/0020386 | A1 | 1/2018 | Chandramouli et al. |

OTHER PUBLICATIONS

Ericsson, "Allocation of EPS bearer ID in 5GS," 3GPP TSG SA WG2 #122, S2-174196, Jun. 26-30, 2017, 8 pages.

Oppo, "Correction on Indirect Data Forwarding Tunnel Creation from EPS to 5GS Handover", SA WG2 Meeting #123 S2-178705, Nov. 27-Dec. 1, 2017, Reno, USA, 5 pages.

China Mobile et al., "Clarifications for HO procedure from 5GS to EPC with SR UE using N26", SA WG2 Meeting #122bis S2-175483, Aug. 21-25, 2017, Sophia Antipolis, France, 23 pages.

Samsung, "Data forwarding for Inter-system handover from 5GS to EPS", 3GPP TSG-RAN WG3 Meeting #97bis R3-174177, Prague, Czech Republic, Oct. 9-13, 2017, 12 pages.

Huawei, et al., "TS 23.502 Update 5GS to EPS handover procedures," 3GPP TSG-SA WG2 Meeting #125 S2-180507, Jan. 22-26, 2018, Gothenburg, Sweden, 8 pages.

Ericsson, "Handling of Ethernet and unstructured PDU session types when interworking with EPC (23.502)," SA WG2 Meeting #123, S2-177739, Oct. 23-27, 2017, Ljubljana, Slovenia, 9 pages.

NTT Docomo, "Single Registration-based handover from EPS to 5GS procedure," SA WG2 Meeting #121, S2-173317, May 15-19, 2017, Hangzhou, China, 5 pages.

S2-171962 Intel, "23.502: QoS mapping for 5GC-EPC interworking," 3GPP TSG SA WG2 Meeting #120, Mar. 27-31, 2017, Busan, Korea, 11 pages.

S2-174177 ZTE, "Discussion and proposal on the mapping for the 4G to 5G handover," SA WG2 Meeting #122, Jun. 26-30, 2017, Cabo, Mexico, 7 pages.

S2-180794, Huawei, "Update Handover procedures in clause 4.11.1.2," 3GPP TSG-SA WG2 Meeting #125, Gothenburg, Sweden, Jan. 22-26, 2018, 15 pages.

S2-180811, China Mobile, "Clarifications on EPS to 5GS handover procedure using N26," 3GPP TSG-SA WG2 Meeting #125, Gothenburg, Sweden; Jan. 22-26, 2018, 5 pages.

3GPP TS 23.502 V15.0.0, "3rd Generation Partnership Project; Technical Specification Group Services and System Aspects; Procedures for the 5G System; Stage 2 (Release 15)," Dec. 2017, 257 pages.

3GPP TS 23.501 V15.0.0, "3rd Generation Partnership Project; Technical Specification Group Services and System Aspects; System Architecture for the 5G System; Stage 2 (Release 15)," Dec. 2017, 181 pages.

* cited by examiner

300

A first control plane function network element determines at least one bearer that needs to be established when a protocol data unit PDU session of a terminal in a first network is to be switched to a packet data network PDN connection in a second network  ∼S310

The first control plane function network element obtains tunnel information of the PDN connection, where the tunnel information of the PDN connection includes user plane tunnel information corresponding to each of the at least one bearer  ∼S320

FIG. 3

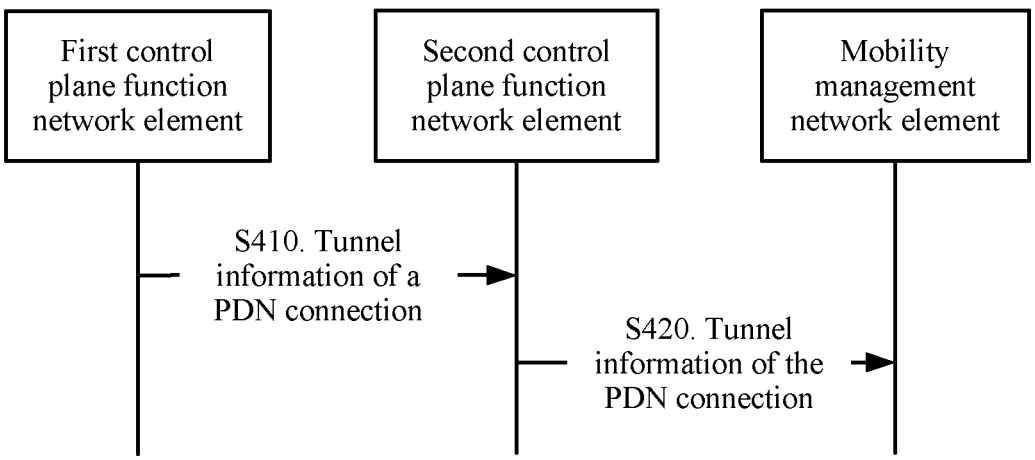

FIG. 4

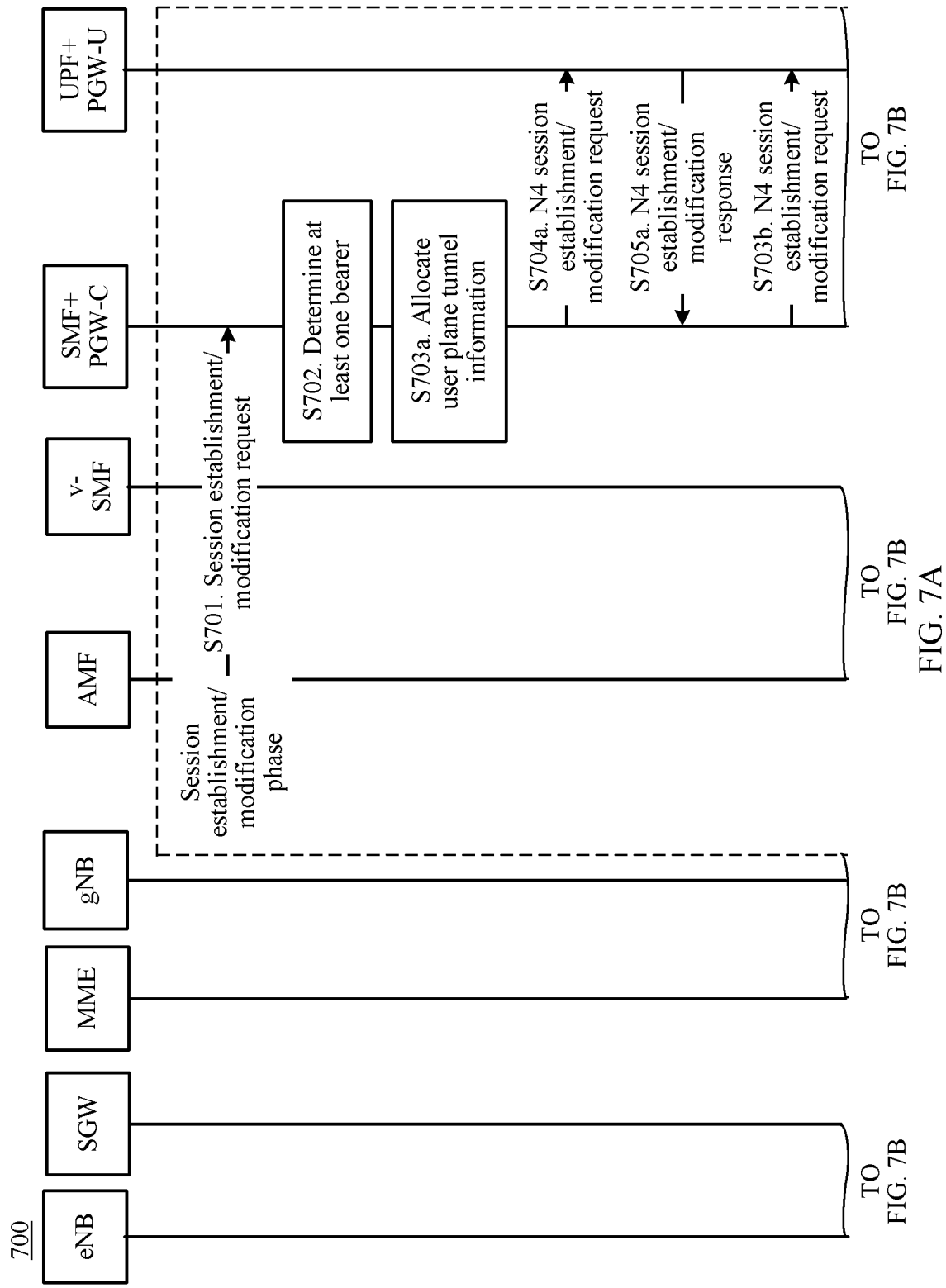

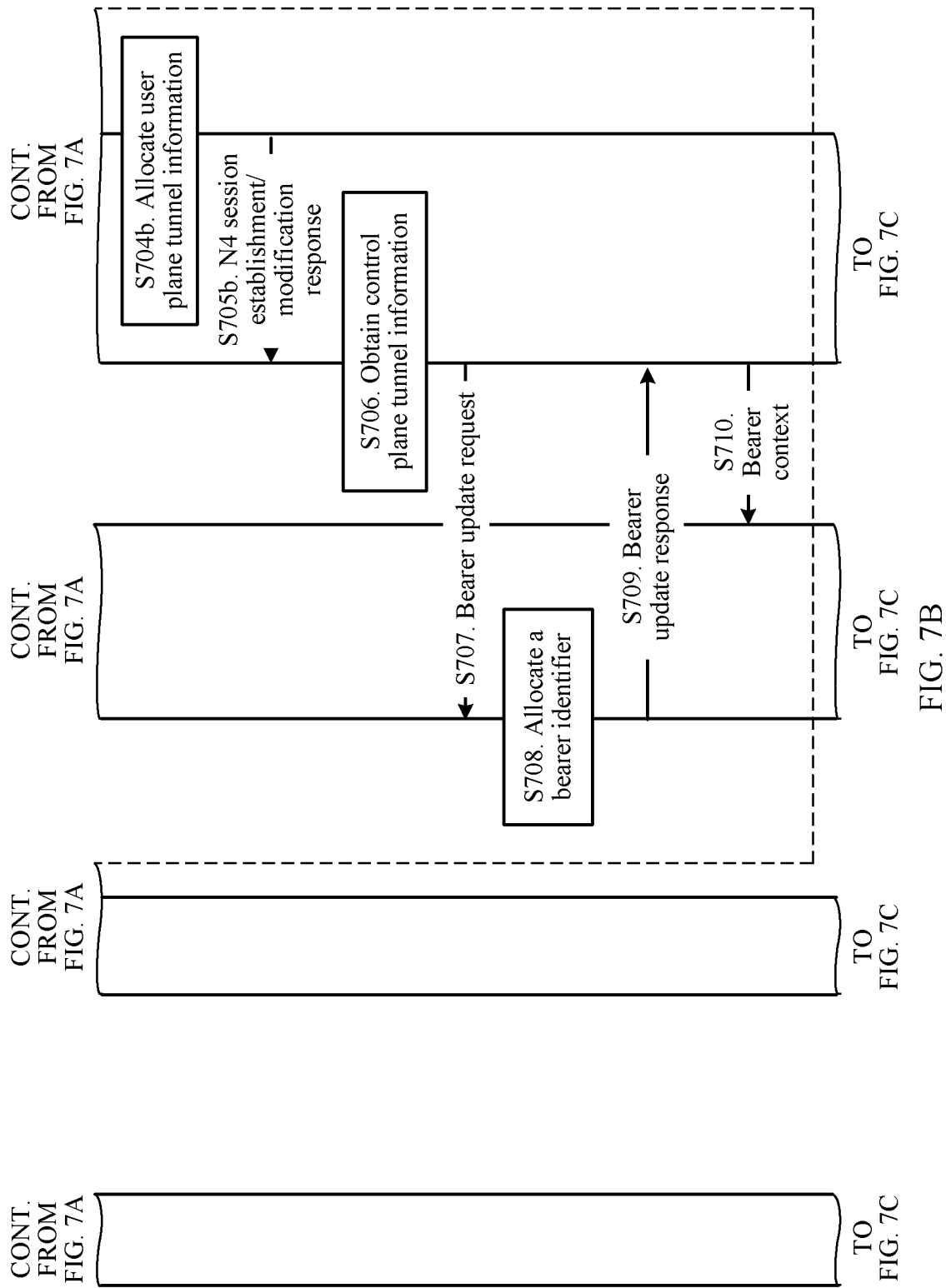

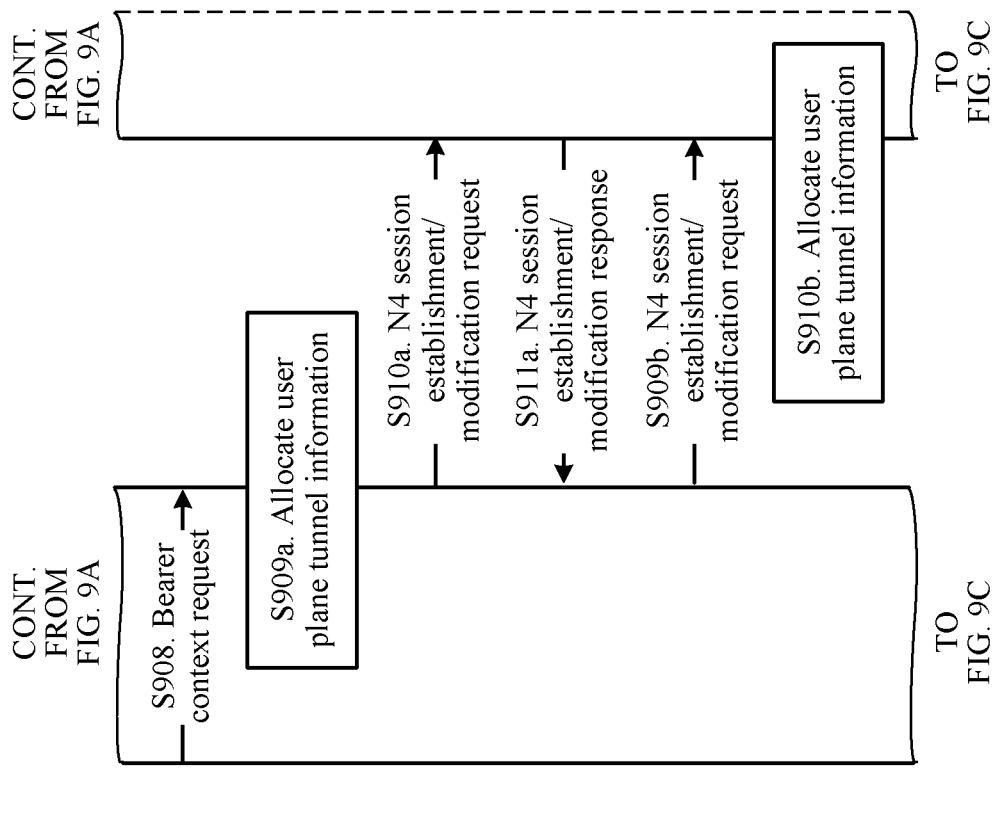
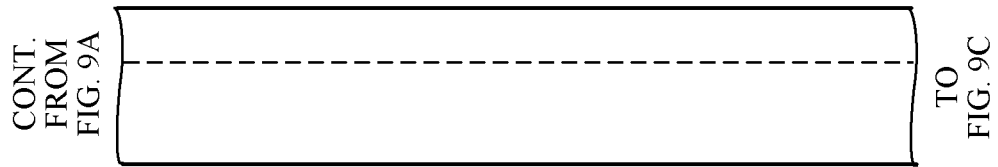
FIG. 9B

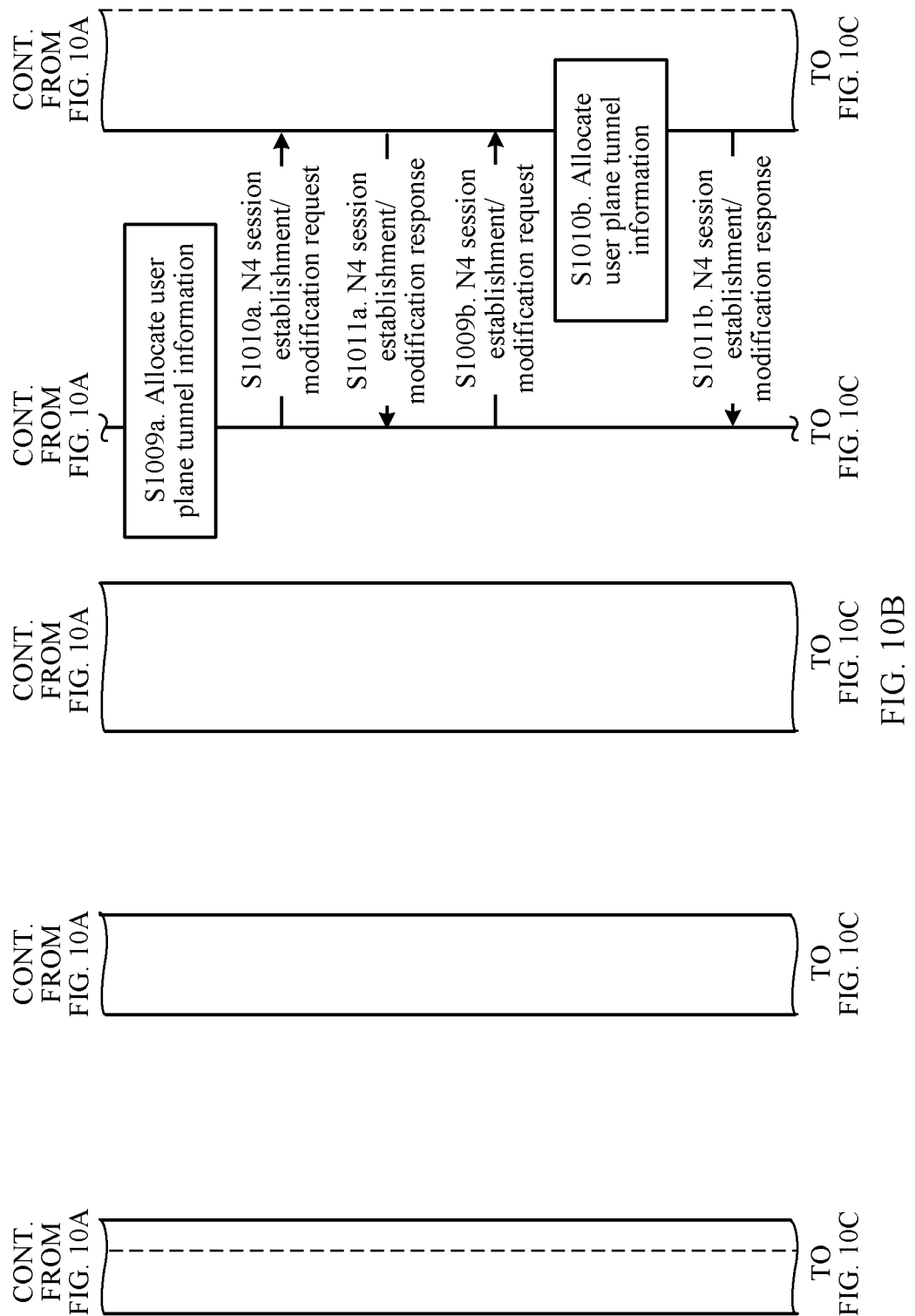

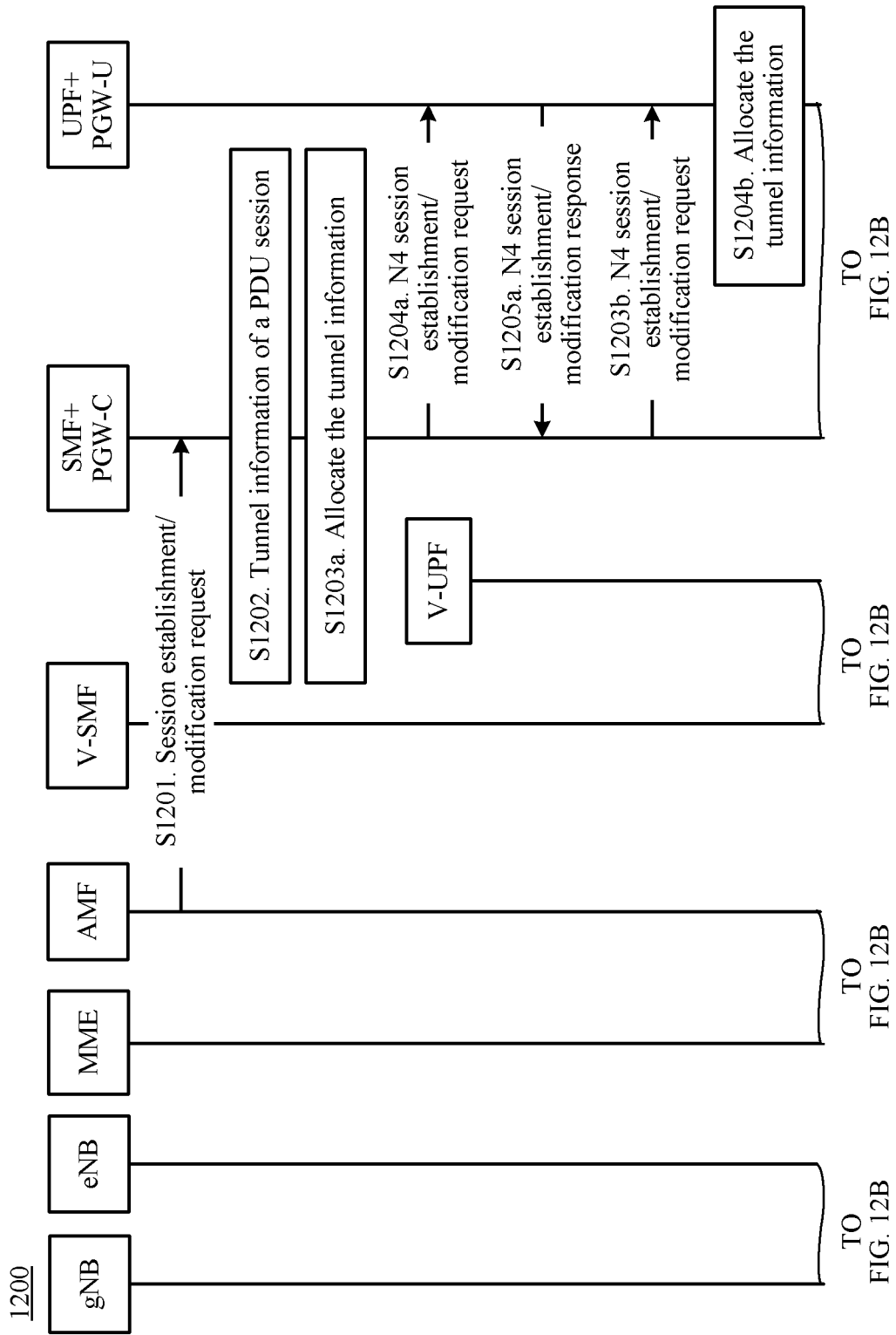

HANDOVER METHOD AND APPARATUS

CROSS-REFERENCE TO RELATED APPLICATIONS

This application is a continuation of U.S. patent application Ser. No. 16/992,880, filed on Aug. 13, 2020, which is a continuation of International Patent Application No. PCT/CN2019/074825, filed on Feb. 12, 2019, which claims priority to Chinese Patent Application No. 201810152399.3, filed on Feb. 14, 2018. All of the aforementioned patent applications are hereby incorporated by reference in their entireties.

TECHNICAL FIELD

This application relates to the communications field, and more specifically, to a handover method and apparatus in the communications field.

BACKGROUND

With rapid development of wireless communications technologies, a fifth generation (5G) mobile communications technology emerges. In an initial stage of network deployment, due to insufficient coverage of a 5G network, when a location of a user equipment (UE) changes, the UE needs to be handed over between the 5G network and a fourth generation (4G) network.

In the 4G network, one packet data network (PDN) connection corresponds to one or more bearers. Each bearer includes one or more data flows. A system establishes a corresponding tunnel for each bearer corresponding to the PDN connection. In a handover preparation process, a source mobility management entity (MME) sends tunnel information of each bearer corresponding to the PDN connection to a target MME, and establishes, for each bearer, an uplink tunnel from a target access network to a packet data network (PDN) gateway user plane function (PGW-U).

One protocol data unit (PDU) session in the 5G network is equivalent to one PDN connection in the 4G network. One PDU session includes one or more data flows, and all the data flows in the PDU session share one tunnel.

In the 5G network, one tunnel is used for one PDU session, whereas in the 4G network, one tunnel is required for each bearer of one PDN connection. Therefore, when the UE is handed over from the 5G network to the 4G network, there is a problem of how to map one tunnel to a plurality of tunnels. Similarly, when the UE is handed over from the 4G network to the 5G network, there is a problem of how to map a plurality of tunnels to one tunnel.

Therefore, when the UE is handed over between the 4G network and the 5G network, data may fail to be normally received and processed, and consequently, the data is lost.

SUMMARY

This application provides a handover method and apparatus, such that a data loss in a network handover process can be prevented, thereby ensuring normal data transmission.

According to a first aspect, this application provides a handover method. The method includes: determining, by a first control plane function network element, at least one bearer that needs to be established when a protocol data unit (PDU) session of a terminal in a first network is to be switched to a packet data network (PDN) connection in a second network; and obtaining, by the first control plane function network element, tunnel information of the PDN connection, where the tunnel information of the PDN connection includes user plane tunnel information corresponding to each of the at least one bearer.

According to the handover method provided in this embodiment of this application, the first control plane function network element determines the at least one bearer that needs to be established when the PDU session of the terminal in the first network is to be switched to the PDN connection in the second network, and obtains the user plane tunnel information corresponding to each of the at least one bearer. As such, the first control plane function network element establishes a user plane tunnel corresponding to a bearer in the PDN connection when the PDU session is to be switched to the PDN connection. This helps prevent a loss of a data packet in the bearer included in the PDN connection in a network handover process, thereby ensuring normal transmission of the data packet.

It should be understood that, the first network may include a 5G network, and the second network may include a 4G network. It should be further understood that, the PDU session in the first network is equivalent to the PDN connection in the second network.

It should be understood that, the first control plane function network element may be, for example, a session management function (SMF) plus packet data network gateway (PGW) control plane (SMF-PGW-C).

Optionally, the user plane tunnel information corresponding to each bearer may include a tunnel identifier of a user plane tunnel corresponding to the bearer and other information about the user plane tunnel, such as an Internet Protocol (IP) address corresponding to the tunnel. This is not limited in this embodiment of this application.

Optionally, the first control plane function network element may determine, in a plurality of cases, that the PDU session in the first network needs to be established or modified. This is not limited in this embodiment of this application.

In a possible implementation, the first control plane function network element may receive a first request message from an access and mobility management function (AMF), where the first request message is used to request to establish the PDU session in the first network, and the PDU session includes at least one data flow. Additionally, the first control plane function network element determines, based on the first request message, that the PDU session in the first network needs to be established.

In another possible implementation, the first control plane function network element may receive a second request message from another network element, where the second request message is used to trigger the first control plane function network element to modify the PDU session in the first network. For example, the second request message is used to trigger the first control plane function network element to add at least one data flow to the PDU session.

In still another possible implementation, the first control plane function network element may be triggered, by a process of the first control plane function network element, to modify the PDU session in the first network.

Optionally, the first control plane function network element may determine the at least one bearer based on the at least one data flow and an allocation policy.

Optionally, the at least one data flow may be, for example, a quality of service (QoS) flow. A QoS flow may be a guaranteed bit rate (GBR) QoS flow or a non-GBR QoS flow.

Optionally, the allocation policy may be pre-configured, or may be indicated by another network element using indication information. This is not limited in this embodiment of this application.

With reference to the first aspect, in some possible implementations, the obtaining, by the first control plane function network element, tunnel information of the PDN connection, where the tunnel information of the PDN connection includes user plane tunnel information corresponding to each of the at least one bearer includes: allocating, by the first control plane function network element, the corresponding user plane tunnel information to each of the at least one bearer; or requesting, by the first control plane function network element, a user plane function network element corresponding to the PDU session to allocate user plane tunnel information corresponding to each bearer, and obtaining the user plane tunnel information corresponding to each bearer from the user plane function network element corresponding to the PDU session.

Optionally, the first control plane function network element may obtain, in a plurality of manners, the user plane tunnel information corresponding to each of the at least one bearer. This is not limited in this embodiment of this application.

In a possible implementation, the first control plane function network element itself may allocate the user plane tunnel information to each of the at least one bearer.

In another possible implementation, the first control plane function network element may request the user plane function network element corresponding to the PDU session to allocate user plane tunnel information to each of the at least one bearer, and obtain the user plane tunnel information corresponding to each bearer from the user plane function network element corresponding to the PDU session.

With reference to the first aspect, in some possible implementations, the tunnel information of the PDN connection further includes control plane tunnel information corresponding to the PDN connection. Additionally, the obtaining, by the first control plane function network element, tunnel information of the PDN connection further includes obtaining, by the first control plane function network element, the control plane tunnel information corresponding to the PDN connection.

Optionally, the control plane tunnel information corresponding to the PDN connection may include a tunnel identifier of a control plane tunnel corresponding to the PDN connection and other information about the control plane tunnel, such as an IP address corresponding to the control plane tunnel. This is not limited in this embodiment of this application.

According to the handover method provided in this embodiment of this application, the tunnel information corresponding to the PDN connection further includes the control plane tunnel information corresponding to the PDN connection, such that the first control plane function network element establishes the control plane tunnel corresponding to the PDN connection corresponding to the PDU session. This helps prevent a loss of control signaling of the PDN connection in the network handover process, thereby ensuring normal transmission of the control signaling.

With reference to the first aspect, in some possible implementations, the method further includes sending, by the first control plane function network element, a first session management request to the user plane function network element corresponding to the PDU session. The first session management request is used to request to establish or modify a user plane tunnel corresponding to each of the at least one bearer, the first session management request carries an uplink data transmission rule, and the uplink data transmission rule is used to indicate the user plane function network element corresponding to the PDU session how to forward uplink data that is received through the user plane tunnel corresponding to the PDN connection.

Optionally, when the first control plane network element itself allocates the user plane tunnel information to each of the at least one bearer, the first control plane function network element may add the user plane tunnel information corresponding to each of the at least one bearer to the first session management request. Additionally, when the first control plane function network element requests the user plane function network element corresponding to the PDU session to allocate user plane tunnel information to each of the at least one bearer, the user plane function network element corresponding to the PDU session may add user plane tunnel information corresponding to each of the at least one bearer to a first session management response.

It should be noted that, after learning of the user plane tunnel information corresponding to each of the at least one bearer and an uplink data transmission rule corresponding to the bearer, the user plane function network element corresponding to the PDU session may establish an uplink user plane tunnel of the bearer on the user plane function network element corresponding to the PDU session.

With reference to the first aspect, in some possible implementations, the method further includes obtaining, by the first control plane function network element, a bearer identifier corresponding to each of the at least one bearer.

With reference to the first aspect, in some possible implementations, the obtaining a bearer identifier corresponding to each of the at least one bearer includes: sending, by the first control plane function network element, a bearer identifier request to a mobility management network element using a second control plane function network element, where the bearer identifier request is used to request to allocate a bearer identifier to each of the at least one bearer, the second control plane function network element is a visited control plane network element corresponding to the PDU session, and the first control plane function network element is a home control plane network element corresponding to the PDU session; and receiving, by the first control plane function network element, the bearer identifier corresponding to each of the at least one bearer from the mobility management network element using the second control plane function network element.

In a possible implementation, the first control plane function network element may send the bearer identifier request to the mobility management network element, where the bearer identifier request is used to allocate a bearer identifier to each of the at least one bearer. Correspondingly, the mobility management network element receives the bearer identifier request from the first control plane function network element, allocates a bearer identifier to each bearer based on the bearer identifier request, and sends the bearer identifier corresponding to each of the at least one bearer to the first control plane function network element.

It should be noted that, the first control plane function network element may store, into a bearer context corresponding to the PDN connection, the user plane tunnel information corresponding to each of the at least one bearer, the bearer identifier corresponding to each bearer, and the control plane tunnel information corresponding to the PDN connection that are obtained, and send the bearer context to the mobility management network element during handover preparation.

Correspondingly, the mobility management network element may establish, based on the bearer context corresponding to the PDN connection, an uplink tunnel from a serving gateway (SGW) in the second network to the user plane function network element corresponding to the PDU session.

In a possible implementation, the first control plane function network element sends the bearer identifier request to the mobility management network element using the second control plane function network element, where the bearer identifier request is used to request to allocate a bearer identifier to each of the at least one bearer. Additionally, the first control plane function network element receives the bearer identifier corresponding to each of the at least one bearer from the mobility management network element using the second control plane function network element.

It should be noted that, after obtaining the user plane tunnel information corresponding to each of the at least one bearer, the bearer identifier corresponding to each bearer, and the control plane tunnel information corresponding to the PDN connection, the first control plane function network element may send the user plane tunnel information corresponding to each of the at least one bearer, the bearer identifier corresponding to each bearer, and the control plane tunnel information corresponding to the PDN connection to the second control plane function network element during establishment/modification of the PDU session.

Correspondingly, the second control plane function network element may store, into the bearer context of the PDN connection, the user plane tunnel information corresponding to each of the at least one bearer, the bearer identifier corresponding to each bearer, and the control plane tunnel information corresponding to the PDN connection that are obtained from the first control plane function network element.

In another possible implementation, the first control plane function network element may send the tunnel information of the PDN connection to the second control plane function network element, and obtain the bearer identifier corresponding to each of the at least one bearer from the second control plane function network element. Correspondingly, the second control plane function network element may store the bearer identifier corresponding to each of the at least one bearer.

In other words, the first control plane function network element sends the tunnel information of the PDN connection to the second control plane function network element. Additionally, the second control plane function network element determines, based on the tunnel information of the PDN connection, whether the mobility management network element needs to be requested to allocate a bearer identifier to each of the at least one bearer, and sends the bearer identifier request to the mobility management network element when the mobility management network element needs to be requested to allocate a bearer identifier to each of the at least one bearer.

For example, the first control plane function network element first checks whether a bearer identifier associated with the user plane tunnel information corresponding to each bearer exists in the obtained tunnel information of the PDN connection, and if no bearer identifiers are allocated to some of the at least one bearer, the first control plane function network element requests the mobility management network element to allocate bearer identifiers to the bearers.

It should be noted that, the second control plane function network element may store, into the bearer context of the PDN connection, the user plane tunnel information corresponding to each of the at least one bearer, the bearer identifier corresponding to each bearer, and the control plane tunnel information corresponding to the PDN connection.

Because the bearer context corresponding to the PDN connection stored by the second control plane function network element includes the user plane tunnel information corresponding to each of the at least one bearer, the bearer identifier corresponding to each bearer, and the control plane tunnel information corresponding to the PDN connection, the mobility management network element may obtain the bearer context corresponding to the PDN connection from the second control plane function network element during handover preparation, and establish, based on the bearer context corresponding to the PDN connection, the uplink tunnel from the serving gateway (SGW) in the second network to the user plane function network element corresponding to the PDU session.

According to the handover method provided in this embodiment of this application, because the second control plane function network element is a visited control plane network element corresponding to the PDU session, compared with obtaining the bearer context corresponding to the PDN connection from the first control plane function network element, obtaining, by the mobility management network element, the bearer context corresponding to the PDN connection from the second control plane function network element can reduce a delay generated in the handover process.

With reference to the first aspect, in some possible implementations, the method further includes sending, by the first control plane function network element, the tunnel information of the PDN connection and the bearer identifier corresponding to each of the at least one bearer to the second control plane function network element.

With reference to the first aspect, in some possible implementations, the method further includes: sending, by the first control plane function network element, the tunnel information of the PDN connection to a second control plane function network element, where the second control plane function network element is a visited control plane network element corresponding to the PDU session, and the first control plane function network element is a home control plane network element corresponding to the PDU session; and receiving, by the first control plane function network element, the bearer identifier corresponding to each of the at least one bearer from the second control plane function network element.

According to the handover method provided in this embodiment of this application, the bearer context corresponding to the PDN connection stored by the second control plane function network element includes the tunnel information of the PDN connection and the bearer identifier corresponding to each of the at least one bearer, such that the mobility management network element may directly obtain the bearer context corresponding to the PDN connection from the second control plane function network element during handover preparation, and establish, based on the bearer context corresponding to the PDN connection, the uplink tunnel from the SGW in the second network to the user plane function network element corresponding to the PDU.

With reference to the first aspect, in some possible implementations, the obtaining, by the first control plane function network element, tunnel information of the PDN connection includes obtaining, by the first control plane function network element, the tunnel information of the PDN connection when determining that the PDU session of the terminal needs to be established in the first network or the PDU session in the first network needs to be modified.

Optionally, the first control plane function network element may obtain the tunnel information of the PDN connection during session establishment/modification. Alternatively, the first control plane function network element may obtain the tunnel information of the PDN connection during handover preparation.

According to the handover method provided in this embodiment of this application, the first control plane function network element obtains the tunnel information of the PDN connection during establishment or modification of the PDU session or during handover preparation. As such, the first control plane function network element establishes, before handover execution, the user plane tunnel corresponding to the bearer in the PDN connection and the control plane tunnel corresponding to the PDN connection, thereby reducing a delay in the handover process.

With reference to the first aspect, in some possible implementations, the method further includes sending, by the first control plane function network element to the user plane function network element corresponding to the PDU session, a downlink data transmission rule corresponding to the PDN connection, where the downlink data transmission rule is used to indicate the user plane function network element corresponding to the PDU session to forward received downlink data through a corresponding user plane tunnel.

Optionally, the first control plane function network element may send, to the user plane function network element corresponding to the PDU session, the downlink data transmission rule corresponding to the PDN connection, where the downlink data transmission rule is used to indicate the user plane function network element corresponding to the PDU session to forward received downlink data through a corresponding user plane tunnel.

In a possible implementation, the first control plane function network element may send a third session management request to the user plane function network element corresponding to the PDU session during handover execution, where the third session management request is used to request to establish or modify a downlink user plane tunnel corresponding to each of the at least one bearer, and the third session management request carries the downlink data transmission rule.

In another possible implementation, the first control plane function network element may add the downlink data transmission rule and first rule indication information to the first session management request during PDU session request/modification, where the first rule indication information is used to indicate not to enable the downlink data transmission rule. Correspondingly, the first control plane function network element sends a third session management request to the user plane function network element corresponding to the PDU session during handover execution, where the third session management request carries second rule indication information, and the second rule indication information is used to indicate to enable the downlink data transmission rule.

According to the handover method provided in this embodiment of this application, the first control plane function network element indicates the downlink data transmission rule to the user plane function network element corresponding to the PDU session in a handover execution phase. As such, the user plane function network element corresponding to the PDU session matches received downlink data to a corresponding downlink tunnel according to the downlink data transmission rule, and sends the received downlink data to the serving gateway in the second network through the downlink tunnel.

According to a second aspect, this application provides a handover method. The method includes: receiving, by a second control plane function network element from a first control plane function network element, tunnel information of a PDN connection from a first control plane function network element, where the tunnel information of the PDN connection includes user plane tunnel information corresponding to each of at least one bearer, the second control plane function network element is a visited control plane network element corresponding to the PDN connection, and the first control plane function network element is a home control plane network element corresponding to the PDN connection; and sending, by the second control plane function network element, the tunnel information of the PDN connection to a mobility management network element.

According to the handover method provided in this embodiment of this application, a bearer context corresponding to the PDN connection stored by the second control plane function network element includes the tunnel information of the PDN connection and a bearer identifier corresponding to each of the at least one bearer. As such, the mobility management network element may directly obtain the bearer context corresponding to the PDN connection from the second control plane function network element during handover preparation, and establish, based on the bearer context corresponding to the PDN connection, an uplink tunnel from a serving gateway (SGW) in the second network to a user plane function network element corresponding to the PDU.

In addition, because the second control plane function network element is a visited control plane network element corresponding to the PDU session, compared with obtaining the bearer context corresponding to the PDN connection from the first control plane function network element, obtaining, by the mobility management network element, the bearer context corresponding to the PDN connection from the second control plane function network element can reduce a delay generated in a handover process.

It should be understood that, the first control plane function network element may be, for example, an SMF-PGW-C, and the second control plane function network element may be, for example, a v-SMF.

With reference to the second aspect, in some possible implementations, the tunnel information of the PDN connection further includes control plane tunnel information corresponding to the PDN connection.

According to the handover method provided in this embodiment of this application, the tunnel information corresponding to the PDN connection further includes the control plane tunnel information corresponding to the PDN connection, such that the first control plane function network element establishes a control plane tunnel corresponding to the PDN connection corresponding to the PDU session. This helps prevent a loss of control signaling of the PDN connection in a network handover process, thereby ensuring normal transmission of the control signaling.

With reference to the second aspect, in some possible implementations, the method further includes: forwarding, by the second control plane function network element to the mobility management network element, a bearer identifier request that is sent by the first control plane function network element to the mobility management network element, where the bearer identifier request is used to request to allocate a bearer identifier to each of the at least one bearer; and forwarding, by the second control plane function network element to the first control plane function network element, the bearer identifier that corresponds to each of the at least one bearer and that is sent by the mobility management network element to the first control plane function network element.

In other words, the second control plane function network element has a function of transparently transmitting a message transmitted between the first control plane function network element and the user plane function network element corresponding to the PDU session.

With reference to the second aspect, in some possible implementations, the method further includes receiving, by the second control plane function network element, the bearer identifier corresponding to each of the at least one bearer from the first control plane function network element.

With reference to the second aspect, in some possible implementations, the method further includes: sending, by the second control plane function network element, a bearer identifier request to the mobility management network element based on the tunnel information of the PDN connection, where the bearer identifier request is used to request to allocate a bearer identifier to each of the at least one bearer; and receiving, by the second control plane function network element, the bearer identifier corresponding to each of the at least one bearer from the mobility management network element.

For example, the second control plane network element may check whether a bearer identifier associated with the user plane tunnel information corresponding to each bearer exists in the tunnel information of the PDN connection, and if no bearer identifier is allocated to the at least one bearer, the second control plane function network element requests the mobility management network element to allocate the bearer identifier to each of the at least one bearer to which no bearer identifier is allocated.

In other words, the second control plane function network element may have a processing function.

With reference to the second aspect, in some possible implementations, the method further includes: storing, by the second control plane function network element, the bearer identifier corresponding to each of the at least one bearer; and sending the bearer identifier corresponding to each of the at least one bearer to the first control plane function network element.

According to a third aspect, this application provides a handover method. The method includes: determining, by a first control plane function network element, that a PDN connection of a terminal in a second network needs to be switched to a PDU session in a first network; and obtaining, by the first control plane function network element, user plane tunnel information corresponding to the PDU session.

According to the handover method provided in this embodiment of this application, the first control plane function network element determines that the PDN connection of the terminal in the second network needs to be switched to the PDU session in the first network, and obtains the user plane tunnel information corresponding to the PDU session. As such, the first control plane function network element establishes a user plane tunnel corresponding to the PDU session when the PDN connection is to be switched to the PDU session. This helps prevent a loss of a data packet in the PDU session in a network handover process, thereby ensuring normal transmission of the data packet.

It should be understood that, the first control plane function network element may be, for example, an SMF-PGW-C.

It should be further understood that, the PDU session in the first network is equivalent to the PDN connection in the second network.

In a possible implementation, the first control plane function network element may receive a third request message, where the third request message is used to request to establish the PDN connection in the second network. Additionally, the first control plane function network element determines, based on the third request message, that the PDN connection of the terminal in the second network needs to be switched to the PDU session in the first network.

In a possible implementation, the first control plane function network element may receive a second session management request, where the second session management request carries first indication information, and the first indication information is used to indicate to prepare for handing over the terminal from the second network to the first network. Additionally, the first control plane function network element may determine, based on the first indication information, that the PDN connection in the second network needs to be switched to the PDU session in the first network.

With reference to the third aspect, in some possible implementations, the obtaining, by the first control plane function network element, user plane tunnel information corresponding to the PDU session includes: allocating, by the first control plane function network element to the PDU session, the user plane tunnel information corresponding to the PDU session; or requesting, by the first control plane function network element, a user plane function network element corresponding to the PDN connection to allocate user plane tunnel information corresponding to the PDU session, and obtaining the user plane tunnel information that corresponds to the PDU session from the user plane function network element corresponding to the PDN connection.

Optionally, the first control plane function network element may obtain, in a plurality of manners, the user plane tunnel information corresponding to the PDU session. This is not limited in this embodiment of this application.

In a possible implementation, the first control plane function network element itself may allocate, to the PDU session, the user plane tunnel information corresponding to the PDU session.

In another possible implementation, the first control plane function network element requests the user plane function network element corresponding to the PDN connection to allocate user plane tunnel information corresponding to the PDU session, and obtains the user plane tunnel information that corresponds to the PDU session from the user plane function network element corresponding to the PDN connection.

With reference to the third aspect, in some possible implementations, the method further includes sending, by the first control plane function network element, a first session management request to the user plane function network element corresponding to the PDN connection, where the first session management request is used to request to establish or modify a user plane tunnel corresponding to the PDU session, the first session management request carries an uplink data transmission rule, and the uplink data transmission rule is used to indicate the user plane function network element corresponding to the PDN connection how to forward uplink data that is received through the user plane tunnel corresponding to the PDU session.

Optionally, when the first control plane network element itself allocates the user plane tunnel information to the PDU session, the first control plane function network element may add the user plane tunnel information corresponding to the PDU session to the first session management request. When the first control plane function network element requests the user plane function network element corresponding to the PDN connection to allocate user plane tunnel information to the PDU session, the user plane function network element corresponding to the PDN connection may add the user plane tunnel information corresponding to the PDU session to a first session management response.

Optionally, during session modification, the PDN connection in the second network may be updated, for example, some bearers are newly established. Therefore, the user plane function network element corresponding to the PDN connection needs to know an updated uplink data transmission rule, in order to associate data flows corresponding to these bearers with the user plane tunnel corresponding to the PDU session.

With reference to the third aspect, in some possible implementations, the method further includes: when determining that the uplink data transmission rule changes, sending, by the first control plane function network element, an updated uplink data transmission rule to the user plane function network element corresponding to the PDN connection.

Optionally, when the first control plane function network element itself allocates the user plane tunnel information to the PDU session, the first control plane function network element may obtain the user plane tunnel information corresponding to the PDU session, and send, to the user plane function network element corresponding to the PDN connection, the user plane tunnel information corresponding to the PDU session in a same phase; or obtain the user plane tunnel information corresponding to the PDU session, and send, to the user plane function network element corresponding to the PDN connection, the user plane tunnel information corresponding to the PDU session in different phases. This is not limited in this embodiment of this application.

In a possible implementation, the first control plane function network element may obtain the user plane tunnel information corresponding to the PDU session and the uplink data transmission rule during session establishment/modification, and send the user plane tunnel information corresponding to the PDU session and the uplink data transmission rule to the user plane function network element corresponding to the PDN connection during session establishment/modification.

In another possible implementation, the first control plane function network element may obtain the user plane tunnel information corresponding to the PDU session and the uplink data transmission rule during network handover preparation, and send the user plane tunnel information corresponding to the PDU session and the uplink data transmission rule to the user plane function network element corresponding to the PDN connection during network handover preparation.

In still another possible implementation, the first control plane function network element may obtain the user plane tunnel information corresponding to the PDU session and the uplink data transmission rule during session establishment/modification, and send the user plane tunnel information corresponding to the PDU session and the uplink data transmission rule to the user plane function network element corresponding to the PDN connection during network handover preparation.

According to the handover method provided in this embodiment of this application, in a handover preparation phase, the first control plane function network element determines the user plane tunnel information corresponding to the PDU session, and sends, to the user plane function network element corresponding to the PDN connection, the user plane tunnel information corresponding to the PDU session. As such, an update of the uplink data transmission rule due to a bearer newly added during session establishment/modification can be prevented.

With reference to the third aspect, in some possible implementations, before the sending, by the first control plane function network element, a first session management request to the user plane function network element corresponding to the PDN connection, the method further includes receiving, by the first control plane function network element, a second session management request, where the second session management request carries first indication information, and the first indication information is used to indicate to prepare for handing over the terminal from the second network to the first network.

With reference to the third aspect, in some possible implementations, the method further includes sending, by the first control plane function network element to the user plane function network element corresponding to the PDN connection, a downlink data transmission rule corresponding to the PDU session, where the downlink data transmission rule is used to indicate to send, through the user plane tunnel corresponding to the PDU session, a downlink data packet received by the user plane function network element corresponding to the PDN connection.

In a possible implementation, the first control plane function network element may send a third session management request to the user plane function network element corresponding to the PDN connection during handover execution, where the third session management request is used to request to modify a downlink user plane tunnel corresponding to the PDU session, and the third session management request carries the downlink data transmission rule.

In another possible implementation, the first control plane function network element may add the downlink data transmission rule and first rule indication information to the first session management request during session establishment/modification, where the first rule indication information is used to indicate not to enable the downlink data transmission rule. Correspondingly, the first control plane function network element sends a third session management request to the user plane function network element corresponding to the PDN connection during handover execution, where the third session management request carries second rule indication information, and the second rule indication information is used to indicate to enable the downlink data transmission rule.

According to the handover method provided in this embodiment of this application, the first control plane function network element indicates the downlink data transmission rule to the user plane function network element corresponding to the PDN connection in a handover execution phase. As such, the user plane function network element corresponding to the PDN connection matches received downlink data to a corresponding downlink tunnel according to the downlink data transmission rule, and sends the received downlink data to a V-UPF or an access network (such as a V-UPF or an access network in FIG. 1 or FIG. 2) in the first network through the downlink tunnel.

According to a fourth aspect, this application provides a communications system. The system includes a first control plane function network element and a user plane function network element. The first control plane function network element is configured to: determine at least one bearer that needs to be established when a PDU session of a terminal in a first network is to be switched to a PDN connection in a second network; obtain tunnel information of the PDN connection, where the tunnel information of the PDN connection includes user plane tunnel information corresponding to each of the at least one bearer; and send a first session management request to the user plane function network element, where the first session management request is used to request to establish or modify a user plane tunnel corresponding to each of the at least one bearer, the first session management request carries an uplink data transmission rule and the tunnel information of the PDN connection, and the uplink data transmission rule is used to indicate the user plane function network element corresponding to the PDU session how to forward uplink data that is received through the user plane tunnel corresponding to the PDN connection. The user plane function network element is configured to: receive the first session management request from the first control plane function network element; and send a first session management response to the first control plane function network element based on the first session management request. The first control plane function network element is further configured to receive the first session management response from the user plane function network element.

With reference to the fourth aspect, in some possible implementations, the first session management request further carries a downlink transmission rule and first rule indication information, where the downlink data transmission rule is used to indicate the user plane function network element corresponding to the PDU session to forward received downlink data through a corresponding user plane tunnel, and the first rule indication information is used to indicate not to enable the downlink data transmission rule.

Optionally, the first control plane function network element is further configured to send second rule indication information to the user plane function network element, where the second rule indication information is used to indicate to enable the downlink data transmission rule.

With reference to the fourth aspect, in some possible implementations, the first control plane function network element is further configured to send the downlink data transmission rule to the user plane function network element.

According to a fifth aspect, an embodiment of this application provides a communications system. The system includes a first control plane function network element and a user plane function network element. The first control plane function network element is configured to: determine at least one bearer that needs to be established when a PDU session of a terminal in a first network is to be switched to a PDN connection in a second network; and send a first session management request to the user plane function network element, where the first session management request is used to request to establish or modify a user plane tunnel corresponding to each of the at least one bearer, the first session management request carries an uplink data transmission rule, and the uplink data transmission rule is used to indicate the user plane function network element corresponding to the PDU session how to forward uplink data that is received through the user plane tunnel corresponding to the PDN connection. The user plane function network element is configured to: receive the first session management request from the first control plane function network element, determine tunnel information of the PDN connection based on the first session management request, where the tunnel information of the PDN connection includes user plane tunnel information corresponding to each of the at least one bearer; and send a first session management response to the first control plane function network element, where the first session management response carries the tunnel information of the PDN connection. The first control plane function network element is further configured to receive the first session management response from the user plane function network element.

With reference to the fifth aspect, in some possible implementations, the first session management request further carries a downlink transmission rule and first rule indication information, where the downlink data transmission rule is used to indicate the user plane function network element corresponding to the PDU session to forward received downlink data through a corresponding user plane tunnel, and the first rule indication information is used to indicate not to enable the downlink data transmission rule.

Optionally, the first control plane function network element is further configured to send second rule indication information to the user plane function network element, where the second rule indication information is used to indicate to enable the downlink data transmission rule.

With reference to the fifth aspect, in some possible implementations, the first control plane function network element further sends the downlink data transmission rule to the user plane function network element.

According to a sixth aspect, an embodiment of this application provides a handover apparatus, including units configured to perform steps in the handover method in any one of the first aspect or the implementations of the first aspect.

According to a seventh aspect, an embodiment of this application provides a handover apparatus, including units configured to perform steps in the handover method in any one of the second aspect or the implementations of the second aspect.

According to an eighth aspect, an embodiment of this application provides a handover apparatus, including units configured to perform steps in the handover method in any one of the third aspect or the implementations of the third aspect.

According to a ninth aspect, an embodiment of this application provides a handover device. The device may be the handover apparatus in the foregoing method design, or a chip configured in the handover apparatus. The device includes a processor, a memory, and a communications interface. The processor, the memory, and the communications interface may implement communication using a bus, or may implement communication in another manner such as wireless transmission. The memory is configured to store an instruction, and the processor is configured to execute the instruction stored in the memory. The memory stores program code, and the processor may invoke the program code stored in the memory, to perform the handover method in any one of the first aspect or the possible implementations of the first aspect.

According to a tenth aspect, an embodiment of this application provides a handover device. The device may be the handover apparatus in the foregoing method design, or a chip configured in the handover apparatus. The device includes a processor, a memory, a communications interface, and a bus. The processor, the memory, and the communications interface may implement communication using the bus, or may implement communication in another manner such as wireless transmission. The memory is configured to store an instruction, and the processor is configured to execute the instruction stored in the memory. The memory stores program code, and the processor may invoke the program code stored in the memory, to perform the handover method in any one of the second aspect or the possible implementations of the second aspect.

According to an eleventh aspect, an embodiment of this application provides a handover device. The device may be the handover apparatus in the foregoing method design, or a chip configured in the handover apparatus. The device includes a processor, a memory, and a communications interface. The processor, the memory, and the communications interface may implement communication using a bus, or may implement communication in another manner such as wireless transmission. The memory is configured to store an instruction, and the processor is configured to execute the instruction stored in the memory. The memory stores program code, and the processor may invoke the program code stored in the memory, to perform the handover method in any one of the third aspect or the possible implementations of the third aspect.

According to a twelfth aspect, a chip system is provided. The chip system includes a processor, configured to implement functions included in the foregoing aspects, for example, generating, receiving, sending, or processing data and/or information included in the foregoing methods. In a possible design, the chip system further includes a memory. The memory is configured to store a program instruction and data that are necessary for a handover apparatus. For example, the program instruction stored in the memory includes an instruction that is used to perform the handover method in any one of the first to the third aspects or the possible implementations of the first to the third aspects.

Optionally, the chip system may include a chip, or may include a chip and another discrete device.

According to a thirteenth aspect, a computer program product is provided. The computer program product includes computer program code. When the computer program code runs on a computer, the computer is enabled to perform the handover method in any one of the first to the third aspects or the possible implementations of the first to the third aspects.

According to a fourteenth aspect, a computer readable medium is provided. The computer readable medium stores program code executed by a handover apparatus, and the program code includes an instruction that is used to perform the handover method in any one of the first to the third aspects or the possible implementations of the first to the third aspects.

In this application, the implementations provided in the foregoing aspects can be further combined to provide more implementations.

BRIEF DESCRIPTION OF DRAWINGS

FIG. 3 is a schematic flowchart of a handover method according to an embodiment of this application;

FIG. 4 is a schematic flowchart of another handover method according to an embodiment of this application;

FIG. 7A, FIG. 7B, and FIG. 7C are schematic flowcharts of still another handover method according to an embodiment of this application;

FIG. 9A, FIG. 9B, and FIG. 9C are schematic flowcharts of still another handover method according to an embodiment of this application;

FIG. 10A, FIG. 10B, and FIG. 10C are schematic flowcharts of still another handover method according to an embodiment of this application;

FIG. 12A, FIG. 12B, and FIG. 12C are schematic flowcharts of still another handover method according to an embodiment of this application;

DESCRIPTION OF EMBODIMENTS

The following describes technical solutions of this application with reference to accompanying drawings.

Figure 1:
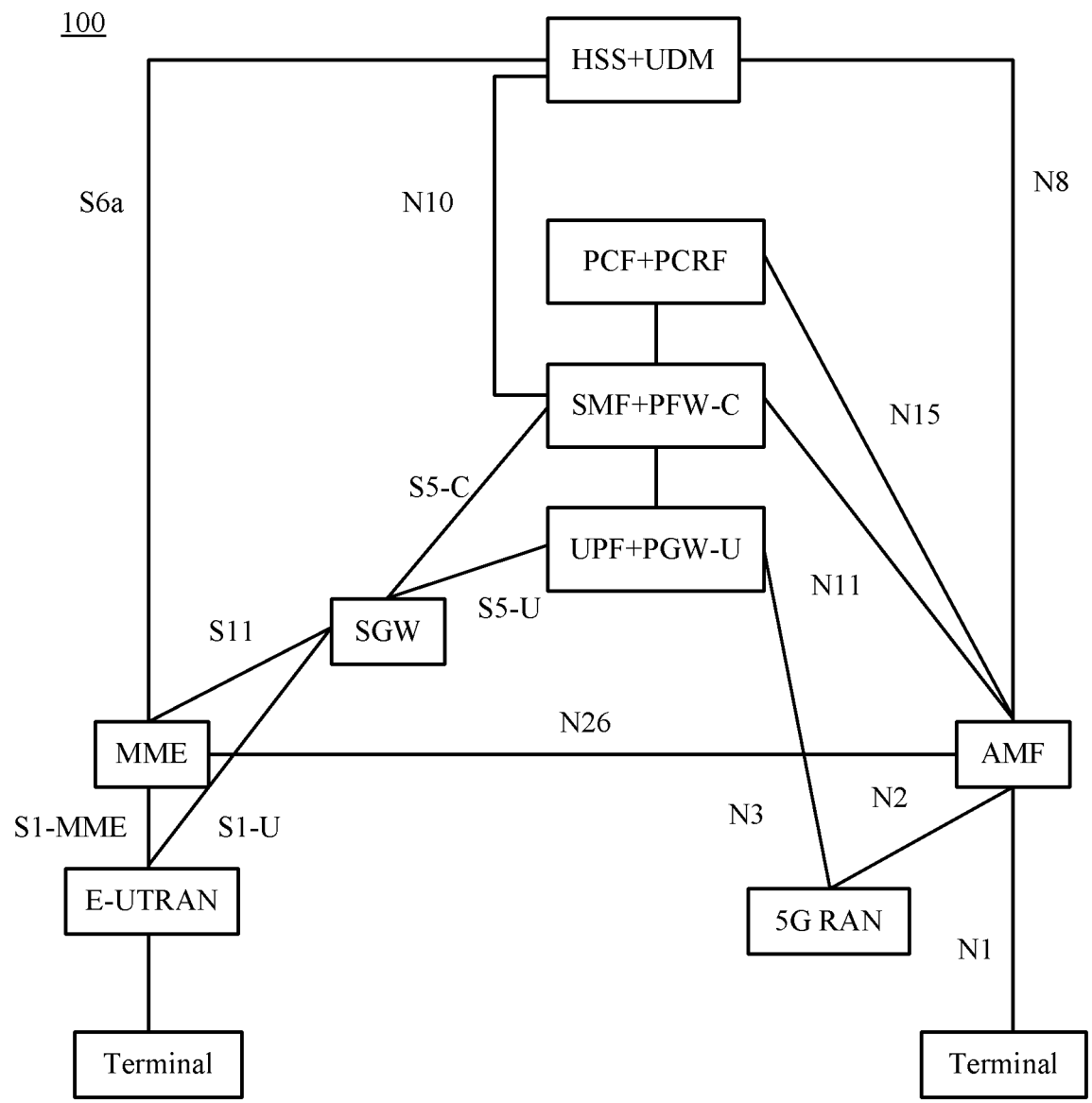
FIG. 1 is a schematic diagram of a system architecture according to an embodiment of this application.
Figure 2:
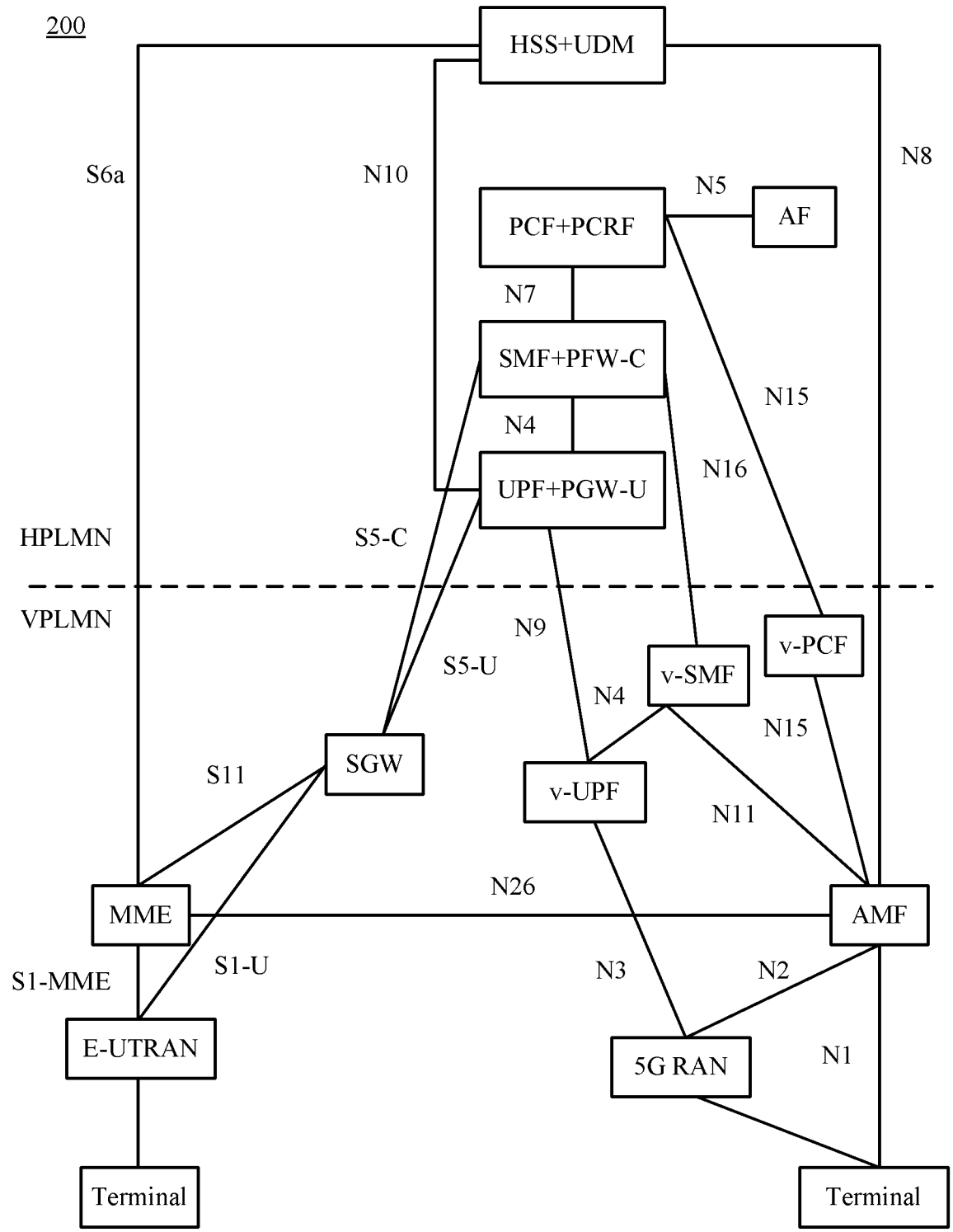
FIG. 2 is a schematic diagram of another system architecture according to an embodiment of this application.

Application scenarios of embodiments of this application are first described with reference to FIG. 1 and FIG. 2. FIG. 1 and FIG. 2 are respectively a schematic diagram of a system architecture 100 and a schematic diagram of a system architecture 200 according to embodiments of this application. FIG. 1 shows an interworking system architecture 100 of a 4G network and a 5G network in a non-roaming scenario, and FIG. 2 shows an interworking system architecture 200 of a 4G network and a 5G network in a home routed roaming scenario.

For example, the system architecture 100 and the system architecture 200 may include network elements in the 4G network and network elements in the 5G network. Some modules in the system architecture 100 and the system architecture 200 have functions of a network element in the 4G network and a network element in the 5G network, for example, a user plane function (UPF)+PGW-U module, a session management function (SMF)+PDN gateway control plane function (PGW-C) module, a policy control function (PCF)+policy and charging rules function (PCRF) module, and a home subscriber server (HSS)+unified data management (UDM) module.

The UPF+PGW-U module is used for user data transmission management. In the interworking system architecture, the module can not only be used for 4G data transmission, but also provide a 5G data transmission function.

The SMF+PGW-C module is used for session establishment, deletion, and modification management. In the interworking system architecture, the module can provide both a 4G session management function and a 5G session management function.

The PCF+PCRF module is used for policy and charging control. In the interworking system architecture, the module can provide a terminal with both 4G policy and charging control and 5G policy and charging control.

The HSS+UDM module is configured to store subscription data of a user. In the interworking system architecture, the module stores both 4G subscription information and 5G subscription information of a terminal.

It should be understood that, "+" indicates integrated configuration. A UPF is a user plane function of the 5G network, and a PGW-U is a gateway user plane function that corresponds to the UPF and that is of the 4G network; an SMF is a session management function of the 5G network, and a PGW-C is a gateway control plane function that corresponds to the SMF and that is in the 4G network; a PCF is a policy control function of the 5G network, and a PCRF is a policy and charging rules function that corresponds to the PCF and that is of the 4G network. The "integrated configuration" herein means that one module may have functions of two network functional entities.

In the embodiments of this application, for ease of description, an HSS+UDM entity is referred to as a user data management network element, an SMFHPGW-C is referred to as a control plane function network element, and a UPF+PGW-U is referred to as a user plane function network element. This is described herein for once, and details are not described below again. Certainly, the foregoing network device of integrated configuration may alternatively have other names. This is not specifically limited in the embodiments of this application.

In addition, the system architecture 100 and the system architecture 200 may further include an access and mobility management function (AMF) module of the 5G network, an MME module, and a serving gateway (SGW) module.

The MME module is used for mobility management of a user. For example, mobility management of the user mainly includes attachment management, accessibility management, mobility management, paging management, access authentication and authorization, and non-access stratum signaling encryption and integrity protection of the user.

The SGW module is a user plane gateway, and is a user plane termination point of an evolved universal terrestrial radio access network (E-UTRAN). The SGW module manages data packet routing and transmission, adds a packet tag of a transport layer, and the like.

The AMF module is used for access and mobility management of a user, which mainly includes registration management, accessibility management, mobility management, paging management, access authentication and authorization, non-access stratum signaling encryption and integrity protection, and the like of the user.

The terminal accesses the 4G network using the E-UTRAN, and the terminal accesses the 5G network using a next generation (NG) radio access network (NG-RAN).

The NG-RAN is used to provide the terminal with a radio air interface to access a core network, in order to obtain a corresponding service.

The E-UTRAN is used for managing radio resources, establishing, modifying, or deleting an air interface resource for the terminal, providing data and signaling transmission for the terminal, and the like.

The following describes communications interfaces between the foregoing modules in the system architecture 100 and the system architecture 200.

An S1-MME interface is a control plane interface between the MME and the E-UTRAN.

An S1-U interface is a user plane interface between the S-GW and the E-UTRAN.

An S5-U interface is a user plane interface between the SGW and the PGW-U, and is configured to transmit user plane data of a UE.

An S5-C interface is a control plane management interface between the SGW and the PGW-U, and is configured to establish an SGW and PGW-U user plane connection for a UE.

An S6a interface is an interface between the MME and the HSS, and is configured to obtain subscription data of a user and perform an authentication and authorization function for UE.

An S11 interface is an interface between the SGW and the MIME, and is configured to establish a user plane bearer.

An N1 interface is an interface between a UE and the AMF, and is used for non-access stratum signaling management and transmission.

An N2 interface is an interface between the NG-RAN and the AMF, and is used for signaling transmission.

An N3 interface is an interface between the UPF and the NG-RAN, and is configured to transmit user data.

An N4 interface is an interface between the SMF and the UPF, and is configured to establish a user plane transmission channel.

An N7 interface is an interface between the SMF and the PCF, and is configured to work out and deliver policy control and charging information.

An N8 interface is an interface between the AMF and a UDM, and is configured to obtain mobility-related subscription information of a user and the like.

An N10 interface is an interface between the SMF and the UDM, and is configured to obtain session management-related subscription information of a user and the like.

An N11 interface is an interface between the SMF and the AMF, and is configured to transmit session management information and the like.

An N15 interface is an interface between the AMF and the PCF, and is configured to obtain access and mobility-related policy information.

In addition, in the system architecture 200, an HPLMN indicates a local network, and a VPLMN indicates a visited network or a roaming network. For example, the HPLMN indicates a home public land mobile network (HPLMN), and the VPLMN indicates a visited or roaming PLMN. For example, a v-SMF indicates an SMF in the roaming network and a v-UPF indicates a UPF in the roaming network.

It should be understood that, to support interworking of the 4G network and the 5G network, a first interface is introduced into the system architecture 100 and the system architecture 200. The first interface is a communications interface between the AMF in the 5G network and the MME in the 4G network, and the first interface may be indicated using an N26 interface. The system architecture optionally supports the N26 interface. A handover process can be used only in an interworking system architecture that supports the N26 interface, to ensure service continuity.

It should be further understood that, because the embodiments of this application include a process of handing over a terminal between the 4G network and the 5G network, the system architecture 100 and the system architecture 200 support the N26 interface.

It should be noted that in the system architecture 100 and the system architecture 200, names of the interfaces between the modules are only examples, and the interfaces may have other names in implementation. This is not specifically limited in the embodiments of this application.

It should be further noted that in the system architecture 100 and the system architecture 200, the NG-RAN in the 5G network may also be referred to as an access device. The access device is a device for accessing a core network, and may be, for example, a base station, a broadband network gateway (BNG), an aggregation switch, or a non-3GPP access device. The base station may be in various forms, for example, a macro base station, a micro base station (also referred to as a small cell), a relay station, or an access point. This is not limited in the embodiments of this application.

Certainly, in the system architecture 100 and the system architecture 200, the 4G network and the 5G network may further include other modules. For example, the 4G network may further include a general packet radio system (GPRS) serving GPRS support node (SGSN) module, and the 5G network may further include an authentication server function (AUSF) module and a network slice selection function (NSSF) module. This is not limited in the embodiments of this application.

The terminal in the embodiments of this application may include a handheld device, an in-vehicle device, a wearable device, and a computing device that have a wireless communication function, or another processing device connected to a wireless modem, and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a terminal device, and the like. For ease of description, all the foregoing devices are collectively referred to as a terminal.

It should be understood that, as the terminal constantly moves, a change of a location of the terminal may result in handover of the terminal between different networks. For example, when the terminal moves from the 4G network to the 5G network, a PDN connection in the 4G network needs to be switched to a PDU session in the 5G network, or when the terminal is handed over from the 5G network to the 4G network, a PDU session in the 5G network needs to be switched to a PDN connection in the 4G network.

In the 4G network, a control plane tunnel corresponding to the PDN connection is allocated to the PDN connection. The control plane tunnel is used to transmit control signaling corresponding to the PDN connection. The PDN connection includes at least one bearer, and a user plane tunnel corresponding to each of the at least one bearer is allocated to the bearer. The user plane tunnel corresponding to each bearer is used to transmit at least one data flow included in the bearer.

In other words, one PDN connection corresponds to one control plane tunnel, and one bearer in one PDN connection corresponds to one user plane tunnel.

In the 5G network, the PDU session includes at least one data flow. A user plane tunnel corresponding to the PDU session is allocated to the PDU session. There is no control plane tunnel corresponding to the PDU session in 5G.

In other words, no control plane tunnel is allocated to the PDU session, and one PDU session corresponds to one user plane tunnel.

Therefore, the following problems exist when the terminal is handed over between the two networks.

(1) When the terminal is handed over from the 4G network to the 5G network, there is a problem of how to map at least one user plane tunnel (for example, a plurality of user plane tunnels) corresponding to a PDN connection to one user plane tunnel corresponding to a PDU session.

(2) When the terminal is handed over from the 5G network to the 4G network, there is a problem of how to map one user plane tunnel corresponding to a PDU session to at least one user plane tunnel (for example, a plurality of user plane tunnels) corresponding to a PDN connection.

(3) When the terminal is handed over from the 5G network to the 4G network, there is a problem of how to establish a control plane tunnel corresponding to a PDN connection in the 4G network.

The foregoing problems may result in a loss of a data packet in a network handover process, and consequently, normal transmission of the data packet is affected.

A handover method and apparatus provided in the embodiments of this application help prevent a loss of a data packet in a network handover process, thereby ensuring normal transmission of the data packet.

FIG. 3 is a schematic flowchart of a handover method 300 according to an embodiment of this application. The method 300 may be applied to the system architecture shown in FIG. 1 or FIG. 2, or the method 300 may be applied to another similar architecture. This is not limited in this embodiment of this application.

It should be understood that, the method 300 may be performed by a first control plane function network element. The first control plane function network element may be, for example, the SMF-PGW-C shown in FIG. 1 or FIG. 2.

S310. The first control plane function network element determines at least one bearer that needs to be established when a PDU session of a terminal in a first network is to be switched to a PDN connection in a second network.

S320. The first control plane function network element obtains tunnel information of the PDN connection, where the tunnel information of the PDN connection includes user plane tunnel information corresponding to each of the at least one bearer.

It should be understood that, the first network may include a 5G network, and the second network may include a 4G network. It should be further understood that, the PDU session in the first network is equivalent to the PDN connection in the second network.

Optionally, in S310, when determining that the PDU session in the first network needs to be established or modified, the first control plane function network element may determine the at least one bearer that needs to be established when the PDU session of the terminal in the first network is to be switched to the PDN connection in the second network.

Optionally, in S310, the first control plane function network element may determine, in a plurality of cases, that the PDU session in the first network needs to be established or modified. This is not limited in this embodiment of this application.

In a possible implementation, the first control plane function network element may receive a first request message from the AMF, where the first request message is used to request to establish the PDU session in the first network, and the PDU session includes at least one data flow. Additionally, the first control plane function network element determines, based on the first request message, that the PDU session in the first network needs to be established.

In another possible implementation, the first control plane function network element may receive a second request message from another network element, where the second request message is used to trigger the first control plane function network element to modify the PDU session in the first network. For example, the second request message is used to trigger the first control plane function network element to add at least one data flow to the PDU session.

In still another possible implementation, the first control plane function network element may be triggered, by a process of the first control plane function network element, to modify the PDU session in the first network.

Optionally, the first control plane function network element may determine the at least one bearer based on the at least one data flow and an allocation policy.

Optionally, the at least one data flow may be, for example, a quality of service (QoS) flow. A QoS flow may be a guaranteed bit rate (GBR) QoS flow or a non-GBR QoS flow.

Optionally, the allocation policy may be pre-configured, or may be indicated by another network element using indication information. This is not limited in this embodiment of this application.

Optionally, specific content of the allocation policy is not limited in this embodiment of this application. For example, the allocation policy may be: (1) all non-GBR QoS flows in one PDU session share a default bearer; (2) different GBR QoS flows in one PDU session use different dedicated bearers; or (3) several different GBR QoS flows in one PDU session share a dedicated bearer.

For example, during session establishment, when the at least one data flow includes five GBR QoS flows and six non-GBR QoS flows, the first control plane function network element establishes one dedicated bearer for each of the five GBR QoS flows, and establishes one public default bearer for the six non-GBR QoS flows.

For another example, during session modification, if a dedicated bearer 1 and a dedicated bearer 2 have been established for the PDU session during establishment of the PDU session, and the at least one data flow includes one GBR QoS flow and one non-GBR QoS flow, the first control plane function network element establishes a dedicated bearer 3 for the GBR QoS flow, and establishes a public default bearer for the non-GBR QoS flow.

For another example, during session modification, if a dedicated bearer 1, a dedicated bearer 2, and a default bearer have been established for the PDU session during establishment of the PDU session, and the at least one data flow includes one GBR QoS flow and one non-GBR QoS flow, the first control plane function network element establishes a dedicated bearer 3 for the GBR QoS flow, and the non-GBR QoS flow shares the default bearer with other non-GBR QoS flows in the default bearer.

Optionally, the user plane tunnel information corresponding to each bearer in S320 may include a tunnel identifier of a user plane tunnel corresponding to the bearer and other information about the user plane tunnel, such as an Internet Protocol (IP) address corresponding to the tunnel. This is not limited in this embodiment of this application.

Optionally, in S320, the first control plane function network element may obtain, in a plurality of manners, the user plane tunnel information corresponding to each of the at least one bearer. This is not limited in this embodiment of this application.

In a possible implementation, the first control plane function network element itself may allocate the user plane tunnel information to each of the at least one bearer.

In another possible implementation, the first control plane function network element may request a user plane function network element corresponding to the PDU session to allocate user plane tunnel information to each of the at least one bearer, and obtain the user plane tunnel information corresponding to each bearer from the user plane function network element corresponding to the PDU session.

According to the handover method provided in this embodiment of this application, the first control plane function network element determines the at least one bearer that needs to be established when the PDU session of the terminal in the first network is to be switched to the PDN connection in the second network, and obtains the user plane tunnel information corresponding to each of the at least one bearer. As such, the first control plane function network element establishes a user plane tunnel corresponding to a bearer in the PDN connection when the PDU session is to be switched to the PDN connection. This helps prevent a loss of a data packet in the bearer included in the PDN connection in a network handover process, thereby ensuring normal transmission of the data packet.

It should be understood that, the first control plane function network element and the user plane function network element corresponding to the PDU session in this embodiment may be respectively the SMF+PGW-C and the UPF+PGW-U in the system architecture shown in FIG. 1 or FIG. 2.

Optionally, the method 300 further includes sending, by the first control plane function network element, an uplink data transmission rule to the user plane function network element corresponding to the PDU session, where the uplink data transmission rule is used to indicate the user plane function network element corresponding to the PDU session how to forward uplink data that is received through the user plane tunnel corresponding to the PDN connection. For example, the uplink data transmission rule is used to indicate the user plane function network element corresponding to the PDU session to send an uplink data packet to an external data network over a specified forwarding path.

In a possible implementation, the first control plane function network element may send a first session management request to the user plane function network element corresponding to the PDU session, where the first session management request is used to request to establish or modify the user plane tunnel corresponding to each of the at least one bearer, and the first session management request carries the uplink data transmission rule.

Correspondingly, the user plane function network element corresponding to the PDU session may receive the first session management request from the first control plane function network element, and send a first session management response to the first control plane function network element based on the first session management request.

Optionally, the first session management request may be an N4 session management request, and the first session management response may be an N4 session management response.

It should be understood that in this embodiment of this application, the N4 session management request may be an N4 session establishment request or an N4 session modification request transmitted, through an N4 interface, between the first control plane function network element and the user plane function network element corresponding to the PDU session. Correspondingly, the N4 session management response may be an N4 session establishment response or an N4 session modification response transmitted, through the N4 interface, between the first control plane function network element and the user plane function network element corresponding to the PDU session.

Optionally, when the first control plane network element itself allocates the user plane tunnel information to each of the at least one bearer, the first control plane function network element may add the user plane tunnel information corresponding to each of the at least one bearer to the first session management request. Additionally, when the first control plane function network element requests the user plane function network element corresponding to the PDU session to allocate user plane tunnel information to each of the at least one bearer, the user plane function network element corresponding to the PDU session may add the user plane tunnel information corresponding to each of the at least one bearer to the first session management response.

It should be noted that, after learning of the user plane tunnel information corresponding to each of the at least one bearer and an uplink data transmission rule corresponding to the bearer, the user plane function network element corresponding to the PDU session may establish an uplink user plane tunnel of the bearer on the user plane function network element corresponding to the PDU session.

Optionally, in S320, the tunnel information of the PDN connection may further include control plane tunnel information corresponding to the PDN connection.

Correspondingly, the first control plane function network element further needs to obtain the control plane tunnel information corresponding to the PDN connection.

It should be understood that, a control plane tunnel corresponding to the PDN connection is used to transmit control signaling of the PDN connection. In other words, a granularity of the control plane tunnel corresponding to the PDN connection is per PDN connection basis.

Optionally, the first control plane function network element may obtain, in a plurality of manners, the control plane tunnel information corresponding to the PDN connection. This is not limited in this embodiment of this application.

In a possible implementation, the first control plane function network element may allocate the control plane tunnel information to the PDN connection during establishment of the PDU session.

Optionally, the control plane tunnel information corresponding to the PDN connection may include a tunnel identifier of the control plane tunnel corresponding to the PDN connection and other information about the control plane tunnel, such as an IP address corresponding to the control plane tunnel. This is not limited in this embodiment of this application.

According to the handover method provided in this embodiment of this application, the tunnel information corresponding to the PDN connection further includes the control plane tunnel information corresponding to the PDN connection, such that the first control plane function network element establishes the control plane tunnel corresponding to the PDN connection corresponding to the PDU session. This helps prevent a loss of control signaling of the PDN connection in the network handover process, thereby ensuring normal transmission of the control signaling.

Optionally, in S320, the first control plane function network element may obtain the tunnel information of the PDN connection during session establishment/modification. Alternatively, the first control plane function network element may obtain the tunnel information of the PDN connection during handover preparation.

According to the handover method provided in this embodiment of this application, the first control plane function network element obtains the tunnel information of the PDN connection during establishment or modification of the PDU session or during handover preparation. As such, the first control plane function network element establishes, before handover execution, the user plane tunnel corresponding to the bearer in the PDN connection and the control plane tunnel corresponding to the PDN connection, thereby reducing a delay in the handover process.

Optionally, the method 300 further includes obtaining, by the first control plane function network element, a bearer identifier corresponding to each of the at least one bearer, such that the first control plane function network element associates the bearer identifier corresponding to each bearer with the user plane tunnel corresponding to each bearer.

It should be understood that, the bearer identifier corresponding to each of the at least one bearer is allocated by the mobility management network element, such that the bearer identifier corresponding to each bearer may be unique in the PDU session. In other words, the bearer identifier corresponding to each bearer may uniquely identify a user plane tunnel corresponding to the bearer.

In addition, the control plane tunnel information corresponding to the PDN connection may uniquely identify the PDN connection.

The following describes, with reference to the application scenarios shown in FIG. 1 and FIG. 2, a process in which the first control plane function network element obtains the bearer identifier corresponding to each bearer.

(1) In the Application Scenario Shown in FIG. 1

In a possible implementation, the first control plane function network element may send a bearer identifier request to the mobility management network element, where the bearer identifier request is used to allocate a bearer identifier to each of the at least one bearer. Correspondingly, the mobility management network element receives the bearer identifier request from the first control plane function network element, allocates a bearer identifier to each bearer based on the bearer identifier request, and sends the bearer identifier corresponding to each of the at least one bearer to the first control plane function network element.

It should be noted that, the first control plane function network element may store, into a bearer context corresponding to the PDN connection, the user plane tunnel information corresponding to each of the at least one bearer, the bearer identifier corresponding to each bearer, and the control plane tunnel information corresponding to the PDN connection that are obtained, and send the bearer context to the mobility management network element during handover preparation.

Correspondingly, the mobility management network element may establish, based on the bearer context corresponding to the PDN connection, an uplink tunnel from a serving gateway (such as the SGW in FIG. 1) in the second network to the user plane function network element corresponding to the PDU session.

(2) In the Application Scenario Shown in FIG. 2

It should be understood that, in FIG. 2, a second control plane function network element is a visited control plane network element corresponding to the PDU session, and the first control plane function network element is a home control plane network element corresponding to the PDU session. Therefore, the first control plane function network element needs to obtain the bearer identifier corresponding to each bearer using the second control plane function network element, and the second control plane function network element is responsible for network handover of the terminal.

In a possible implementation, the first control plane function network element sends a bearer identifier request to the mobility management network element using the second control plane function network element, where the bearer identifier request is used to request to allocate a bearer identifier to each of the at least one bearer. Additionally, the first control plane function network element receives the bearer identifier corresponding to each of the at least one bearer from the mobility management network element using the second control plane function network element.

It should be noted that, after obtaining the user plane tunnel information corresponding to each of the at least one bearer, the bearer identifier corresponding to each bearer, and the control plane tunnel information corresponding to the PDN connection, the first control plane function network element may send the user plane tunnel information corresponding to each of the at least one bearer, the bearer identifier corresponding to each bearer, and the control plane tunnel information corresponding to the PDN connection to the second control plane function network element during establishment/modification of the PDU session.

Correspondingly, the second control plane function network element may store, into the bearer context of the PDN connection, the user plane tunnel information corresponding to each of the at least one bearer, the bearer identifier corresponding to each bearer, and the control plane tunnel information corresponding to the PDN connection that are obtained from the first control plane function network element.

In another possible implementation, the first control plane function network element may send the tunnel information of the PDN connection to the second control plane function network element, and obtain the bearer identifier corresponding to each of the at least one bearer from the second control plane function network element. Correspondingly, the second control plane function network element may store the bearer identifier corresponding to each of the at least one bearer.

In other words, the first control plane function network element sends the tunnel information of the PDN connection to the second control plane function network element, and the second control plane function network element determines, based on the tunnel information of the PDN connection, whether the mobility management network element needs to be requested to allocate a bearer identifier to the at least one bearer, and sends the bearer identifier request to the mobility management network element when the mobility management network element needs to be requested to allocate the bearer identifier to the at least one bearer.

For example, the first control plane function network element first checks whether a bearer identifier associated with the user plane tunnel information corresponding to each bearer exists in the obtained tunnel information of the PDN connection. If no bearer identifiers are allocated to some of the at least one bearer, the first control plane function network element requests the mobility management network element to allocate bearer identifiers to the bearers.

It should be noted that, the second control plane function network element may store, into the bearer context of the PDN connection, the user plane tunnel information corresponding to each of the at least one bearer, the bearer identifier corresponding to each bearer, and the control plane tunnel information corresponding to the PDN connection.

In the two implementations in the application scenario shown in FIG. 2, because the bearer context corresponding to the PDN connection stored by the second control plane function network element includes the user plane tunnel information corresponding to each of the at least one bearer, the bearer identifier corresponding to each bearer, and the control plane tunnel information corresponding to the PDN connection, the mobility management network element may obtain the bearer context corresponding to the PDN connection from the second control plane function network element during handover preparation, and establish, based on the bearer context corresponding to the PDN connection, the uplink tunnel from the serving gateway (such as the SGW in FIG. 1 or FIG. 2) in the second network to the user plane function network element corresponding to the PDU.

According to the handover method provided in this embodiment of this application, because the second control plane function network element is a visited control plane network element corresponding to the PDU session, compared with obtaining the bearer context corresponding to the PDN connection from the first control plane function network element, obtaining, by the mobility management network element, the bearer context corresponding to the PDN connection from the second control plane function network element can reduce a delay generated in the handover process.

Optionally, the method 300 further includes sending, by the first control plane function network element to the user plane function network element corresponding to the PDU session, a downlink data transmission rule corresponding to the PDN connection, where the downlink data transmission rule is used to indicate the user plane function network element corresponding to the PDU session to forward received downlink data through a corresponding user plane tunnel.

In a possible implementation, the first control plane function network element may send a third session management request to the user plane function network element corresponding to the PDU session during handover execution, where the third session management request is used to request to establish or modify a downlink user plane tunnel corresponding to each of the at least one bearer, and the third session management request carries the downlink data transmission rule.

In another possible implementation, the first control plane function network element may add the downlink data transmission rule and first rule indication information to the first session management request during PDU session request/modification, where the first rule indication information is used to indicate not to enable the downlink data transmission rule. Correspondingly, the first control plane function network element sends a third session management request to the user plane function network element corresponding to the PDU session during handover execution, where the third session management request carries second rule indication information, and the second rule indication information is used to indicate to enable the downlink data transmission rule.

Optionally, the third session management request may be an N4 session management request, and a third session management response may be an N4 session management response.

According to the handover method provided in this embodiment of this application, the first control plane function network element indicates the downlink data transmission rule to the user plane function network element corresponding to the PDU session in a handover execution phase, As such, the user plane function network element corresponding to the PDU session matches received downlink data to a corresponding downlink tunnel according to the downlink data transmission rule, and sends the received downlink data to the serving gateway (such as the SGW in FIG. 1 or FIG. 2) in the second network through the downlink tunnel.

The following describes, in detail with reference to FIG. 4, a function of the second control plane function network element in the embodiment of the foregoing method 300.

FIG. 4 is a schematic flowchart of a handover method 400 according to an embodiment of this application. The method 400 may be applied to the system architecture shown in FIG. 2, or the method 400 may be applied to another similar architecture. This is not limited in this embodiment of this application.

It should be understood that, the method 400 may be performed by a second control plane function network element, and the second control plane function network element may be, for example, the v-SMF shown in FIG. 2.

S410. The second control plane function network element receives tunnel information of a PDN connection from a first control plane function network element, where the tunnel information of the PDN connection includes user plane tunnel information corresponding to each of at least one bearer, the second control plane function network element is a visited control plane network element corresponding to the PDN connection, and the first control plane function network element is a home control plane network element corresponding to the PDN connection. Correspondingly, the first control plane function network element sends the tunnel information of the PDN connection to the second control plane function network element.

S420. The second control plane function network element sends the tunnel information of the PDN connection to a mobility management network element.

Optionally, the tunnel information of the PDN connection may include control plane tunnel information corresponding to the PDN connection.

In a possible implementation, the method 400 further includes: forwarding, by the second control plane function network element to the mobility management network element, a bearer identifier request that is sent by the first control plane function network element to the mobility management network element, where the bearer identifier request is used to request to allocate a bearer identifier to each of the at least one bearer; and forwarding, to the first control plane function network element, the bearer identifier that corresponds to each of the at least one bearer and that is sent by the mobility management network element to the first control plane function network element.

In other words, the second control plane function network element has a function of transparently transmitting a message transmitted between the first control plane function network element and a user plane function network element corresponding to the PDU session.

Optionally, the second control plane function network element may further receive the bearer identifier corresponding to each of the at least one bearer from the first control plane function network element.

In this way, a context corresponding to the PDN connection stored by the second control plane function network element may include the tunnel information of the PDN connection and the bearer identifier corresponding to each of the at least one bearer.

In another possible implementation, the method 400 further includes: sending, by the second control plane function network element, a bearer identifier request to the mobility management network element based on the tunnel information of the PDN connection, where the bearer identifier request is used to request to allocate a bearer identifier to each of the at least one bearer included in the PDN connection; and receiving, by the second control plane function network element, the bearer identifier corresponding to each of the at least one bearer from the mobility management network element.

For example, the second control plane network element may check whether a bearer identifier associated with the user plane tunnel information corresponding to each bearer exists in the tunnel information of the PDN connection. If no bearer identifier is allocated to the at least one bearer, the second control plane function network element requests the mobility management network element to allocate the bearer identifier to each of the at least one bearer to which no bearer identifier is allocated.

In other words, the second control plane function network element may have a processing function.

Optionally, the second control plane function network element may store the bearer identifier corresponding to each of the at least one bearer, and send the bearer identifier corresponding to each of the at least one bearer to the first control plane function network element.

In this way, the context corresponding to the PDN connection stored by the second control plane function network element may include the tunnel information of the PDN connection and the bearer identifier corresponding to each of the at least one bearer.

According to the handover method provided in this embodiment of this application, the bearer context corresponding to the PDN connection stored by the second control plane function network element includes the tunnel information of the PDN connection and the bearer identifier corresponding to each of the at least one bearer. As such, the mobility management network element may directly obtain the bearer context corresponding to the PDN connection from the second control plane function network element during handover preparation, and establish, based on the bearer context corresponding to the PDN connection, an uplink tunnel from a serving gateway (such as the SGW in FIG. 1 or FIG. 2) in the second network to the user plane function network element corresponding to the PDU.

In addition, because the second control plane function network element is a visited control plane network element corresponding to the PDU session, compared with obtaining the bearer context corresponding to the PDN connection from the first control plane function network element, obtaining, by the mobility management network element, the bearer context corresponding to the PDN connection from the second control plane function network element can reduce a delay generated in a handover process.

Figure 5:
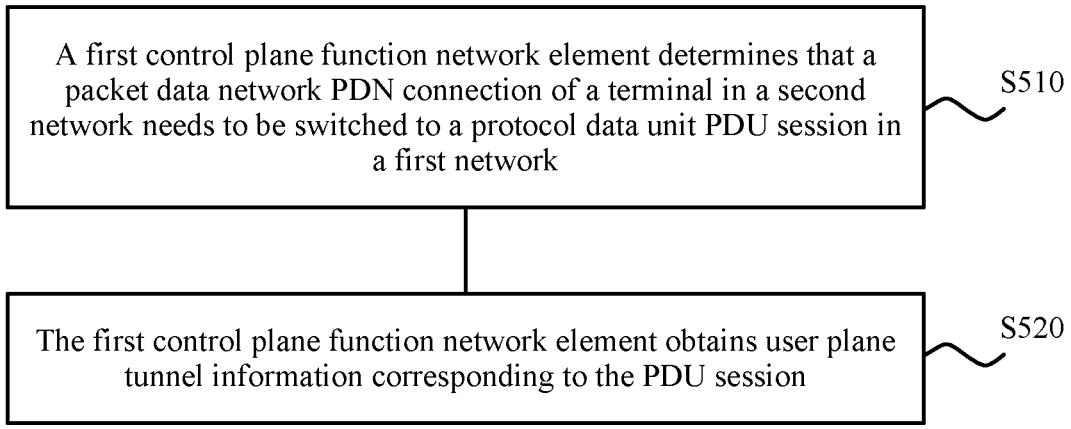
FIG. 5 is a schematic flowchart of still another handover method according to an embodiment of this application.

FIG. 5 is a schematic flowchart of a handover method 500 according to an embodiment of this application. The method 500 may be applied to the system architecture shown in FIG. 1 or FIG. 2, or the method 500 may be applied to another similar architecture. This is not limited in this embodiment of this application.

It should be understood that, the method 500 may be performed by a first control plane function network element. The first control plane function network element may be, for example, the SMF-PGW-C shown in FIG. 1 or FIG. 2.

S510. The first control plane function network element determines that a PDN connection of a terminal in a second network needs to be switched to a PDU session in a first network.

S520. The first control plane function network element obtains user plane tunnel information corresponding to the PDU session.

It should be understood that, the first network may include a 5G network, and the second network may include a 4G network. It should be further understood that, the PDU session in the first network is equivalent to the PDN connection in the second network.

Optionally, in S510, the first control plane function network element may determine, in a plurality of manners, that the PDN connection of the terminal in the second network needs to be switched to the PDU session in the first network. This is not limited in this embodiment of this application.

(1) During Session Establishment/Modification

In a possible implementation, the first control plane function network element may receive a third request message, where the third request message is used to request to establish the PDN connection in the second network. Additionally, the first control plane function network element determines, based on the third request message, that the PDN connection of the terminal in the second network needs to be switched to the PDU session in the first network.

(2) During Handover Preparation

In a possible implementation, the first control plane function network element may receive a second session management request, where the second session management request carries first indication information, and the first indication information is used to indicate to prepare for handing over the terminal from the second network to the first network. Additionally, the first control plane function network element may determine, based on the first indication information, that the PDN connection in the second network needs to be switched to the PDU session in the first network.

Optionally, the first control plane function network element may receive the second session management request from the AMF or receive the second session management request from the v-SMF.

Optionally, in S520, the first control plane function network element may obtain, in a plurality of manners, the user plane tunnel information corresponding to the PDU session. This is not limited in this embodiment of this application.

In a possible implementation, the first control plane function network element itself may allocate, to the PDU session, the user plane tunnel information corresponding to the PDU session.

In another possible implementation, the first control plane function network element requests a user plane function network element corresponding to the PDN connection to allocate user plane tunnel information corresponding to the PDU session, and obtains the user plane tunnel information that corresponds to the PDU session from the user plane function network element corresponding to the PDN connection.

According to the handover method provided in this embodiment of this application, the first control plane function network element determines that the PDN connection of the terminal in the second network needs to be switched to the PDU session in the first network, and obtains the user plane tunnel information corresponding to the PDU session, such that the first control plane function network element establishes a user plane tunnel corresponding to the PDU session when the PDN connection is to be switched to the PDU session. This helps prevent a loss of a data packet in the PDU session in a network handover process, thereby ensuring normal transmission of the data packet.

It should be understood that, the user plane function network element corresponding to the PDN connection may be the UPF+PGW-U in the system architecture shown in FIG. 1 or FIG. 2.

Optionally, the method 500 further includes sending, by the first control plane function network element, an uplink data transmission rule to the user plane function network element corresponding to the PDN connection, where the uplink data transmission rule is used to indicate the user plane function network element corresponding to the PDN connection how to forward uplink data that is received through the user plane tunnel corresponding to the PDU session. For example, the uplink data transmission rule is used to indicate the user plane function network element corresponding to the PDN connection to send an uplink data packet to an external data network over a specified forwarding path.

In a possible implementation, the first control plane function network element sends a first session management request to the user plane function network element corresponding to the PDN connection, where the first session management request is used to request to establish or modify the user plane tunnel corresponding to the PDU session, and the first session management request carries the uplink data transmission rule.

Correspondingly, the user plane function network element corresponding to the PDN connection may receive the first session management request from the first control plane function network element, and send a first session management response to the first control plane function network element based on the first session management request.

Optionally, the first session management request may be an N4 session management request, and the first session management response may be an N4 session management response.

It should be understood that in this embodiment of this application, the N4 session management request may be an N4 session establishment request or an N4 session modification request transmitted, through an N4 interface, between the first control plane function network element and the user plane function network element corresponding to the PDN connection. Correspondingly, the N4 session management response may be an N4 session establishment response or an N4 session modification response transmitted, through the N4 interface, between the first control plane function network element and the user plane function network element corresponding to the PDN connection.

Optionally, when the first control plane network element itself allocates the user plane tunnel information to the PDU session, the first control plane function network element may add the user plane tunnel information corresponding to the PDU session to the first session management request. Additionally, when the first control plane function network element requests the user plane function network element corresponding to the PDN connection to allocate user plane tunnel information to the PDU session, the user plane function network element corresponding to the PDN connection may add the user plane tunnel information corresponding to the PDU session to the first session management response.

Optionally, during session modification, the PDN connection in the second network may be updated, for example, some bearers are newly established. Therefore, the user plane function network element corresponding to the PDN connection needs to know an updated uplink data transmission rule, in order to associate data flows corresponding to these bearers with the user plane tunnel corresponding to the PDU session.

In a possible implementation, the first control plane function network element may receive a fourth request message from another network element, where the fourth request message triggers modification of the PDN connection in the second network. For example, the fourth request message triggers addition of at least one bearer to the PDN connection.

In still another possible implementation, the first control plane function network element may be triggered, by a process of the first control plane function network element, to modify the PDN connection in the second network.

Optionally, the method 500 further includes: when determining that the uplink data transmission rule changes, sending, by the first control plane function network element, an updated uplink data transmission rule to the user plane function network element corresponding to the PDN connection.

Optionally, when the first control plane function network element itself allocates the user plane tunnel information to the PDU session, the first control plane function network element may obtain the user plane tunnel information corresponding to the PDU session, and send, to the user plane function network element corresponding to the PDN connection, the user plane tunnel information corresponding to the PDU session in a same phase; or obtain the user plane tunnel information corresponding to the PDU session, and send, to the user plane function network element corresponding to the PDN connection, the user plane tunnel information corresponding to the PDU session in different phases. This is not limited in this embodiment of this application.

In a possible implementation, the first control plane function network element may obtain the user plane tunnel information corresponding to the PDU session and the uplink data transmission rule during session establishment/modification, and send the user plane tunnel information corresponding to the PDU session and the uplink data transmission rule to the user plane function network element corresponding to the PDN connection during session establishment/modification.

In another possible implementation, the first control plane function network element may obtain the user plane tunnel information corresponding to the PDU session and the uplink data transmission rule during network handover preparation, and send the user plane tunnel information corresponding to the PDU session and the uplink data transmission rule to the user plane function network element corresponding to the PDN connection during network handover preparation.

In still another possible implementation, the first control plane function network element may obtain the user plane tunnel information corresponding to the PDU session and the uplink data transmission rule during session establishment/modification, and send the user plane tunnel information corresponding to the PDU session and the uplink data transmission rule to the user plane function network element corresponding to the PDN connection during network handover preparation.

According to the handover method provided in this embodiment of this application, in a handover preparation phase, the first control plane function network element determines the user plane tunnel information corresponding to the PDU session, and sends, to the user plane function network element corresponding to the PDN connection, the user plane tunnel information corresponding to the PDU session. As such, an update of the uplink data transmission rule due to a bearer newly added during session establishment/modification can be prevented.

Optionally, the method 500 further includes sending, by the first control plane function network element to the user plane function network element corresponding to the PDN connection, a downlink data transmission rule corresponding to the PDU session, where the downlink data transmission rule is used to indicate to send, through the user plane tunnel corresponding to the PDU session, a downlink data packet received by the user plane function network element corresponding to the PDN connection.

In a possible implementation, the first control plane function network element may send a third session management request to the user plane function network element corresponding to the PDN connection during handover execution, where the third session management request is used to request to modify a downlink user plane tunnel corresponding to the PDU session, and the third session management request carries the downlink data transmission rule.

In another possible implementation, the first control plane function network element may add the downlink data transmission rule and first rule indication information to the first session management request during session establishment/modification, where the first rule indication information is used to indicate not to enable the downlink data transmission rule. Correspondingly, the first control plane function network element sends a third session management request to the user plane function network element corresponding to the PDN connection during handover execution, where the third session management request carries second rule indication information, and the second rule indication information is used to indicate to enable the downlink data transmission rule.

Optionally, the third session management request may be an N4 session management request, and the third session management response may be an N4 session management response.

According to the handover method provided in this embodiment of this application, the first control plane function network element indicates the downlink data transmission rule to the user plane function network element corresponding to the PDN connection in a handover execution phase. As such, the user plane function network element corresponding to the PDN connection matches received downlink data to a corresponding downlink tunnel according to the downlink data transmission rule, and sends the received downlink data to a V-UPF or an access network (such as the V-UPF or the access network in FIG. 1 or FIG. 2) in the first network through the downlink tunnel.

Figure 6A:
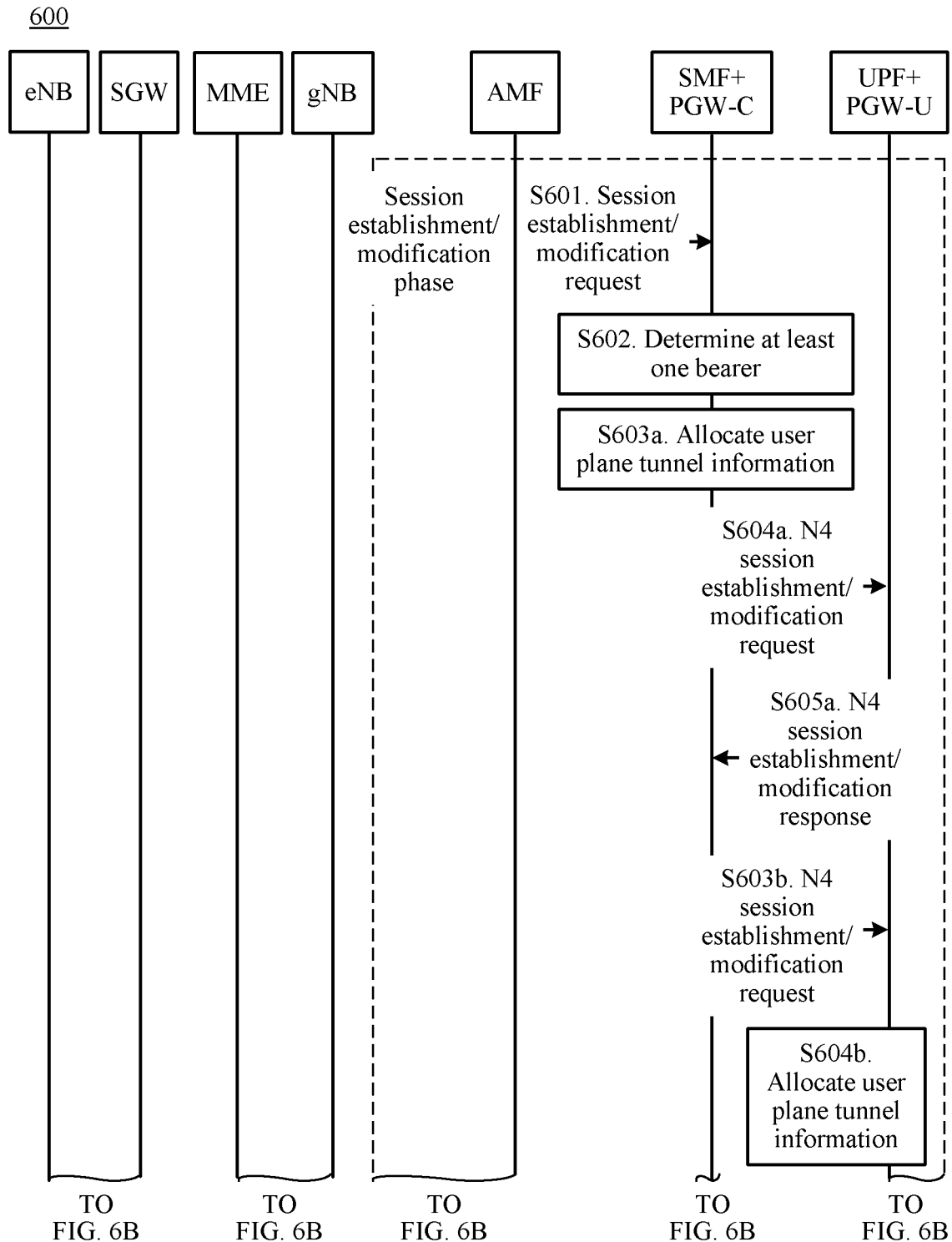
FIG. 6A, FIG. 6B, and FIG. 6C are schematic flowcharts of still another handover method according to an embodiment of this application.
Figure 6B:
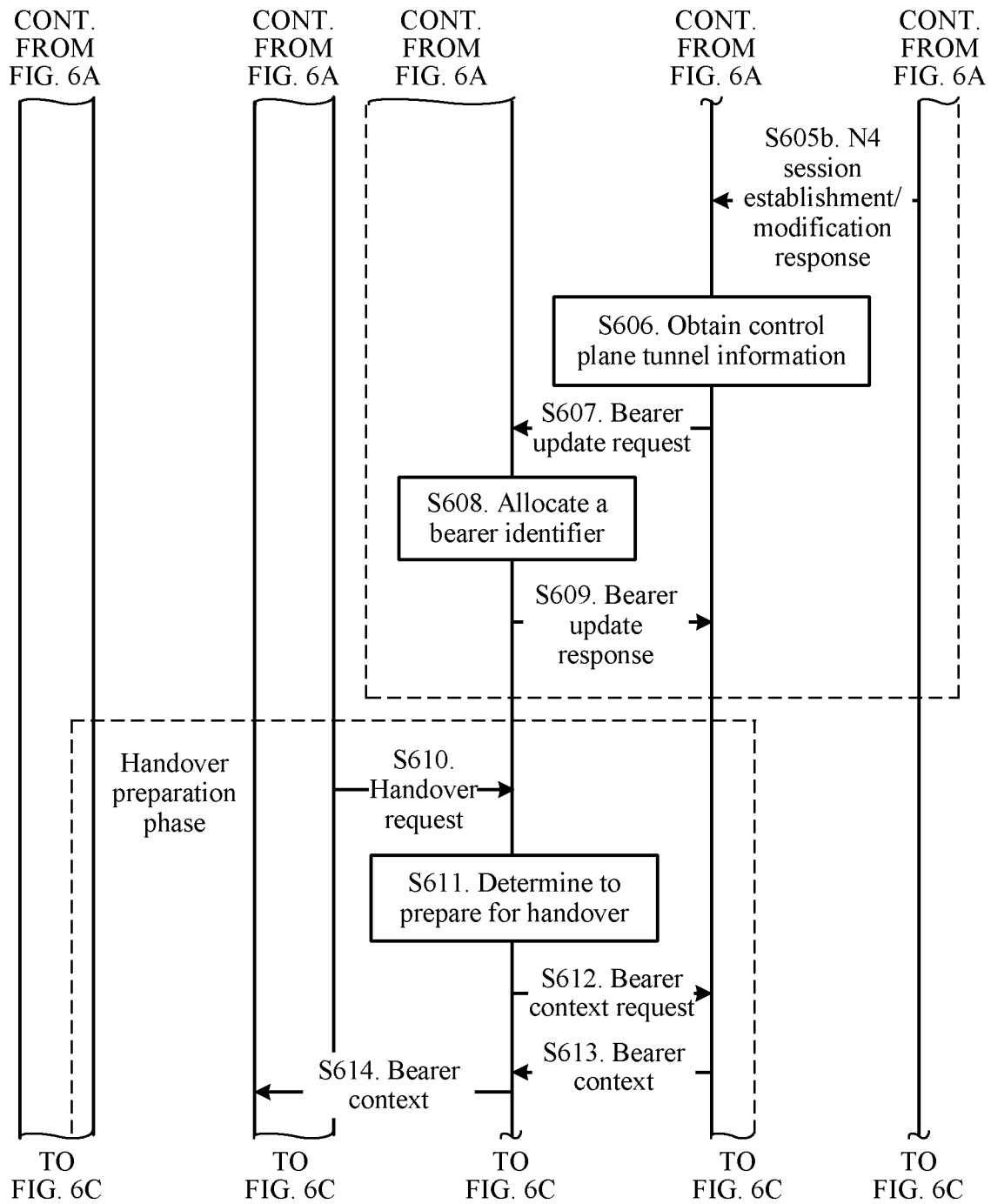
Figure 6C:
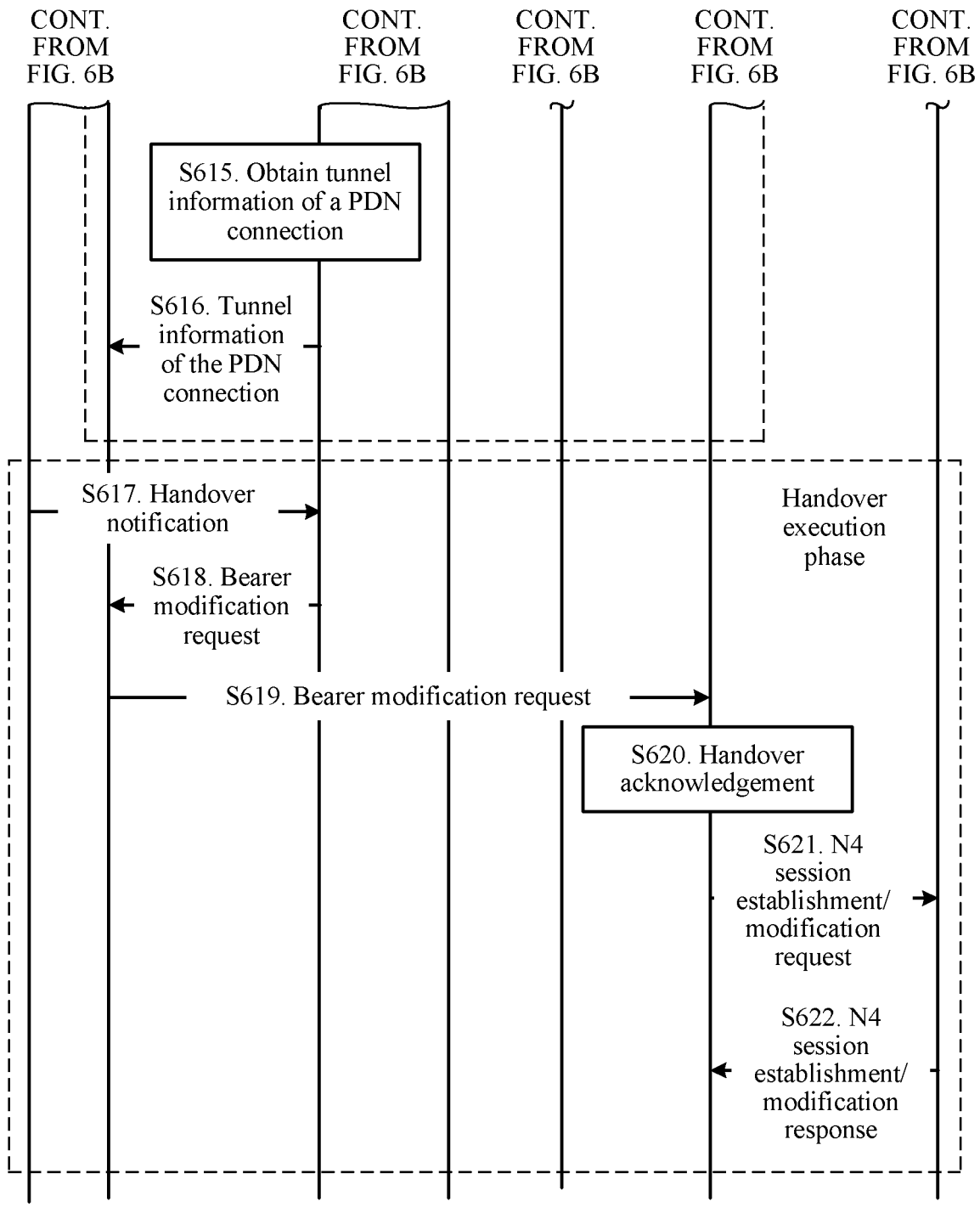

FIG. 6A, FIG. 6B, and FIG. 6C are a schematic flowchart of a handover method 600 according to an embodiment of this application. The method 600 may be applied to the system architecture in the non-roaming scenario shown in FIG. 1, or the method 600 may be applied to another similar architecture.

It should be understood that, the method 600 includes three phases in total: a session establishment/modification phase, a handover preparation phase, and a handover execution phase. The following describes the three phases in detail with reference to FIG. 6A, FIG. 6B, and FIG. 6C.

1. Session Establishment/Modification Phase

It should be noted that, S601 and S602 are a process in which the SMF+PGW-C determines at least one bearer that needs to be established when a PDU session of a terminal in a first network is to be switched to a PDN connection in a second network.

S601. The SMF+PGW-C receives a session establishment/modification request from the AMF, where the session establishment/modification request is used to request to establish the PDU session of the terminal in the first network or trigger modification of the PDU session in the first network. Correspondingly, the AMF sends the session establishment/modification request to the SMF+PGW-C.

S602. The SMF+PGW-C determines, based on the session establishment/modification request in S601, the at least one bearer that needs to be established when the PDU session of the terminal in the first network is to be switched to the PDN connection in the second network.

It should be noted that, S603a to S605a or S603b to S605b are a process in which the SMF+PGW-C and the UPF+PGW-U establish a user plane tunnel corresponding to each of the at least one bearer.

It should be understood that, that the SMF+PGW-C and the UPF+PGW-U establish the user plane tunnel corresponding to each of the at least one bearer may include obtaining, by the SMF+PGW-C and the UPF+PGW-U, user plane tunnel information corresponding to each bearer and an uplink data packet transmission rule.

Optionally, user plane tunnel information corresponding to each of the at least one bearer may be allocated by the SMF+PGW-C or the UPF+PGW-U. This is not limited in this embodiment of this application.

If the SMF+PGW-C allocates the user plane tunnel information, S603a to S605a are performed. If the UPF+PGW-U allocates the user plane tunnel information, S603b to S605b are performed.

(1) The SMF+PGW-C allocates the user plane tunnel information to each bearer.

S603a. The SMF+PGW-C allocates the user plane tunnel information to each bearer.

S604a. The SMF+PGW-C sends an N4 session establishment/modification request to the UPF+PGW-U, where the N4 session establishment/modification request is used to request to establish the user plane tunnel corresponding to each of the at least one bearer, the N4 session establishment/modification request carries the user plane tunnel information corresponding to each bearer and the uplink data packet transmission rule, and the uplink data transmission rule is used to indicate a user plane function network element (such as the UPF+PGW-U in FIG. 6A, FIG. 6B, and FIG. 6C) corresponding to the PDU session how to forward uplink data that is received through the user plane tunnel corresponding to the PDN connection. Correspondingly, the UPF+PGW-U receives the N4 session establishment/modification request from the SMF+PGW-C.

S605a. The UPF+PGW-U sends an N4 session establishment/modification response to the SMF+PGW-C based on the N4 session establishment/modification request received in S604a. Correspondingly, the SMF+PGW-C receives the N4 session establishment/modification response from the UPF+PGW-U.

(2) The UPF+PGW-U allocates the user plane tunnel information to each bearer.

S603b. The SMF+PGW-C sends an N4 session establishment/modification request to the UPF+PGW-U, where the N4 session establishment/modification request is used to request to establish the user plane tunnel corresponding to each of the at least one bearer, the N4 session establishment/modification request carries the uplink data packet transmission rule, and the uplink data transmission rule is used to indicate a user plane function network element (such as the UPF+PGW-U in FIG. 6A, FIG. 6B, and FIG. 6C) corresponding to the PDU session how to forward uplink data that is received through the user plane tunnel corresponding to the PDN connection. Correspondingly, the UPF+PGW-U receives the N4 session establishment/modification request from the SMF-PGW-C.

S604b. The UPF+PGW-U allocates the user plane tunnel information to each bearer based on the N4 session establishment/modification request received in S603b.

S605b. The UPF+PGW-U sends an N4 session establishment/modification response to the SMF+PGW-C, where the N4 session establishment/modification response carries the user plane tunnel information corresponding to each bearer. Correspondingly, the SMF+PGW-C receives the N4 session establishment/modification response from the UPF+PGW-U.

After S603a or S605b, the SMF-PGW-C stores the user plane tunnel information corresponding to each of the at least one bearer and the uplink data transmission rule into a bearer context corresponding to the PDN connection.

It should be further understood that, the user plane tunnel information corresponding to each bearer may include an identifier of the user plane tunnel corresponding to each bearer.

Optionally, the user plane tunnel information corresponding to each bearer may further include an IP address of the user plane tunnel corresponding to each bearer, or other information about the user plane tunnel corresponding to each bearer. This is not limited in this embodiment of this application.

It should be noted that, S606 is a process in which the SMF-PGW-C establishes a control plane tunnel corresponding to the PDN connection for the PDN connection.

It should be understood that, that the SMF+PGW-C establishes the control plane tunnel corresponding to the PDN connection for the PDN connection may be understood as that the SMF+PGW-C allocates, to the PDN connection, control plane tunnel information corresponding to the PDN connection.

S606. The SMF+PGW-C obtains the control plane tunnel information corresponding to the PDN connection.

After S606, the SMF-PGW-C stores the control plane tunnel information corresponding to the PDN connection into the bearer context corresponding to the PDN connection.

It should be understood that, the control plane tunnel corresponding to the PDN connection is used to transmit control signaling of the PDN connection to the UPF+PGW-U. In other words, a granularity of the control plane tunnel corresponding to the PDN connection is per PDN connection basis. Therefore, S606 is performed only in a session establishment phase, that is, S606 is not performed in a session modification phase.

It should be further understood that, the control plane tunnel information corresponding to the PDN connection may include an identifier of the control plane tunnel corresponding to the PDN connection.

Optionally, the control plane tunnel information corresponding to the PDN connection may further include an IP address of the control plane tunnel corresponding to the PDN connection, or other information about the control plane tunnel corresponding to the PDN connection. This is not limited in this embodiment of this application.

It should be noted that, S607 to S609 are a process in which the SMF+PGW-C obtains a bearer identifier corresponding to each of the at least one bearer.

S607. The SMF+PGW-C sends a bearer update request to the AMF, where the bearer update request is used to request the bearer identifier corresponding to each of the at least one bearer. Correspondingly, the AMF receives the bearer update request from the SMF+PGW-C.

S608. The AMF allocates the bearer identifier to each of the at least one bearer based on the bearer update request.

S609. The AMF sends a bearer update response to the SMF+PGW-C, where the bearer update response carries the bearer identifier corresponding to each of the at least one bearer. Correspondingly, the SMF+PGW-C receives the bearer update response from the AMF.

After S609, the SMF-PGW-C stores the bearer identifier of each of the at least one bearer into the bearer context corresponding to the PDN connection.

It should be understood that, the bearer identifier of each bearer may identify a user plane tunnel corresponding to the bearer.

Optionally, there is no sequence among the process of S603a to S605a (or S603b to S605b), the process of S606, and the process of S607 to S609. This is not limited in this embodiment of this application.

Based on the foregoing description, after S601a (or S601b) to S609, the bearer context corresponding to the PDN connection stored by the SMF+PGW-C may include the control plane tunnel information corresponding to the PDN connection, the user plane tunnel information corresponding to each of the at least one bearer, and the bearer identifier corresponding to each of the at least one bearer.

Optionally, the bearer context corresponding to the PDN connection may further include other information that is needed in the subsequent handover preparation phase and handover execution phase, for example, a QoS parameter of each bearer, where the QoS parameter of each bearer includes at least one of a QoS class identifier (QCI), an allocation retention priority (ARP), a packet filter, or a packet filter priority. This is not limited in this embodiment of this application.

2. Handover Preparation Phase

S610. The AMF receives a handover request from a source access network (such as a gNB in FIG. 6A, FIG. 6B, and FIG. 6C) of the first network, where the handover request carries information about a target access network (such as an Evolved Node B (eNB) in FIG. 6A, FIG. 6B, and FIG. 6C). Correspondingly, the source access network sends the handover request to the AMF.

S611. The AMF determines, based on the information about the target access network, that the terminal is to be handed over from the first network to the second network.

S612. The AMF sends a bearer context request to the SMF+PGW-C, where the bearer context request is used to request the bearer context corresponding to the PDN connection. Correspondingly, the SMF+PGW-C receives the bearer context request from the AMF.

S613. The SMF+PGW-C sends the bearer context corresponding to the PDN connection to the AMF based on the bearer context request. Correspondingly, the AMF receives the bearer context corresponding to the PDN connection from the SMF+PGW-C.

S614. The AMF sends the bearer context corresponding to the PDN connection to the MME in the second network. Correspondingly, the MME receives the bearer context corresponding to the PDN connection from the AMF.

S615. The MME obtains the tunnel information of the PDN connection from the bearer context corresponding to the PDN connection.

S616. The MME sends the tunnel information of the PDN connection to the SGW in the second network. Correspondingly, the SGW receives the tunnel information of the PDN connection from the MME.

It should be further understood that, the user plane tunnel and the control plane tunnel in the session establishment/modification phase and the handover preparation phase are an uplink user plane tunnel on the PGW-U+UPF and an uplink control plane tunnel on the PGW-C+SMF.

It should be noted that, after S610 to S616, an uplink tunnel from the SGW to the UPF+PGW-U has been established, and when the terminal is handed over from the source access network in the first network to the target access network in the second network, uplink data can be seamlessly switched to the uplink tunnel from the SGW to the UPF+PGW-U and be sent to a data network.

It should be understood that, the handover preparation phase in the method 600 is not limited to only the foregoing process, and may further include another process (for example, reference may be made to a process in a handover preparation phase in other approaches). This embodiment of this application is not limited thereto.

3. Handover Execution Phase

S617. When the terminal accesses the second network using the target access network, the target access network sends a handover notification to the MME, where the handover notification is used to notify that the terminal has been handed over from the first network to the second network. Correspondingly, the MME receives the handover notification.

S618. The MME sends a bearer modification request to the SGW, where the bearer modification request carries downlink tunnel information of the access network, and the downlink tunnel information of the access network includes downlink user plane tunnel information corresponding to each of the at least one bearer on the access network. Correspondingly, the SGW receives the bearer modification request from the MME.

S619. The SGW sends, based on the bearer modification request in S618, a bearer modification request to the SMF+PGW-C through the control plane tunnel corresponding to the PDN connection, where the bearer modification request carries downlink tunnel information of the SGW, and the downlink tunnel information of the SGW includes downlink user plane tunnel information corresponding to each of the at least one bearer on the SGW. Correspondingly, the SMF+PGW-C receives the bearer modification request from the SGW through the control plane tunnel corresponding to the PDN connection.

S620. The SMF+PGW-C determines, based on a message sent by the SGW, that the terminal has been handed over to the second network.

S621. The SMF+PGW-C sends an N4 session establishment/modification request to the UPF+PGW-U, where the N4 session establishment/modification request carries downlink tunnel information on the SGW and a downlink data transmission rule, and the downlink data transmission rule is used to indicate the user plane function network element corresponding to the PDU session to forward received downlink data to the SGW through a corresponding user plane tunnel. Correspondingly, the UPF+PGW-U receives the N4 session establishment/modification request from the SMF+PGW-C.

S622. The UPF+PGW-U sends an N4 session establishment/modification response to the SMF+PGW-C based on the N4 session establishment/modification request received in S621. Correspondingly, the SMF+PGW-C receives the N4 session establishment/modification response from the UPF+PGW-U.

Optionally, the third session management request may be carried in a second N4 session modification request that is sent by the S1VIF+PGW-C to the UPF+PGW-U through the N4 interface, and the third session management response may be carried in a second N4 session modification response that is sent by the UPF+PGW-U to the S1VIF+PGW-C through the N4 interface. This is not limited in this embodiment of this application.

In a possible implementation, the N4 session establishment/modification request in S621 may not carry the downlink data transmission rule, and the downlink data transmission rule may be carried in the N4 session establishment/modification request in S604a or S603b, and the N4 session establishment/modification request in S604a or S603b may further carry first rule indication information, where the first rule indication information is used to indicate not to enable the downlink data transmission rule.

Correspondingly, the N4 session establishment/modification request in S621 may carry second rule indication information, where the second rule indication information is used to indicate to enable the downlink data packet transmission rule. Additionally, the UPF+PGW-U enables the downlink data packet transmission rule according to the second rule indication information.

Based on the foregoing description, after S622, a downlink tunnel from the UPF+PGW-U to the SGW has been established, and after the terminal is handed over to the second network, downlink data in the data network may be switched to the user plane tunnel from the UPF+PGW-U to the SGW and be sent to the target access network.

Figure 7C:
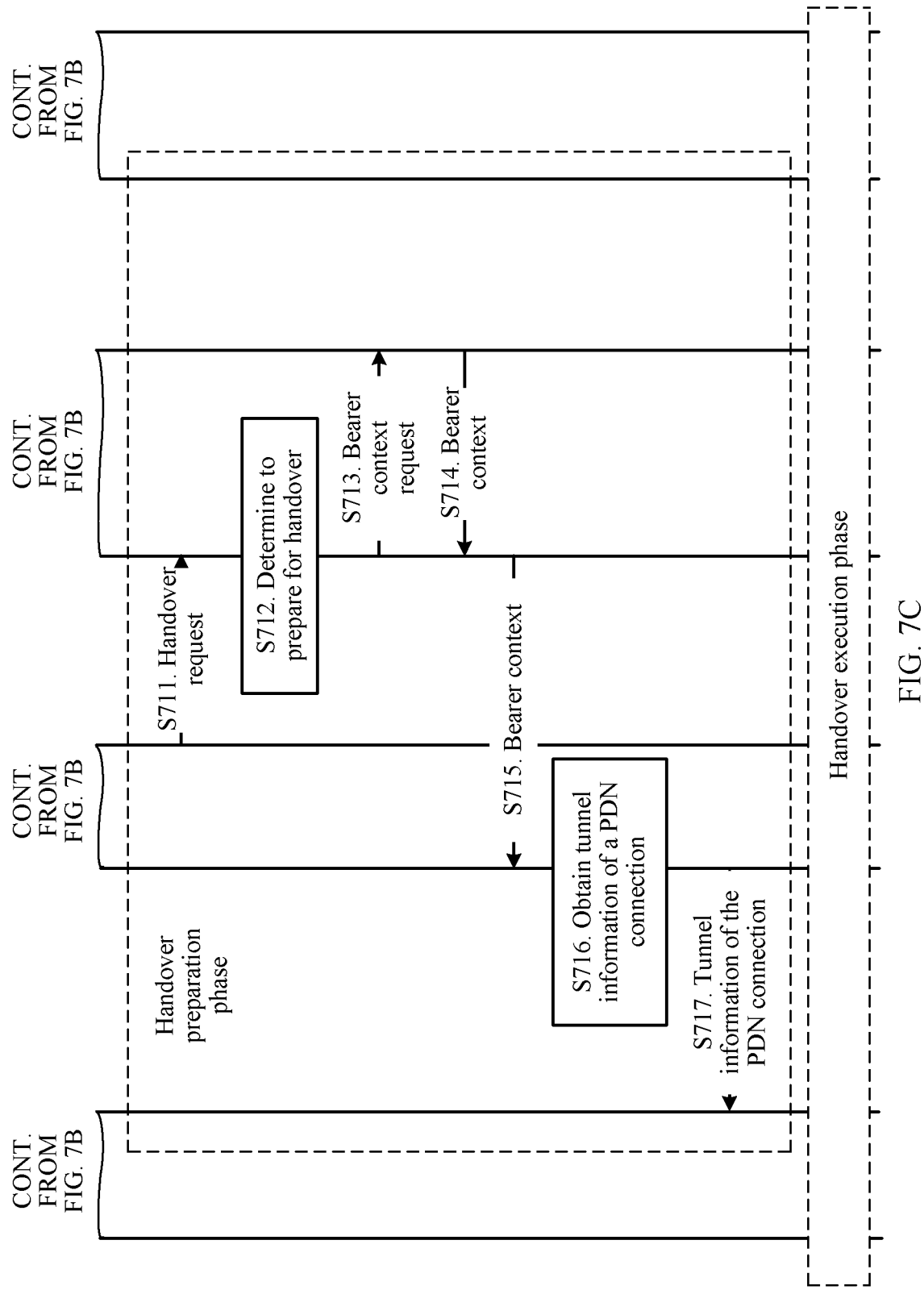

FIG. 7A, FIG. 7B, and FIG. 7C are a schematic flowchart of a handover method 700 according to an embodiment of this application. The method 700 may be applied to the system architecture in the roaming scenario shown in FIG. 2, or the method 700 may be applied to another similar architecture.

It should be understood that, the method 700 includes three phases in total: a session establishment/modification phase, a handover preparation phase, and a handover execution phase. The following describes the three phases in detail with reference to FIG. 7A, FIG. 7B, and FIG. 7C.

1. Session Establishment/Modification Phase

It should be noted that, S701 and S702 are a process in which the SMF+PGW-C determines at least one bearer that needs to be established when a PDU session of a terminal in a first network is to be switched to a PDN connection in a second network.

S701 and S702 are similar to S601 and S602.

It should be noted that, S703a to S705a or S703b to S705b are a process in which the SMF+PGW-C and the UPF+PGW-U establish a user plane tunnel corresponding to each of the at least one bearer.

S703a to S705a are similar to S603a to S605a.

S703b to S705b are similar to S603b to S605b.

After S703a or S705b, the SMF-PGW-C stores user plane tunnel information corresponding to each of the at least one bearer into a bearer context corresponding to the PDN connection.

It should be noted that, S706 is a process in which the SMF-PGW-C establishes a control plane tunnel corresponding to the PDN connection for the PDN connection.

S706 is similar to S606.

After S706, the SMF-PGW-C stores control plane tunnel information corresponding to the PDN connection into the bearer context corresponding to the PDN connection.

It should be understood that, the control plane tunnel corresponding to the PDN connection is used to transmit control signaling of the PDN connection to the UPF+PGW-U. In other words, a granularity of the control plane tunnel corresponding to the PDN connection is per PDN connection basis. Therefore, S706 is performed only in a session establishment phase, that is, S706 is not performed in a session modification phase.

It should be noted that, S707 to S709 are a process in which the SMF+PGW-C obtains a bearer identifier corresponding to each of the at least one bearer.

S707. The SMF+PGW-C sends a bearer update request to the AMF using the v-SMF, where the bearer update request is used to request the bearer identifier corresponding to each of the at least one bearer. Correspondingly, the AMF receives the bearer update request from the SMF+PGW-C using the v-SMF.

It should be understood that, in S707, the v-SMF provides only a message transferring function, that is, forwards, to the AMF, a message that is sent by the SMF+PGW-C to the AMF.

For example, the v-SMF may send, to a corresponding AMF based on an identifier of the terminal, a message that is sent by the SMF+PGW-C to the AMF, and send, to a corresponding SMF+PGW-C based on an identifier of the PDU session and the identifier of the terminal, a message that is sent by the AMF to the SMF+PGW-C.

S708 is similar to S608.

S709. The AMF sends a bearer update response to the SMF+PGW-C using the v-SMF, where the bearer update response carries the bearer identifier corresponding to each of the at least one bearer. Correspondingly, the SMF+PGW-C receives the bearer update response from the AMF using the v-SMF.

It should be understood that, in S709, the v-SMF provides only a message transferring function, that is, forwards, to the SMF+PGW-C, a message that is sent by the AMF to the SMF+PGW-C.

After S709, the SMF+PGW-C stores the bearer identifier of each of the at least one bearer into the bearer context corresponding to the PDN connection.

S710. The SMF+PGW-C sends, to the v-SMF, the bearer context corresponding to the PDN connection, where the bearer context corresponding to the PDN connection includes the control plane tunnel information corresponding to the PDN connection, the user plane tunnel information corresponding to each of the at least one bearer, and the bearer identifier corresponding to each of the at least one bearer.

After S710, the v-SMF stores the bearer context corresponding to the PDN connection.

Optionally, the control plane tunnel corresponding to the PDN connection is used to transmit control signaling of the PDN connection to the UPF+PGW-U. In other words, a granularity of the control plane tunnel corresponding to the PDN connection is per PDN connection basis. Therefore, the control plane tunnel corresponding to the PDN connection is included only in the bearer context corresponding to the PDN connection in S710 in the session establishment phase. In other words, the control plane tunnel corresponding to the PDN connection is not included in the bearer context corresponding to the PDN connection that is sent by the SMF+PGW-C to the v-SMF in S710 in the session modification phase. Actually, S710 in the session modification phase is an update of the bearer context corresponding to the PDN connection, to be more specific, the bearer context corresponding to the PDN connection includes a bearer identifier of a newly added bearer and corresponding user plane tunnel information.

Optionally, there is no sequence among the process of 703a to 705a (or 703b to 705b), the process of S706, and the process of S707 to S709. This is not limited in this embodiment of this application.

It should be noted that, if the process of 703a to 705a (or 703b to 705b) is performed prior to the process of S707 to S709, after the SMF+PGW-C receives a bearer identifier response in S709, if allocation of a bearer identifier requested by a specific bearer fails, the SMF+PGW-C sends a message to the PGW-U+UPF, to delete a user plane tunnel corresponding to the bearer.

Based on the foregoing description, after S701 to S710, the bearer context corresponding to the PDN connection stored by the v-SMF and the SMF-PGW-C may include the control plane tunnel information corresponding to the PDN connection, the user plane tunnel information corresponding to each of the at least one bearer, and the bearer identifier corresponding to each of the at least one bearer.

Optionally, the SMF+PGW-C may further send, to the v-SMF, other information that is needed in the subsequent handover preparation phase and handover execution phase, for example, a QoS parameter of each bearer, where the QoS parameter of each bearer includes at least one of a QoS class identifier (QCI), an allocation retention priority (ARP), a packet filter, or a packet filter priority. Correspondingly, the v-SMF receives the information from the SMF+PGW-C, and stores the information into the bearer context corresponding to the PDN connection. This is not limited in this embodiment of this application.

2. Handover Preparation Phase

S711 and S712 are similar to S610 and S611.

S713. The AMF sends a bearer context request to the v-SMF, where the bearer context request is used to request the bearer context corresponding to the PDN connection. Correspondingly, the v-SMF receives the bearer context request from the AMF.

S714. The v-SMF sends the bearer context corresponding to the PDN connection to the AMF based on the bearer context request. Correspondingly, the AMF receives the bearer context corresponding to the PDN connection from the v-SMF.

S715 to S717 are similar to S614 to S616.

It should be understood that, the handover preparation phase in the method 700 is not limited to only the foregoing process, and may further include another process (for example, reference may be made to a process in a handover preparation phase in other approaches). This embodiment of this application is not limited thereto.

3. Handover execution phase: This phase is the same as the handover execution phase in the method 600.

It should be noted that, the v-SMF in the method 700 has a function of transparently transmitting a message between the SMF+PGW-C and the AMF.

Figure 8A:
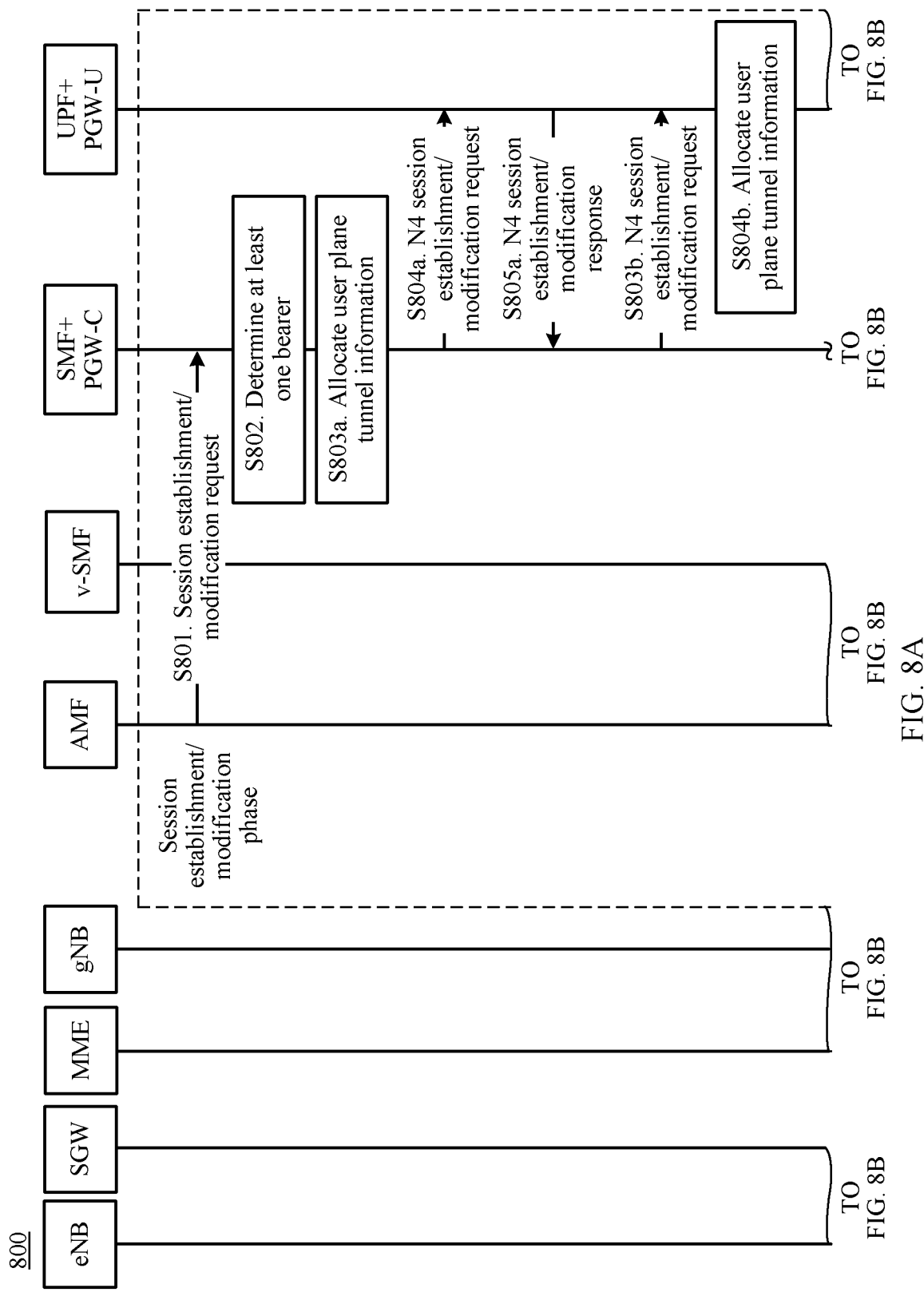
FIG. 8A and FIG. 8B are schematic flowcharts of still another handover method according to an embodiment of this application.
Figure 8B:
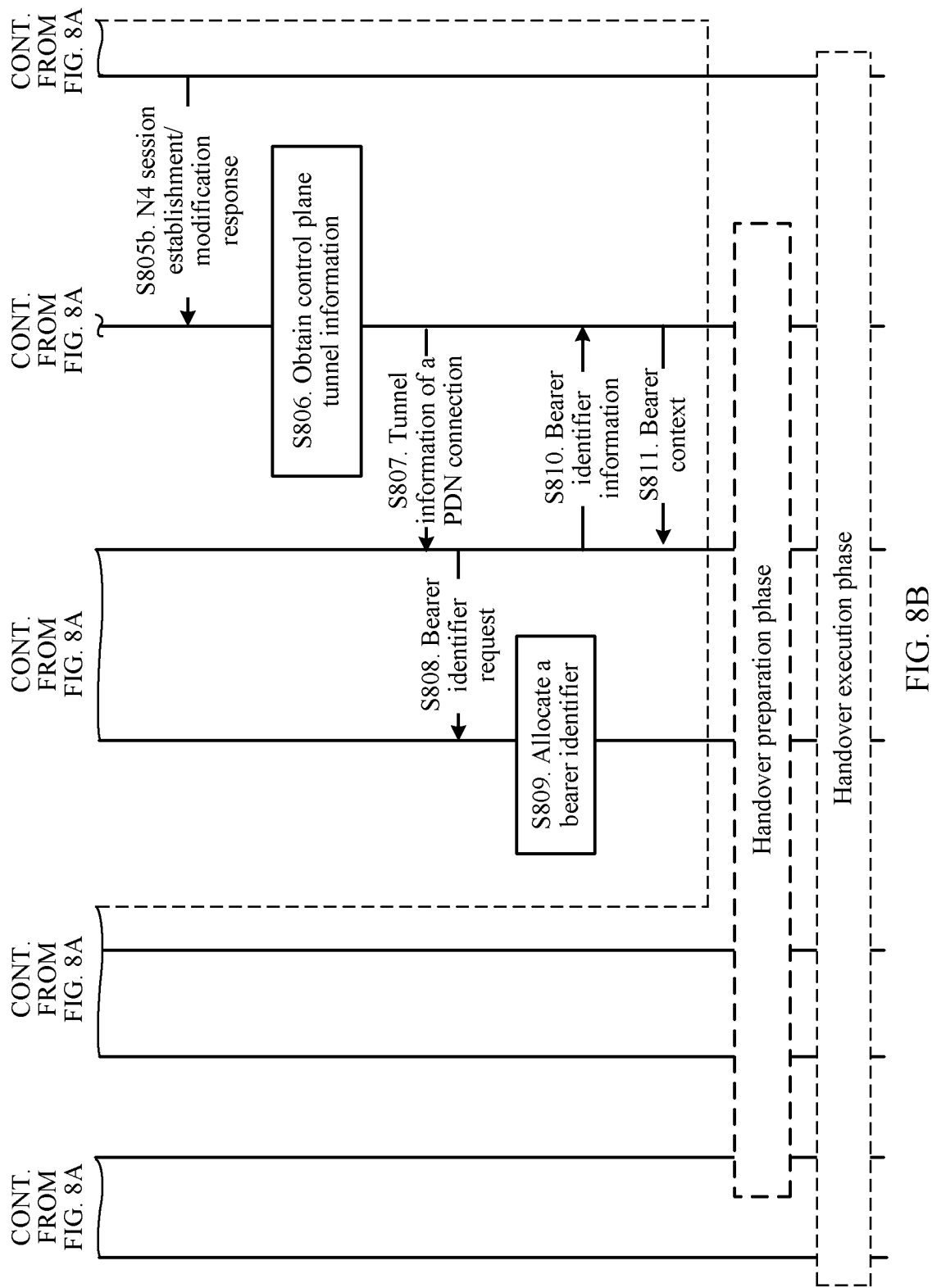

FIG. 8A and FIG. 8B are a schematic flowchart of a handover method 800 according to an embodiment of this application. The method 800 may be applied to the system architecture in the roaming scenario shown in FIG. 2, or the method 800 may be applied to another similar architecture.

It should be understood that, the first network may include a 5G network, and the second network may include a 4G network. This is not limited in this embodiment of this application.

It should be further understood that, the method 800 includes three phases in total: a session establishment/modification phase, a handover preparation phase, and a handover execution phase. The following describes the three phases in detail with reference to FIG. 8A and FIG. 8B.

1. Session Establishment/Modification Phase

It should be noted that, S801 and S802 are a process in which the SMF+PGW-C determines at least one bearer that needs to be established when a PDU session of a terminal in a first network is to be switched to a PDN connection in a second network.

S801 and S802 are similar to S601 and S602.

It should be noted that, S803a to S805a or S803b to S805b are a process in which the SMF+PGW-C and the UPF+PGW-U establish a user plane tunnel corresponding to each of the at least one bearer.

S803a to S805a are similar to S603a to S605a.

S803b to 8805b are similar to S603b to S605b.

After S803a or S805b, the SMF-PGW-C stores user plane tunnel information corresponding to each of the at least one bearer and an uplink data transmission rule into a bearer context corresponding to the PDN connection.

It should be noted that, S806 is a process in which the SMF-PGW-C establishes a control plane tunnel corresponding to the PDN connection for the PDN connection.

S806 is similar to S606.

After S806, the SMF-PGW-C stores control plane tunnel information corresponding to the PDN connection into the bearer context corresponding to the PDN connection.

It should be understood that, the control plane tunnel corresponding to the PDN connection is used to transmit control signaling of the PDN connection to the UPF+PGW-U. In other words, a granularity of the control plane tunnel corresponding to the PDN connection is per PDN connection basis. Therefore, S806 is performed only in a session establishment phase, that is, S806 is not performed in a session modification phase.

It should be noted that, S807 to S811 are a process in which the SMF+PGW-C obtains a bearer identifier corresponding to each of the at least one bearer.

S807. The SMF+PGW-C sends tunnel information of the PDN connection to the v-SMF, where the tunnel information of the PDN connection includes the control plane tunnel information corresponding to the PDN connection and the user plane tunnel information corresponding to each of the at least one bearer. Correspondingly, the v-SMF receives the tunnel information of the PDN connection from the SMF+PGW-C.

Optionally, the control plane tunnel corresponding to the PDN connection is used to transmit control signaling of the PDN connection to the UPF+PGW-U. In other words, a granularity of the control plane tunnel corresponding to the PDN connection is per PDN connection basis. Therefore, the control plane tunnel corresponding to the PDN connection is included in the bearer context corresponding to the PDN connection in S807 in the session establishment phase. In other words, the control plane tunnel corresponding to the PDN connection is not included in the tunnel information of the PDN connection sent by the SMF+PGW-C to the v-SMF in S807 in the session modification phase. Actually, S807 in the session modification phase is an update of the bearer context corresponding to the PDN connection, to be more specific, the tunnel information corresponding to the PDN connection includes a bearer identifier of a newly added bearer and corresponding user plane tunnel information.

After S807, the v-SMF stores the user plane tunnel information corresponding to each bearer and the control plane tunnel information corresponding to the PDN connection into the bearer context corresponding to the PDN connection.

S808. The v-SMF sends a bearer identifier request to the AMF based on the tunnel information of the PDN connection received in S807, where the bearer identifier request is used to request to allocate a bearer identifier to each of the at least one bearer. Correspondingly, the AMF receives the bearer identifier request from the v-SMF.

S809. The AMF allocates the bearer identifier to each of the at least one bearer based on the bearer identifier request.

S810. The AMF sends bearer identifier information to the v-SMF, where the bearer identifier information includes the bearer identifier corresponding to each of the at least one bearer. Correspondingly, the v-SMF receives the bearer identifier information from the AMF.

After S810, the v-SMF stores the bearer identifier of each bearer into the bearer context corresponding to the PDN connection.

It should be noted that, S811 is a process in which the SMF+PGW-C obtains the bearer identifier of each bearer.

S811. The v-SMF sends the bearer identifier information to the SMF-PGW-C. Correspondingly, the SMF+PGW-C receives the bearer identifier information from the v-SMF.

For example, the v-SMF sends both the bearer identifier corresponding to each bearer and the user plane tunnel information corresponding to each bearer to the SMF+PGW-C, such that the SMF+PGW-C associates the bearer identifier corresponding to each bearer with the user plane tunnel information.

After S811, the SMF-PGW-C stores the bearer identifier corresponding to each of the at least one bearer into the bearer context corresponding to the PDN connection.

Optionally, there is no sequence between the process of S803a to S805a (or S803b to S805b) and the process of S806. This is not limited in this embodiment of this application.

Based on the foregoing description, after S801 to S811, the bearer context corresponding to the PDN connection stored by the v-SMF and the SMF-PGW-C may include the control plane tunnel information corresponding to the PDN connection, the user plane tunnel information corresponding to each bearer, and the bearer identifier of each bearer. The bearer context corresponding to the PDN connection is used to hand over the terminal from the first network to the second network.

Optionally, the SMF+PGW-C may further send, to the v-SMF, other information that is needed in the subsequent handover preparation phase and handover execution phase, for example, a QoS parameter of each bearer, where the QoS parameter of each bearer includes at least one of a QoS class identifier (QCI), an allocation retention priority (ARP), a packet filter, or a packet filter priority. Correspondingly, the v-SMF receives the information from the SMF+PGW-C, and stores the information into the bearer context corresponding to the PDN connection. This is not limited in this embodiment of this application.

2. Handover preparation phase: This phase is the same as the handover preparation phase in the method 700.

3. Handover execution phase: This phase is the same as the handover execution phase in FIG. 6A, FIG. 6B, and FIG. 6C.

It should be noted that, the v-SMF in the method 800 has a processing function.

For example, the v-SMF may check whether a bearer identifier associated with the user plane tunnel information corresponding to each bearer exists in the tunnel information of the PDN connection. If no bearer identifier is allocated to the at least one bearer, the v-SMF requests the AMF to allocate the bearer identifier to each of the at least one bearer.

The foregoing describes, with reference to FIG. 6A to FIG. 8B, the handover methods provided in the embodiments of this application, where the SMF-PGW-C or the v-SMF obtains the tunnel information of the PDN connection in the session establishment/modification phase. The following describes, with reference to FIG. 9A to FIG. 11B, a case in which the SMF-PGW-C or the v-SMF obtains the tunnel information of the PDN connection in the handover preparation phase.

Figure 9A:
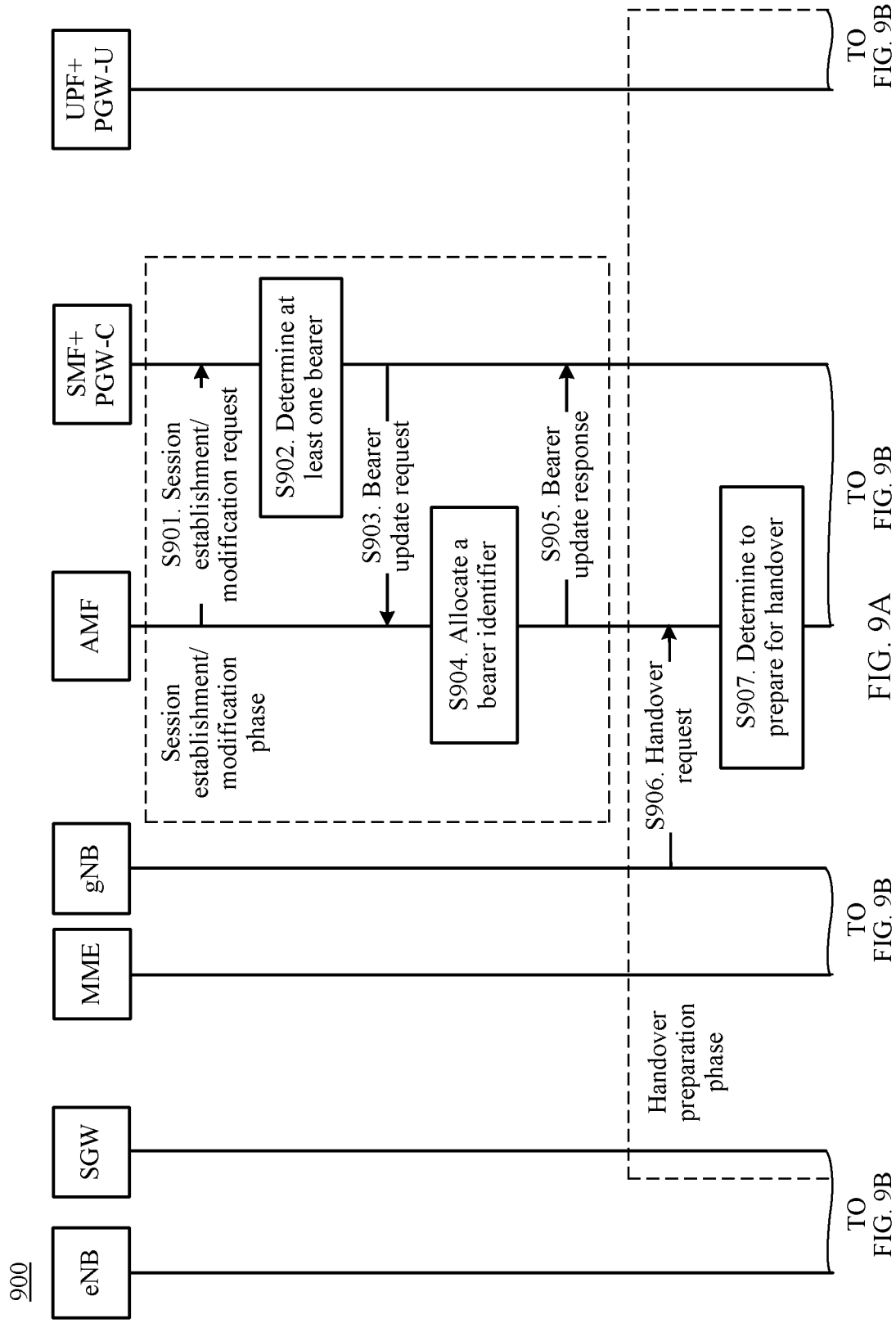
Figure 9C:
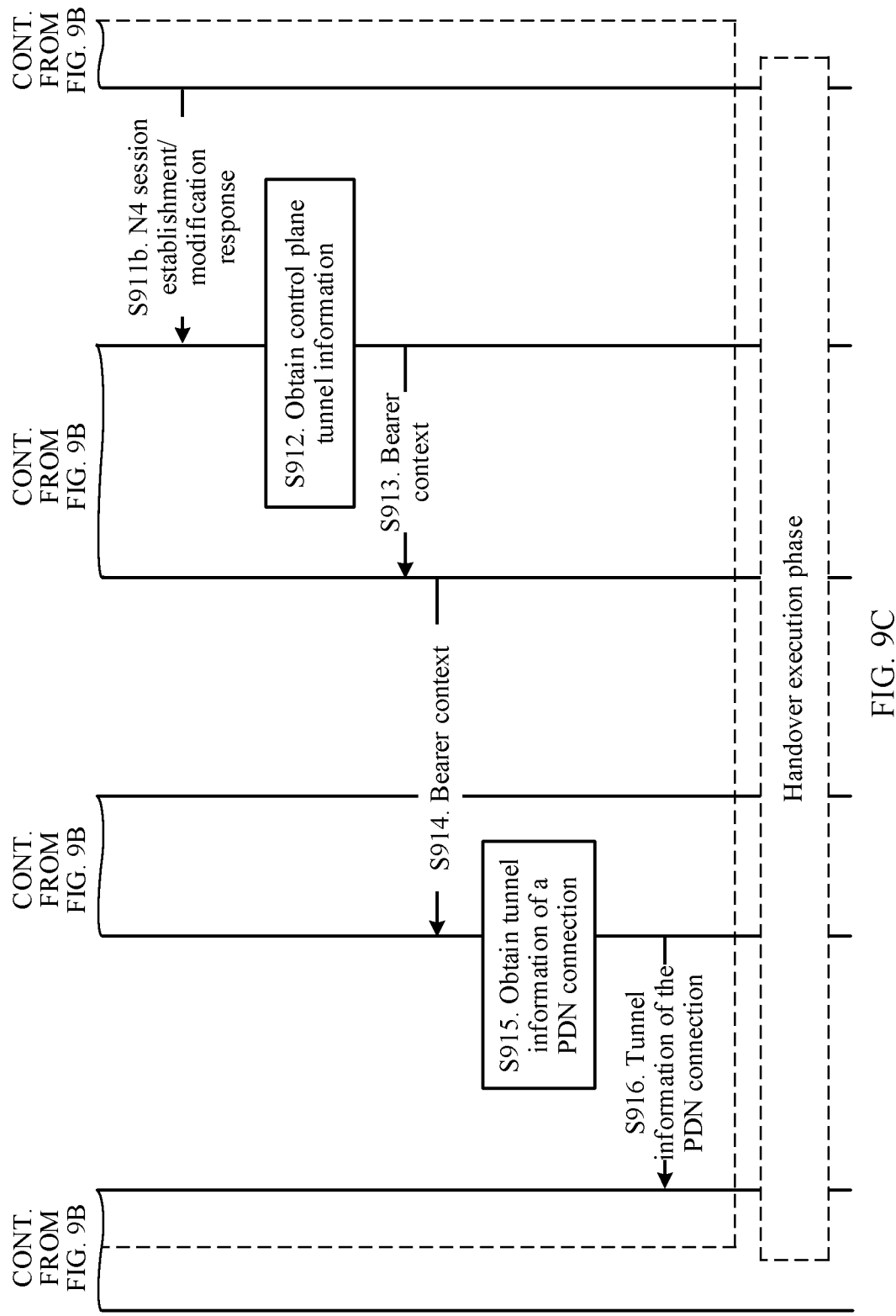

FIG. 9A, FIG. 9B, and FIG. 9C are schematic flowcharts of a handover method 900 according to an embodiment of this application. The method 900 may be applied to the system architecture in the non-roaming scenario shown in FIG. 1, or the method 900 may be applied to another similar architecture.

It should be understood that, the first network may include a 5G network, and the second network may include a 4G network. This is not limited in this embodiment of this application.

It should be further understood that, the method 900 includes three phases in total: a session establishment/modification phase, a handover preparation phase, and a handover execution phase. The following describes the three phases in detail.

1. Session Modification Phase

It should be noted that, S901 and S902 are a process in which the SMF+PGW-C determines at least one bearer that needs to be established when a PDU session of a terminal in a first network is to be switched to a PDN connection in a second network.

S901 and S902 are similar to S601 and S602.

It should be noted that, S903 to S905 are a process in which the SMF+PGW-C obtains a bearer identifier corresponding to each of the at least one bearer.

S903 to S905 are similar to S607 to S609.

After S905, the SMF-PGW-C stores a bearer identifier corresponding to each bearer into a bearer context corresponding to the PDN connection.

Based on the foregoing description, after S905, the bearer context corresponding to the PDN connection stored by the SMF+PGW-C may include the bearer identifier corresponding to each bearer.

2. Handover Preparation Phase

It should be understood that, S906 to S908 are similar to S610 to S612. Details are not described herein again.

It should be noted that, S909a to S911a or S909b to S911b are a process in which the SMF+PGW-C and the UPF+PGW-U establish a user plane tunnel corresponding to each bearer.

It should be understood that, S909a to S911a are similar to S603a to S605a, and S909b to S911b are similar to S603b to S605b. Details are not described herein again.

After S909a or S911b, the SMF-PGW-C stores user plane tunnel information corresponding to each bearer into the bearer context corresponding to the PDN connection.

It should be noted that, S912 is a process in which the SMF-PGW-C establishes a control plane tunnel corresponding to the PDN connection for the PDN connection.

It should be understood that, S912 is the same as S606.

After S912, the SMF-PGW-C stores control plane tunnel information corresponding to the PDN connection into the bearer context corresponding to the PDN connection.

It should be understood that, subsequent S913 to S916 are similar to S613 to S616. Details are not described herein again.

Based on the foregoing description, after S916, an uplink tunnel from the SGW to the UPF+PGW-U has been established, and when the terminal is handed over from a source access network in the first network to a target access network in the second network, uplink data can be seamlessly switched to the uplink tunnel from the SGW to the UPF+PGW-U and be sent to a data network.

3. Handover execution phase: This phase is the same as the handover execution phase in FIG. 6A, FIG. 6B, and FIG. 6C.

Figure 10A:
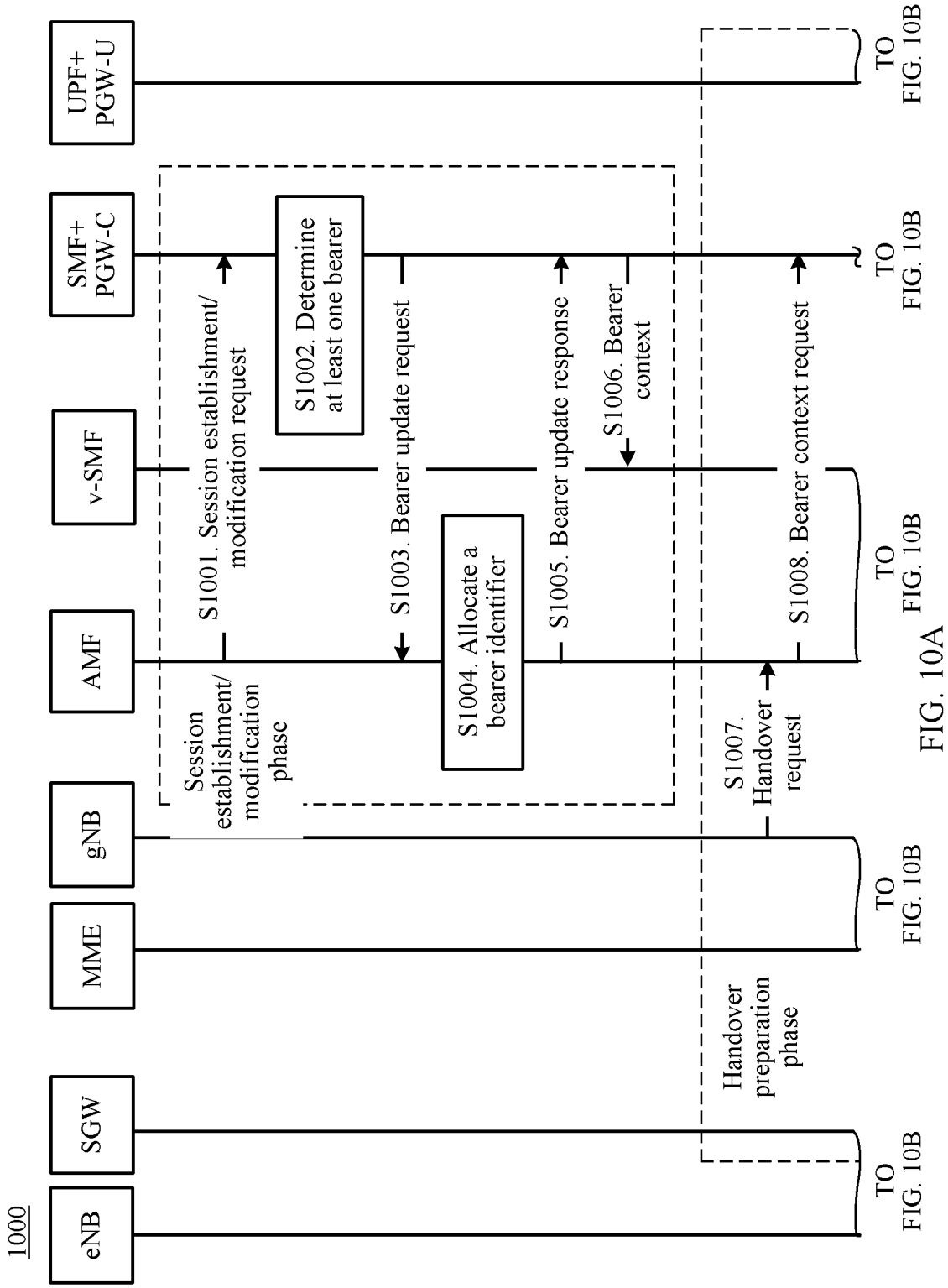
Figure 10C:
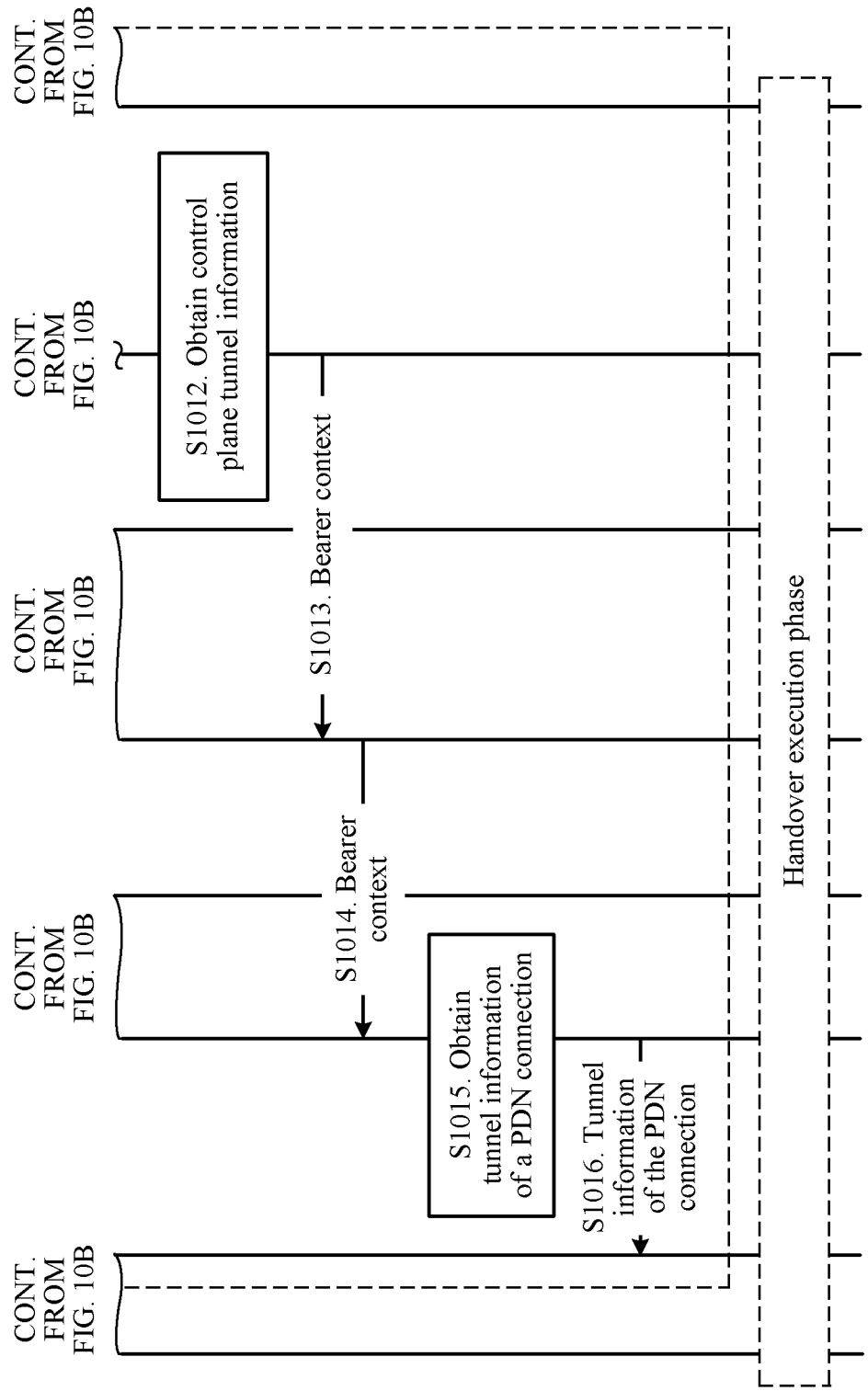

FIG. 10A, FIG. 10B, and FIG. 10C are schematic flowcharts of a handover method 1000 according to an embodiment of this application. The method 1000 may be applied to the system architecture in the roaming scenario shown in FIG. 2, or the method 1000 may be applied to another similar architecture.

It should be understood that, the first network may include a 5G network, and the second network may include a 4G network. This is not limited in this embodiment of this application.

It should be further understood that, the method 1000 includes three phases in total: a session establishment/modification phase, a handover preparation phase, and a handover execution phase. The following describes the three phases in detail.

1. Session Establishment/Modification Phase

It should be noted that, S1001 and S1002 are a process in which the SMF+PGW-C determines at least one bearer that needs to be established when a PDU session of a terminal in a first network is to be switched to a PDN connection in a second network.

S1001 and S1002 are similar to S601 and S602.

It should be noted that, S1003 to S1005 are a process in which the PGW-C+SMF obtains a bearer identifier corresponding to each bearer.

S1003 to S1005 are similar to S707 to S709.

After S1005, the SMF-PGW-C stores the bearer identifier corresponding to each bearer into a bearer context corresponding to the PDN connection.

2. Handover Preparation Phase

It should be understood that, S1006 and S1007 are similar to S610 and S611. Details are not described herein again.

S1008. The AMF sends a bearer context request to the SMF+PGW-C using the v-SMF, where the bearer context request is used to request the bearer context corresponding to the PDN connection. Correspondingly, the SMF+PGW-C receives the bearer context request from the AMF using the v-SMF.

It should be understood that, in S1008, the v-SMF provides only a message transferring function, that is, forwards, to the SMF+PGW-C, a message that is sent by the AMF to the SMF+PGW-C.

It should be noted that, S1009a to S1011a or S1009b to S1011b are a process in which the SMF+PGW-C and the UPF+PGW-U establish a user plane tunnel corresponding to each bearer.

It should be understood that, S1009a to S101 la are similar to S603a to S605a, and S1009b to S1011b are similar to S603b to S605b. Details are not described herein again.

After S1009a or S10010b, the SMF-PGW-C stores user plane tunnel information corresponding to each bearer into the bearer context corresponding to the PDN connection.

It should be noted that, S1012 is a process in which the SMF-PGW-C establishes a control plane tunnel corresponding to the PDN connection for the PDN connection.

After S1012, the SMF-PGW-C stores control plane tunnel information corresponding to the PDN connection into the bearer context corresponding to the PDN connection.

S1013. The SMF+PGW-C sends the bearer context corresponding to the PDN connection to the AMF using the v-SMF. Correspondingly, the AMF receives the bearer context corresponding to the PDN connection from the SMF+PGW-C. It should be understood that, in S1013, the v-SMF provides only a message transferring function, that is, forwards, to the AMF, a message that is sent by the SMF+PGW-C to the AMF.

It should be understood that, subsequent S1014 to S1016 are similar to S614 to S616. Details are not described herein again.

Based on the foregoing description, after S1016, an uplink tunnel from the SGW to the UPF+PGW-U has been established, and when the terminal is handed over from a source access network in the first network to a target access network in the second network, uplink data can be seamlessly switched to the uplink tunnel from the SGW to the UPF+PGW-U and be sent to a data network.

3. Handover execution phase: This phase is the same as the handover execution phase in FIG. 6A, FIG. 6B, and FIG. 6C.

The foregoing describes, with reference to FIG. 6A to FIG. 10C, a process in which the terminal is handed over from the 5G network to the 4G network, and the following describes, with reference to FIG. 11A, FIG. 11B, FIG. 12A, FIG. 12B, and FIG. 12C, a process in which the terminal is handed over from the 4G network to the 5G network.

Figure 11A:
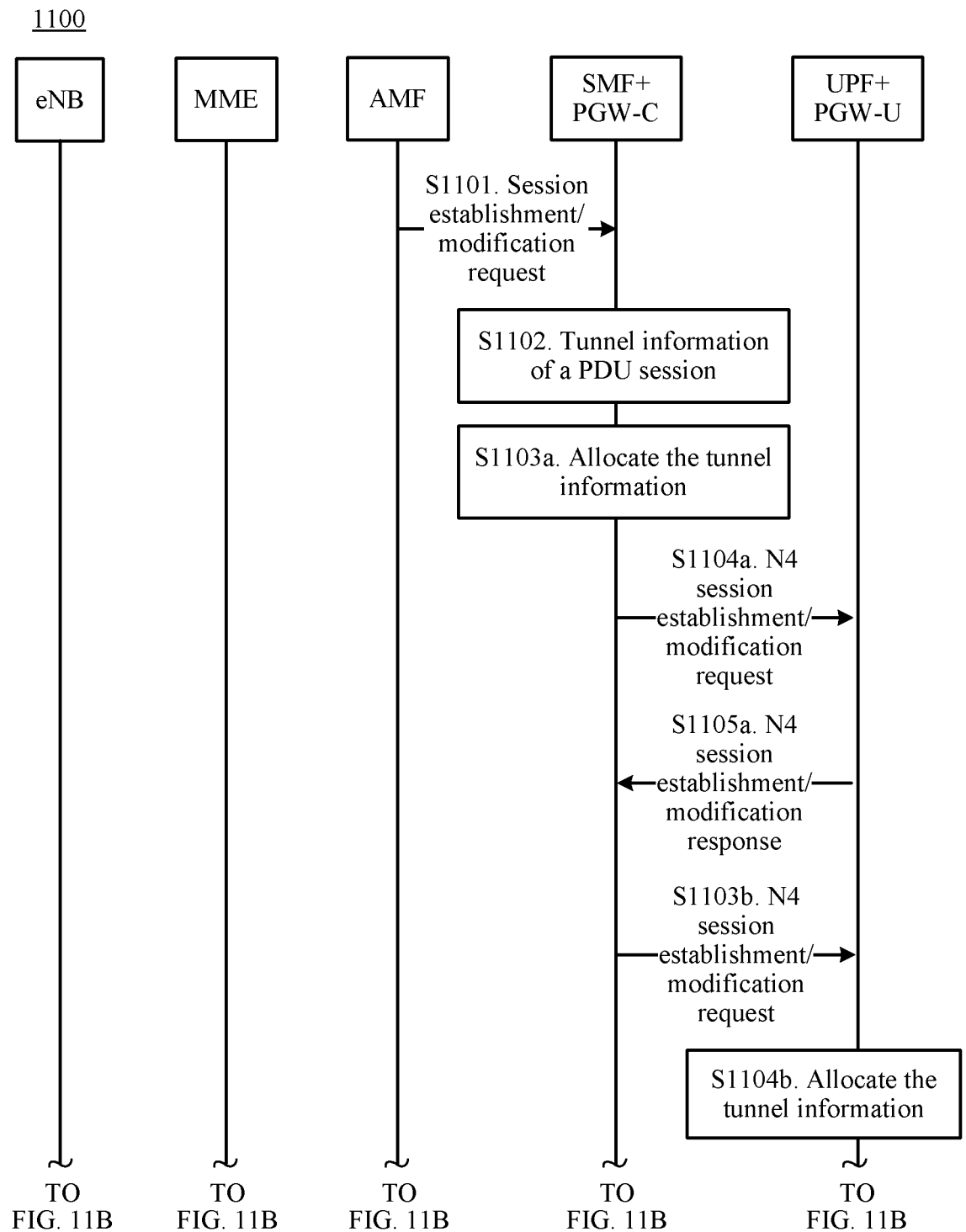
FIG. 11A and FIG. 11B are schematic flowcharts of still another handover method according to an embodiment of this application.
Figure 11B:
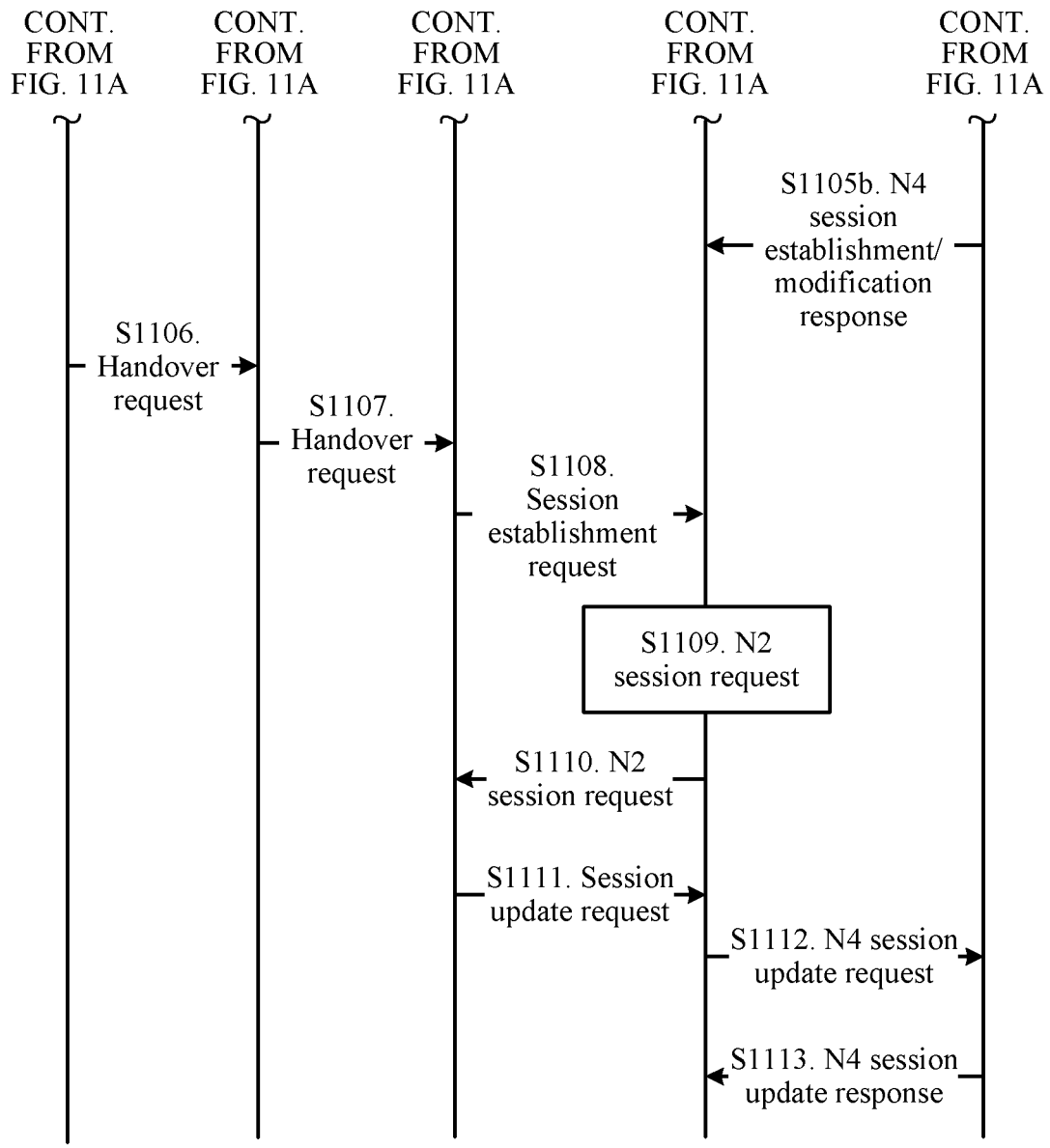

FIG. 11A and FIG. 11B are schematic flowcharts of a handover method 1100 according to an embodiment of this application. The method 1100 may be applied to the system architecture in the non-roaming scenario shown in FIG. 1, or the method 1100 may be applied to another similar architecture.

It should be understood that, the first network may include a 5G network, and the second network may include a 4G network. This is not limited in this embodiment of this application.

It should be further understood that, there is no control plane tunnel corresponding to a PDU session in the first network. Therefore, in this embodiment of this application, a tunnel corresponding to the PDU session is a user plane tunnel corresponding to the PDU session, and tunnel information corresponding to the PDU session is user plane tunnel information corresponding to the PDU session.

S1101. The SMF+PGW-C receives a session establishment/modification request from the AMF, where the session establishment/modification request is used to request to establish a PDN connection in the second network or trigger modification of the PDN connection in the second network. Correspondingly, the AMF sends the session establishment/modification request to the SMF+PGW-C.

S1102. The SMF+PGW-C obtains, based on the first request message, tunnel information of the PDU session when the PDN connection of the terminal in the second network is to be switched to the PDU session in the first network.

It should be noted that, S1103a to S1105a or S1103b to S1105b are a process in which the SMF+PGW-C and the UPF+PGW-U establish a tunnel for the PDU session.

Optionally, tunnel information corresponding to the PDU session may be allocated by the SMF+PGW-C or the UPF+PGW-U. This is not limited in this embodiment of this application.

If the SMF+PGW-C allocates the tunnel information, S1103a to S1105a are performed. If the UPF+PGW-U allocates the tunnel information, S1103b to S1105b are performed.

(1) The SMF+PGW-C allocates the tunnel information to the PDU session.

S1103a. The SMF+PGW-C allocates user plane tunnel information to the PDU session.

S1104a. The SMF+PGW-C sends an N4 session establishment/modification request to the UPF+PGW-U, where the N4 session establishment/modification request is used to request to establish the tunnel corresponding to the PDU session, the N4 session establishment/modification request carries the tunnel information of the PDU session and an uplink data transmission rule, and the uplink data transmission rule is used to indicate a user plane function network element corresponding to the PDN connection how to forward uplink data that is received through the user plane tunnel corresponding to the PDU session. Correspondingly, the UPF+PGW-U receives the N4 session establishment/modification request from the SMF+PGW-C.

S1105a. The UPF+PGW-U sends an N4 session establishment/modification response to the SMF+PGW-C based on the N4 session establishment/modification request received in S1104a. Correspondingly, the SMF+PGW-C receives the N4 session establishment/modification response from the UPF+PGW-U.

(2) The UPF+PGW-U allocates the tunnel information to the PDU session.

S1103b. The SMF+PGW-C sends an N4 session establishment/modification request to the UPF+PGW-U, where the N4 session establishment/modification request is used to request to establish the tunnel corresponding to the PDU session, the N4 session establishment/modification request carries the tunnel information of the PDU session and an uplink data transmission rule, and the uplink data transmission rule is used to indicate a user plane function network element corresponding to the PDN connection how to forward uplink data that is received through the user plane tunnel corresponding to the PDU session. Correspondingly, the UPF+PGW-U receives the N4 session establishment/modification request from the SMF-PGW-C.

S1104b. The UPF+PGW-U allocates the tunnel information to the PDU session based on the N4 session establishment/modification request received in S1103b.

S1105b. The UPF+PGW-U sends an N4 session establishment/modification response to the SMF+PGW-C, where the N4 session establishment/modification response carries the tunnel information corresponding to the PDU session. Correspondingly, the SMF+PGW-C receives the N4 session establishment/modification response from the UPF+PGW-U.

After S1105b, the SMF+PGW-C stores the tunnel information corresponding to the PDU session.

Optionally, the SMF+PGW-C or the UPF+PGW-U may use a tunnel corresponding to one bearer in the second network as the tunnel corresponding to the PDU session in the first network, for example, use a tunnel of a default bearer as the tunnel corresponding to the PDU session. In this case, uplink tunnel information allocated by the SMF+PGW-C to the PDU session is tunnel information of a user plane tunnel corresponding to the default bearer on the PGW-U+UPF. Alternatively, the SMF+PGW-C may allocate new uplink tunnel information to the PDU session in the first network.

This embodiment of this application provides the following possible implementations:

In an optional manner 1, only S1103a is performed, and S1104a and S1105a are not performed.

In an optional manner 2, S1103a to S1105a are performed.

In an optional manner 3, S1103b to S1105b are performed.

In an optional manner 4, neither S1103a to 1105a nor S1103b to 1105b are performed.

For example, the SMF+PGW-C determines the uplink data transmission rule based on traffic filter template (TFT) information of each bearer of the PDN connection, where a TFT includes a packet filter of a data flow supported by a bearer.

S1106. A source access network (such as an eNB in FIG. 11A and FIG. 11B) in the second network sends a handover request to the MME in the second network, where the handover request carries information about a target access network (such as a gNB in the first network). Correspondingly, the MME receives the handover request from the source access network.

It should be understood that, the access network in this embodiment of this application may be, for example, a base station.

S1107. The MME selects an AMF based on the information about the target access network, and sends a handover request to the AMF, where the handover request carries an EPS bearer context. Correspondingly, the AMF receives the handover request from the MME.

S1108. The AMF sends a session establishment request to an S1VIF+PGW-C corresponding to each PDN connection in the EPS bearer context, where the session establishment request carries a default bearer identifier corresponding to the PDN connection. Correspondingly, the SMF+PGW-C receives the session establishment request from the AMF.

In a possible implementation, the default bearer identifier carried in the session establishment request in S1108 may be used to indicate the SMF+PGW-C to prepare for handing over the terminal from the second network to the first network.

In another possible implementation, the session establishment request in S1108 may further carry first indication information, where the first indication information is used to indicate the SMF+PGW-C to prepare for handing over the terminal from the second network to the first network, and the first indication information may be, for example, at least one bit.

If the manner 1 is used, S1104a and S1105a are performed after S1108.

If the manner 4 is used, the manner 2 or the manner 3 is performed after S1108.

S1109. The SMF+PGW-C queries a session context based on the default bearer identifier, and generates an N2 session request based on information in the session context, where the N2 session request includes an identifier of the PDU session, an S-NSSAI corresponding to the PDU session, a session AMBR, and information about each QoS flow in the PDU session.

Optionally, the N2 session request message further includes the uplink tunnel information of the PDU session on the UPF+PGW-U.

S1110. The SMF+PGW-C sends the N2 session request to the AMF. Correspondingly, the AMF receives the N2 session request from the SMF+PGW-C.

Optionally, after S1110, the AMF may indicate the target access network to prepare for handing over the terminal from the second network to the first network, for example, indicate the target access network to allocate a radio resource, and allocate tunnel information of the access network (such as a downlink tunnel of the access network) to a to-be-switched session.

S1111. After the terminal accesses the target access network, the AMF sends a session update request to the SMF+PGW-C, where the session update request carries received downlink tunnel information corresponding to the access network. Correspondingly, the SMF+PGW-C receives the session update request from the AMF.

Optionally, the session update request carries third indication information, where the third indication information is used to indicate the SMF+PGW-C to switch a path to the first network, for example, the PGW-U+UPF is switched to send downlink data using the access network in the first network.

S1112. The SMF+PGW-C sends an N4 session update request to the UPF+PGW-U, where the N4 session update request carries a downlink forwarding rule and the downlink tunnel information of the target access network, where the downlink data transmission rule is used to indicate to send, through the user plane tunnel corresponding to the PDU session, a downlink data packet received by the user plane function network element corresponding to the PDN connection. Correspondingly, the UPF+PGW-U receives the N4 session update request from the SMF+PGW-C.

S1113. The UPF+PGW-U sends an N4 session update response to the SMF+PGW-C.

In a possible implementation, the N4 session update request in S1112 may not carry the downlink data transmission rule, the downlink data transmission rule may be carried in the N4 session establishment/modification request in S1104a or S1103b, and the N4 session establishment/modification request in S1104a or S1103b further carries first rule indication information, where the first rule indication information is used to indicate not to enable the downlink data transmission rule.

Correspondingly, the N4 session update request in S1112 may carry second rule indication information, where the second rule indication information is used to indicate to enable the downlink data packet transmission rule. Additionally, the UPF+PGW-U enables the downlink data packet transmission rule according to the second rule indication information.

Figure 12B:
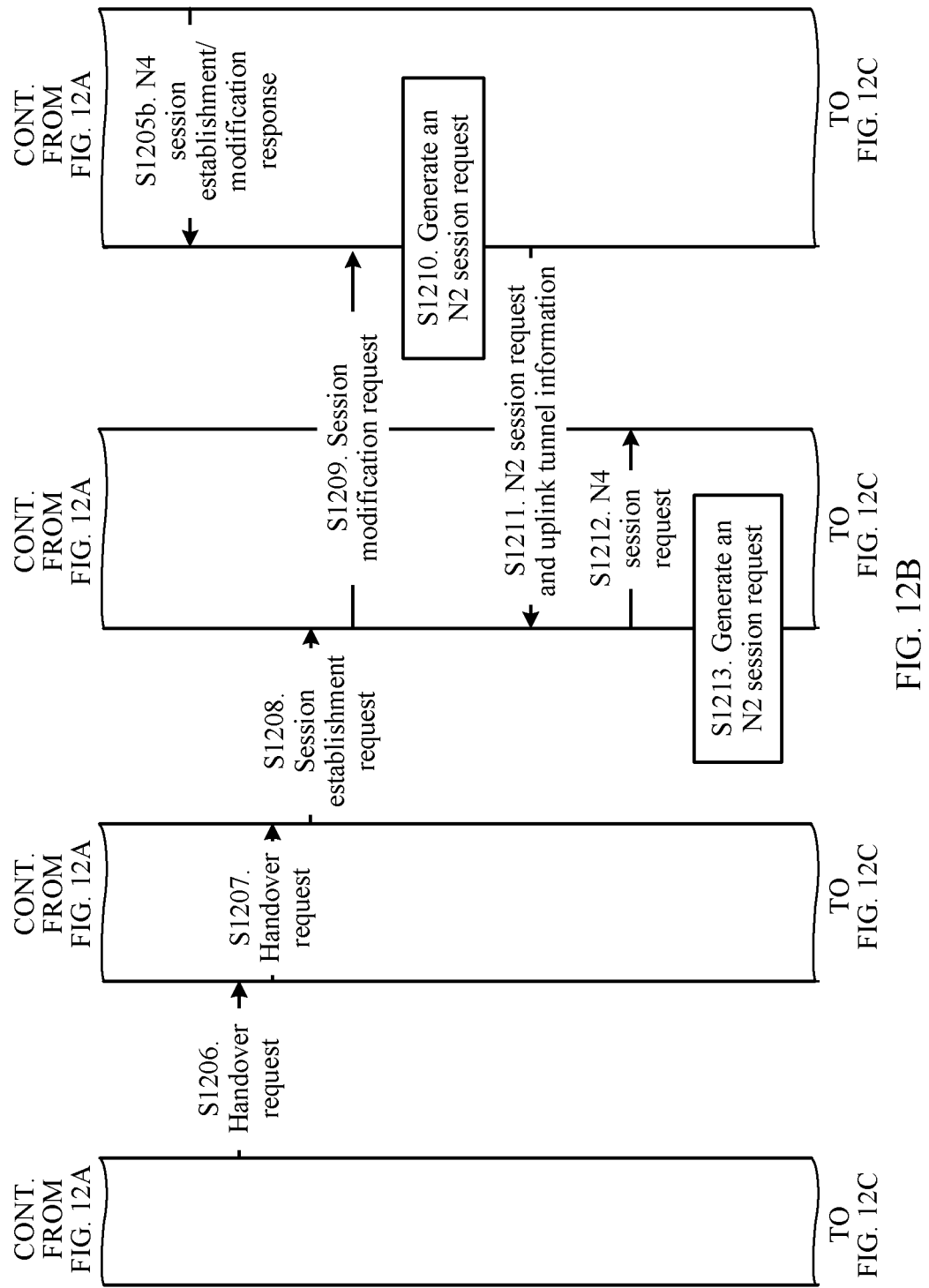
Figure 12C:
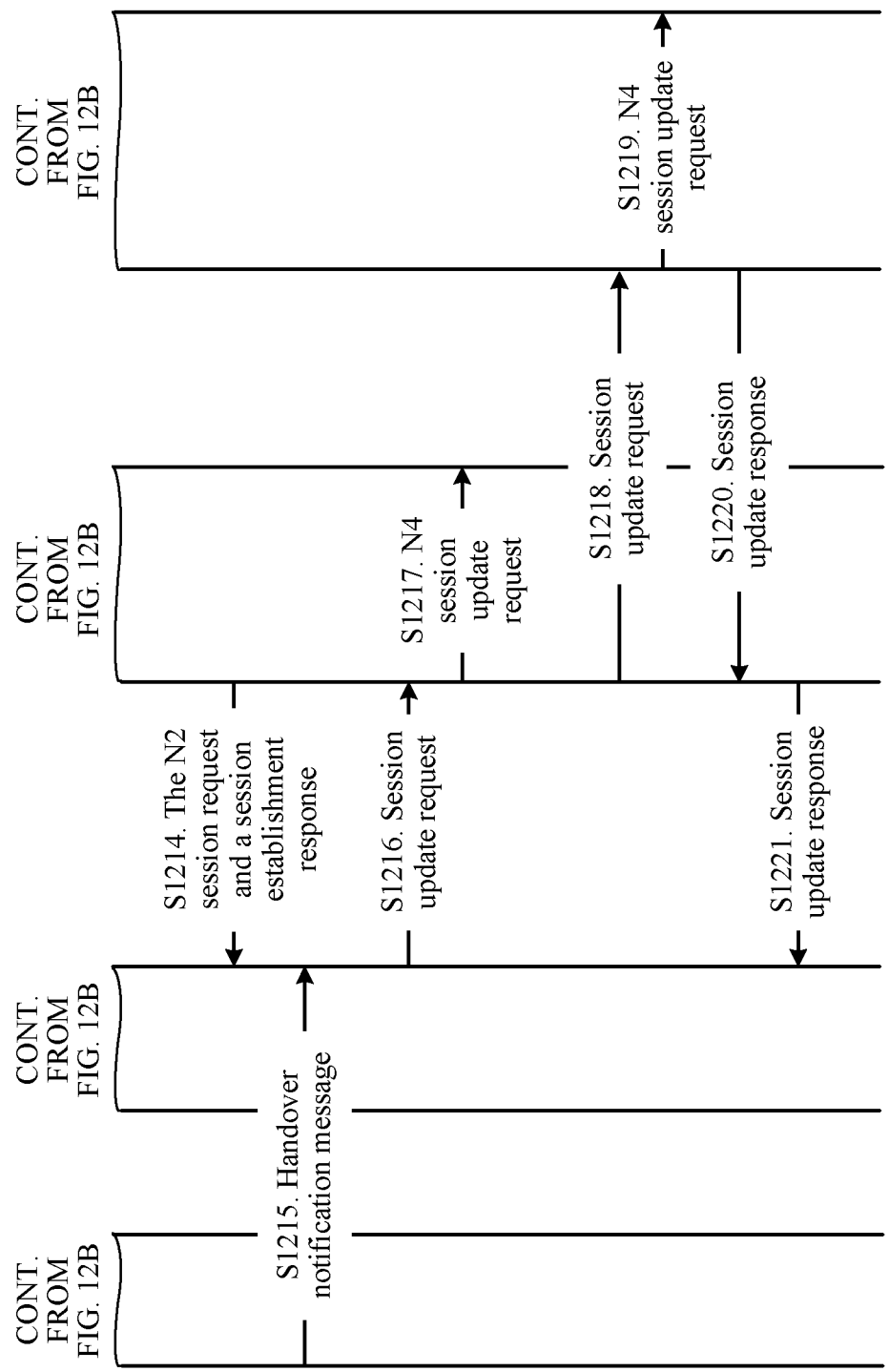

FIG. 12A, FIG. 12B, and FIG. 12C are schematic flowcharts of a handover method 1200 according to an embodiment of this application. The method 1200 may be applied to the system architecture in the roaming scenario shown in FIG. 2, or the method 1200 may be applied to another similar architecture.

It should be understood that, the first network may include a 5G network, and the second network may include a 4G network. This is not limited in this embodiment of this application.

It should be further understood that, there is no control plane tunnel corresponding to a PDU session in the first network. Therefore, in this embodiment of this application, a tunnel corresponding to the PDU session is a user plane tunnel corresponding to the PDU session, and tunnel information corresponding to the PDU session is user plane tunnel information corresponding to the PDU session.

S1201 and S1202 are similar to S1101 and S1102.
S1203a to S1205a are similar to S1103a to S1105a.
S1203b to S1205b are similar to S1103b to S1105b.

This embodiment of this application provides the following possible implementations:

In an optional manner 1, only S1203a is performed, and S1204a and S1205a are not performed.

In an optional manner 2, S1203a to S1205a are performed.

In an optional manner 3, S1203b to S1205b are performed.

In an optional manner 4, neither S1203a to 1205a nor S1203b to 1205b are performed.

S1206. A source access network (such as an eNB in FIG. 12A, FIG. 12B, and FIG. 12C) in the second network sends a handover request to the MME in the second network, where the handover request carries information about a target access network (such as a gNB in the first network). Correspondingly, the MME receives the handover request from the source access network.

It should be understood that, the access network in this embodiment of this application may be, for example, a base station.

S1207 is similar to S1107.

S1208. The AMF selects a v-SMF, and sends a session establishment request to the v-SMF, where the session establishment request carries a default bearer identifier corresponding to the PDN connection and an identifier of an SMF+PGW-C corresponding to the PDN connection in an EPS bearer context. Correspondingly, the v-SMF receives the session establishment request from the AMF.

Optionally, the session establishment request carries fourth indication information, where the fourth indication information is used to indicate to prepare for handing over the terminal from the second network to the first network.

Optionally, the fourth indication information may be the default bearer identifier.

Optionally, the fourth session management request carries the default bearer identifier and the fourth indication information, where the fourth indication information is used to indicate to prepare for handing over the terminal from the second network to the first network, and the fourth indication information may be at least one bit.

S1209. The v-SMF sends a session modification request to the SMF+PGW-C based on the identifier of the SMF+PGW-C, where the session modification request carries the default bearer identifier corresponding to the PDN connection. Correspondingly, the SMF+PGW-C receives the session modification request from the v-SMF.

In a possible implementation, the default bearer identifier carried in the session modification request in S1209 may be used to indicate the SMF+PGW-C to prepare for handing over the terminal from the second network to the first network.

In another possible implementation, the session modification request in S1209 may further carry first indication information, where the first indication information is used to indicate the SMF+PGW-C to prepare for handing over the terminal from the second network to the first network, and the first indication information may be, for example, at least one bit.

If the manner 1 is used, S1204a and S1205a are performed after S1209.

If the manner 4 is used, the manner 2 or the manner 3 is performed after S1209.

S1210. The SMF+PGW-C queries a session context based on the default bearer identifier, and generates an N2 session request based on information in the session context, where the N2 session request includes an identifier of the PDU session, an S-NSSAI corresponding to the PDU session, a session AMBR, and information about each QoS flow in the PDU session.

S1211. The SMF+PGW-C sends, to the v-SMF, the N2 session request received in S1210 and uplink tunnel information of the PDU session on the UPF+PGW-U. Correspondingly, the v-SMF receives, from the SMF+PGW-C, the N2 session request received in S1210 and the uplink tunnel information of the PDU session on the UPF+PGW-U.

S1212. The v-SMF allocates a v-UPF, and sends an N4 session request to the v-UPF, where the N4 session request carries the uplink tunnel information of the PDU session on the UPF+PGW-U. Correspondingly, the v-UPF receives the N4 session request from the v-SMF.

Optionally, after S1212, a corresponding uplink tunnel from the v-UPF to the UPF+PGW-U is established on the v-UPF for the PDU session, and N3 uplink tunnel information on the v-UPF is allocated.

S1213. The v-SMF adds the N3 uplink tunnel information on the v-UPF to the N2 session request received in S1211.

S1214. The v-SMF sends a session establishment response to the AMF, and sends an N2 session request to the AMF. Correspondingly, the AMF receives the session establishment response and the N2 session request from the v-SMF.

Optionally, after S1214, the AMF may indicate the target base station to prepare for handing over the terminal from the second network to the first network, for example, indicate the target base station to allocate a radio resource, and allocate tunnel information of the base station (such as a downlink tunnel of the base station) to a to-be-switched session.

S1215. After UE accesses the target access network (such as the gNB in FIG. 12A, FIG. 12B, and FIG. 12C), the target access network sends a handover notification message to the AMF. Correspondingly, the AMF receives the handover notification message from the target access network.

S1216. The AMF sends a session update request to the v-SMF, where the session update request carries received downlink tunnel information of the access network. Correspondingly, the v-SMF receives the session update request from the AMF.

Optionally, the message carries handover complete indication information, and the v-SMF may determine, based on the indication, that handover is completed.

S1217. The v-SMF sends an N4 session update request to the v-UPF, where the N4 session update request carries the downlink tunnel information of the target access network. Correspondingly, the v-UPF receives the N4 session update request from the v-SMF.

S1218. The v-SMF sends a session update request to the SMF+PGW-C, where the session update request carries downlink tunnel information of the v-UPF. Correspondingly, the SMF+PGW-C receives the session update request from the v-SMF.

Optionally, the session update request further carries handover complete indication information, where the handover complete indication information is used to indicate that handover has been completed.

S1219. The SMF+PGW-C sends an N4 session update request to the UPF+PGW-U, where the N4 session update request carries a downlink data transmission rule and the downlink tunnel information of the v-UPF, the downlink data transmission rule is used to indicate to send, through the user plane tunnel corresponding to the PDU session, a downlink data packet received by a user plane function network element corresponding to the PDN connection.

S1220. The SMF+PGW-C sends a session update response to the v-SMF. Correspondingly, the v-SMF receives the session update response from the SMF+PGW-C.

S1221. The v-SMF sends the session update response to the AMF. Correspondingly, the AMF receives the session update response from the v-SMF.

In a possible implementation, the N4 session update request in S1219 may not carry the downlink data transmission rule, the downlink data transmission rule may be carried in the N4 session establishment/modification request in S1204a or S1203b, and the N4 session establishment/modification request further carries first indication information, where the first indication information is used to indicate not to enable the downlink data transmission rule.

Correspondingly, the third session management request in S1219 may carry second indication information, where the second indication information is used to indicate to enable the downlink data packet transmission rule. Additionally, the UPF+PGW-U enables the downlink data packet transmission rule according to the second indication information.

Optionally, the SMF+PGW-C may determine, based on the handover complete indication information in S1218, that handover is completed, in order to indicate the PGW-U+UPF to enable downlink forwarding, or send the downlink data transmission rule to the PGW-U+UPF, in order to enable downlink forwarding.

The foregoing describes, with reference to FIG. 3 to FIG. 12C, the handover methods provided in the embodiments of this application, and the following describes, with reference to FIG. 13 to FIG. 18, handover apparatuses provided in embodiments of this application.

Figure 13:
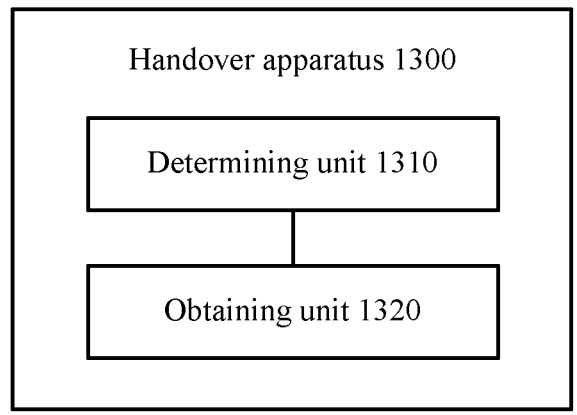
FIG. 13 is a schematic block diagram of a handover apparatus according to an embodiment of this application.

FIG. 13 is a schematic block diagram of a handover apparatus 1300 according to an embodiment of this application. The handover apparatus 1300 includes a determining unit 1310 and an obtaining unit 1320.

The determining unit 1310 is configured to determine at least one bearer that needs to be established when a protocol data unit (PDU) session of a terminal in a first network is to be switched to a packet data network (PDN) connection in a second network.

The obtaining unit 1320 is configured to obtain tunnel information of the PDN connection, where the tunnel information of the PDN connection includes user plane tunnel information corresponding to each of the at least one bearer.

Optionally, the obtaining unit 1320 is configured to: allocate the corresponding user plane tunnel information to each of the at least one bearer; or request a user plane function network element corresponding to the PDU session to allocate the user plane tunnel information corresponding to each bearer; and obtain the user plane tunnel information corresponding to each bearer from the user plane function network element corresponding to the PDU session.

Optionally, the tunnel information of the PDN connection further includes control plane tunnel information corresponding to the PDN connection, and the obtaining unit 1320 is further configured to obtain the control plane tunnel information corresponding to the PDN connection.

Optionally, the apparatus 1300 further includes a first sending unit configured to send a first session management request to the user plane function network element corresponding to the PDU session, where the first session management request is used to request to establish or modify a user plane tunnel corresponding to each of the at least one bearer, the first session management request carries an uplink data transmission rule, and the uplink data transmission rule is used to indicate the user plane function network element corresponding to the PDU session how to forward uplink data that is received through the user plane tunnel corresponding to the PDN connection.

Optionally, the obtaining unit 1320 is further configured to obtain a bearer identifier corresponding to each of the at least one bearer.

Optionally, the obtaining unit 1320 is configured to: send a bearer identifier request to a mobility management network element using a second control plane function network element, where the bearer identifier request is used to request to allocate a bearer identifier to each of the at least one bearer, the second control plane function network element is a visited control plane network element corresponding to the PDU session, and the apparatus is a home control plane network element corresponding to the PDU session; and receive the bearer identifier corresponding to each of the at least one bearer from the mobility management network element using the second control plane function network element.

Optionally, the apparatus 1300 further includes a second sending unit configured to send the tunnel information of the PDN connection and the bearer identifier corresponding to each of the at least one bearer to the second control plane function network element.

Optionally, the apparatus 1300 further includes a third sending unit configured to send the tunnel information of the PDN connection to a second control plane function network element, where the second control plane function network element is a visited control plane network element corresponding to the PDU session, and the apparatus is a home control plane network element corresponding to the PDU session. Additionally, the obtaining unit 1320 is further configured to receive the bearer identifier corresponding to each of the at least one bearer from the second control plane function network element.

Optionally, the obtaining unit 1320 is configured to obtain the tunnel information of the PDN connection when determining that the PDU session of the terminal needs to be established in the first network or the PDU session in the first network needs to be modified.

Optionally, the apparatus 1300 further includes a fourth sending unit configured to send, to the user plane function network element corresponding to the PDU session, a downlink data transmission rule corresponding to the PDN connection, where the downlink data transmission rule is used to indicate the user plane function network element corresponding to the PDU session to forward received downlink data through a corresponding user plane tunnel.

Figure 14:
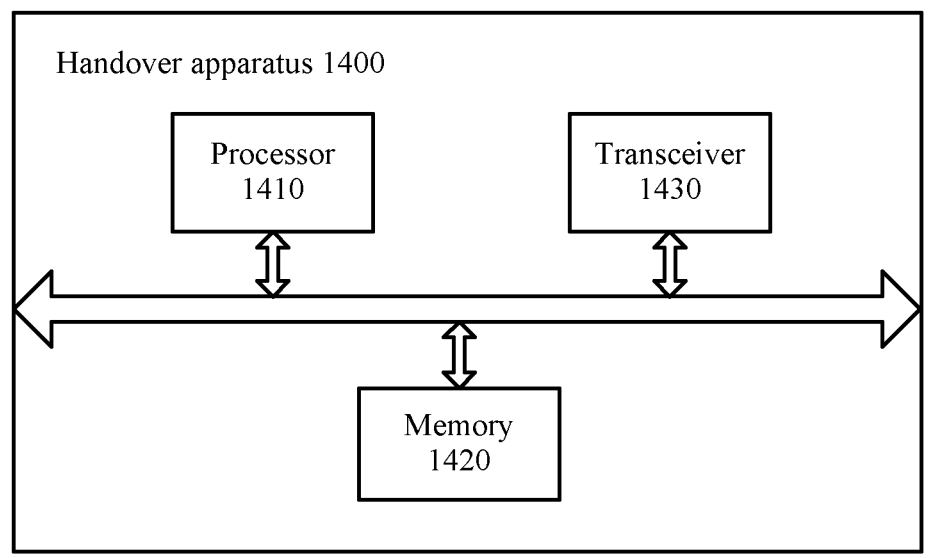
FIG. 14 is a schematic block diagram of another handover apparatus according to an embodiment of this application.

It should be noted that in this embodiment of this application, the determining unit 1310 may be implemented using a processor, and the obtaining unit 1320 may be implemented using a transceiver. As shown in FIG. 14, a handover apparatus 1400 may include a processor 1410, a memory 1420, and a transceiver 1430. The memory 1420 may be configured to store code executed by the processor 1410 and the like, and the processor 1410 may be configured to process data or a program.

In an implementation process, steps of the foregoing methods can be implemented using an integrated logic circuit of hardware in the processor 1410, or using instructions in a form of software. The steps of the methods disclosed with reference to the embodiments of this application may be directly performed by a hardware processor, or may be performed using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1420, and the processor 1410 reads information in the memory 1420 and completes the steps of the foregoing methods in combination with hardware of the processor. To avoid repetition, details are not described herein again.

The handover apparatus 1300 shown in FIG. 13 or the handover apparatus 1400 shown in FIG. 14 can implement processes corresponding to the first control plane function network element in the foregoing method embodiments. For the handover apparatus 1300 or the handover apparatus 1400, reference may be made to the foregoing description. To avoid repetition, details are not described herein again.

Figure 15:
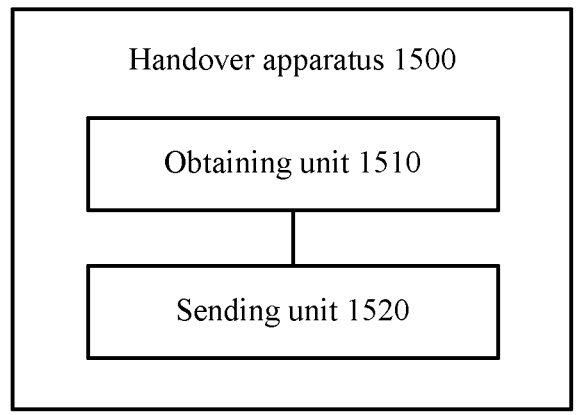
FIG. 15 is a schematic block diagram of still another handover apparatus according to an embodiment of this application.

FIG. 15 is a schematic block diagram of another handover apparatus 1500 according to an embodiment of this application. The handover apparatus includes an obtaining unit 1510 and a sending unit 1520.

The obtaining unit 1510 is configured to receive tunnel information of a PDN connection from a first control plane function network element, where the tunnel information of the PDN connection includes user plane tunnel information corresponding to each of at least one bearer, the apparatus is a visited control plane network element corresponding to the PDN connection, and the first control plane function network element is a home control plane network element corresponding to the PDN connection.

The sending unit 1520 is configured to send the tunnel information of the PDN connection to a mobility management network element.

Optionally, the tunnel information of the PDN connection further includes control plane tunnel information corresponding to the PDN connection.

Optionally, the sending unit 1520 is further configured to: forward, to the mobility management network element, a bearer identifier request that is sent by the first control plane function network element to the mobility management network element, where the bearer identifier request is used to request to allocate a bearer identifier to each of the at least one bearer; and forward, to the first control plane function network element, the bearer identifier that corresponds to each of the at least one bearer and that is sent by the mobility management network element to the first control plane function network element.

Optionally, the obtaining unit 1510 is further configured to receive the bearer identifier corresponding to each of the at least one bearer from the first control plane function network element.

Optionally, the sending unit 1520 is further configured to send a bearer identifier request to the mobility management network element based on the tunnel information of the PDN connection, where the bearer identifier request is used to request to allocate a bearer identifier to each of the at least one bearer. Additionally, the obtaining unit 1510 is further configured to receive the bearer identifier corresponding to each of the at least one bearer from the mobility management network element.

Optionally, the apparatus further includes a storage unit, where the storage unit is configured to store the bearer identifier corresponding to each of the at least one bearer. The sending unit 1520 is further configured to send the bearer identifier corresponding to each of the at least one bearer to the first control plane function network element.

Figure 16:
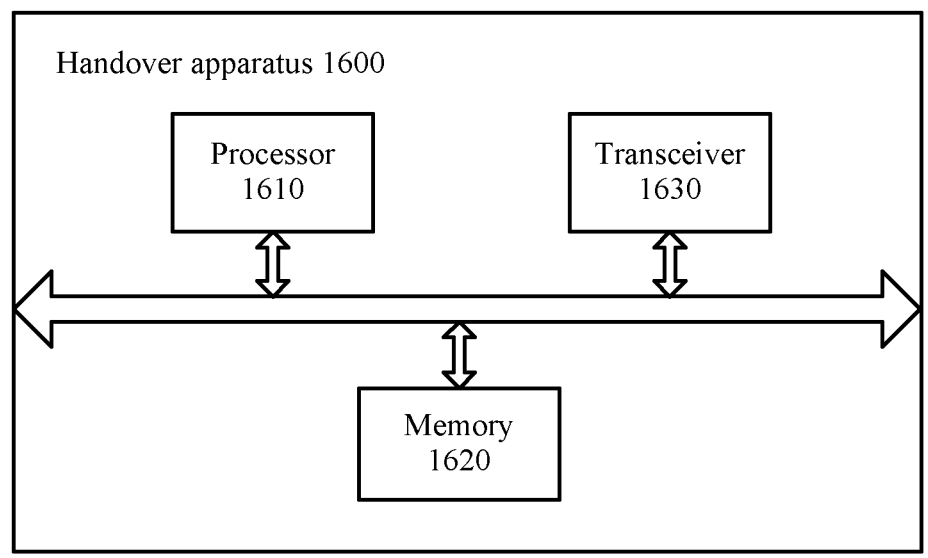
FIG. 16 is a schematic block diagram of still another handover apparatus according to an embodiment of this application.

It should be noted that in this embodiment of this application, the obtaining unit 1510 and the sending unit 1520 may be implemented using a transceiver. As shown in FIG. 16, a handover apparatus 1600 may include a processor 1610, a memory 1620, and a transceiver 1630. The memory 1620 may be configured to store code executed by the processor 1610 and the like, and the processor 1610 may be configured to process data or a program.

In an implementation process, steps of the foregoing methods can be implemented using an integrated logic circuit of hardware in the processor 1610, or using instructions in a form of software. The steps of the methods disclosed with reference to the embodiments of this application may be directly performed by a hardware processor, or may be performed using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1620, and the processor 1610 reads information in the memory 1620 and completes the steps of the foregoing methods in combination with hardware of the processor. To avoid repetition, details are not described herein again.

The handover apparatus 1500 shown in FIG. 15 or the handover apparatus 1600 shown in FIG. 16 can implement processes corresponding to the second control plane network element in the foregoing method embodiments. For the handover apparatus 1500 or the handover apparatus 1600, reference may be made to the foregoing description. To avoid repetition, details are not described herein again.

Figure 17:
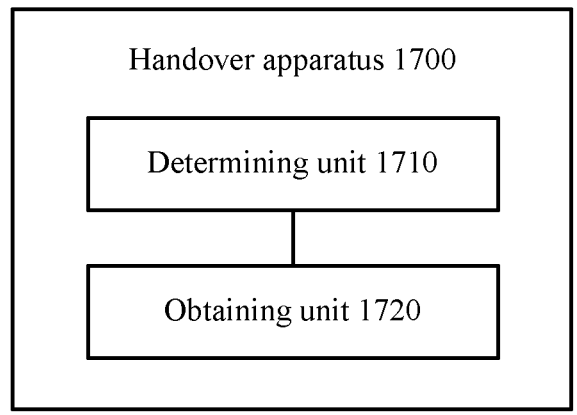
FIG. 17 is a schematic block diagram of still another handover apparatus according to an embodiment of this application.

FIG. 17 is a schematic block diagram of a handover apparatus 1700 according to an embodiment of this application. The handover apparatus 1700 includes a determining unit 1710 and an obtaining unit 1720.

The determining unit 1710 is configured to determine that a PDN connection of a terminal in a second network needs to be switched to a PDU session in a first network.

The obtaining unit 1720 is configured to obtain user plane tunnel information corresponding to the PDU session.

Optionally, the obtaining unit 1720 is configured to: allocate, to the PDU session, the user plane tunnel information corresponding to the PDU session; or request a user plane function network element corresponding to the PDN connection to allocate user plane tunnel information corresponding to the PDU session, and obtain the user plane tunnel information that corresponds to the PDU session from the user plane function network element corresponding to the PDN connection.

Optionally, the apparatus 1700 further includes a first sending unit configured to send a first session management request to the user plane function network element corresponding to the PDN connection, where the first session management request is used to request to establish or modify a user plane tunnel corresponding to the PDU session, the first session management request carries an uplink data transmission rule, and the uplink data transmission rule is used to indicate the user plane function network element corresponding to the PDN connection how to forward uplink data that is received through the user plane tunnel corresponding to the PDU session.

Optionally, the first sending unit is further configured such that when determining that the uplink data transmission rule changes, the first sending unit sends an updated uplink data transmission rule to the user plane function network element corresponding to the PDN connection.

Optionally, the obtaining unit 1720 is further configured to receive a second session management request, where the second session management request carries first indication information, and the first indication information is used to indicate to prepare for handing over the terminal from the second network to the first network.

Optionally, the apparatus 1700 further includes a second sending unit configured to send, to the user plane function network element corresponding to the PDN connection, a downlink data transmission rule corresponding to the PDU session, where the downlink data transmission rule is used to indicate to send, through the user plane tunnel corresponding to the PDU session, a downlink data packet received by the user plane function network element corresponding to the PDN connection.

Figure 18:
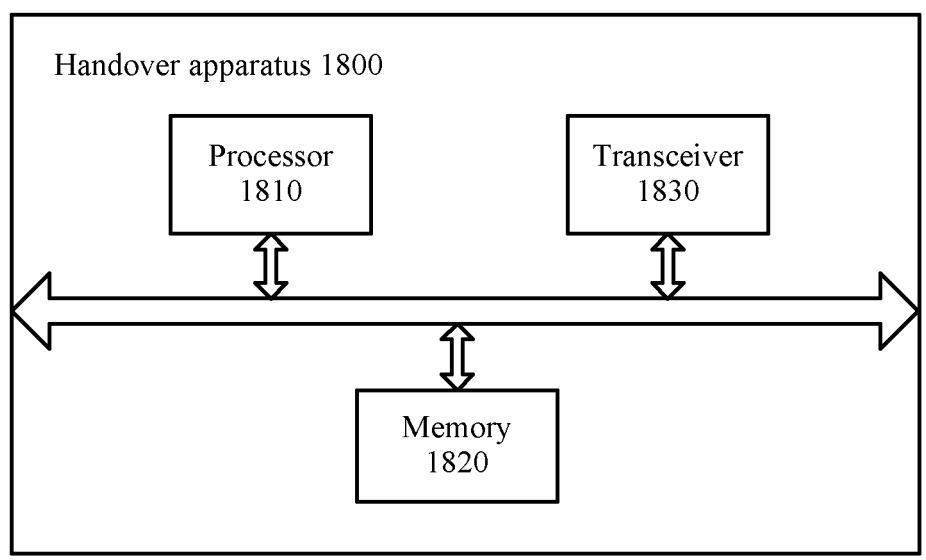
FIG. 18 is a schematic block diagram of still another handover apparatus according to an embodiment of this application.

It should be noted that in this embodiment of this application, the determining unit 1710 may be implemented using a processor, and the obtaining unit 1720 may be implemented using a transceiver. As shown in FIG. 18, a communications apparatus 1800 may include a processor 1810, a memory 1820, and a transceiver 1830. The memory 1820 may be configured to store code executed by the processor 1810 and the like, and the processor 1810 may be configured to process data or a program.

In an implementation process, steps of the foregoing methods can be implemented using an integrated logic circuit of hardware in the processor 1810, or using instructions in a form of software. The steps of the methods disclosed with reference to the embodiments of this application may be directly performed by a hardware processor, or may be performed using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1820, and the processor 1810 reads information in the memory 1820 and completes the steps of the foregoing methods in combination with hardware of the processor. To avoid repetition, details are not described herein again.

The handover apparatus 1700 shown in FIG. 17 or the handover apparatus 1800 shown in FIG. 18 can implement processes corresponding to the first control plane function network element in the foregoing method embodiments. For the handover apparatus 1700 or the handover apparatus 1800, reference may be made to the foregoing description. To avoid repetition, details are not described herein again.

An embodiment of this application further provides a computer readable medium, configured to store a computer program. The computer program includes an instruction used to perform the method corresponding to the first control plane function network element or the second control plane function network element in the foregoing method embodiments.

An embodiment of this application further provides a computer program product. The computer program product includes computer program code. When the computer program code is executed by a communications unit and a processing unit or a transceiver and a processor of a communications device (such as a terminal device or a network device), the communications device is enabled to perform the method corresponding to the first control plane function network element or the second control plane function network element in any one of the foregoing method embodiments.

An embodiment of this application further provides a communications chip, where the communications chip stores an instruction. When the instruction runs on a communications apparatus, the communications chip is enabled to perform the method corresponding to the first control plane function network element or the second control plane function network element in the foregoing method embodiments.

The embodiments in this application may be separately or jointly used. This is not limited herein.

It should be understood that, descriptions such as "first" and "second" in the embodiments of this application are only used as examples and used to distinguish between objects, but do not indicate a sequence or indicate a specific limitation on a quantity of devices in the embodiments of this application, and cannot constitute any limitation on the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A control plane function network element, comprising:
a memory configured to store program instructions; and
a processor coupled to the memory and configured to execute the program instructions, such that during an establishment or a modification of a protocol data unit (PDU) session of a terminal in a first network, the program instructions cause the control plane function network element to:
send a bearer identifier request to a mobility management network element to request to allocate a bearer identifier for the PDU session;
receive a bearer identifier allocated to each bearer of at least one bearer from the mobility management network element, wherein the at least one bearer is included in a packet data network (PDN) connection in a second network that corresponds to the PDU session in the first network; and
obtain tunnel information of the PDN connection, wherein the tunnel information comprises user plane tunnel information corresponding to each bearer of the at least one bearer.

2. The control plane function network element of claim 1, wherein the processor is configured to execute the program instructions to further cause the control plane function network element to determine that the PDU session supports interworking of the first network and the second network.

3. The control plane function network element of claim 1, wherein the processor is configured to execute the program instructions to further cause the control plane function network element to allocate the user plane tunnel information to each bearer of the at least one bearer.

4. The control plane function network element of claim 1, wherein the processor is configured to execute the program instructions to further cause the control plane function network element to:
request a user plane function network element corresponding to the PDU session to allocate the user plane tunnel information to each bearer of the at least one bearer; and
obtain the user plane tunnel information from the user plane function network element.

5. The control plane function network element of claim 1, wherein the processor is configured to execute the program instructions to further cause the control plane function network element to:
send, via a second control plane function network element, the bearer identifier request to the mobility management network element; and
receive, via the second control plane function network element, the bearer identifier,
wherein the control plane function network element is a home control plane network element of the terminal, and wherein the second control plane function network element is a visited control plane network element of the terminal.

6. The control plane function network element of claim 1, wherein the processor is configured to execute the program instructions to further cause the control plane function network element to store the tunnel information and the bearer identifier into a bearer context corresponding to the PDN connection.

7. The control plane function network element of claim 1, wherein the processor is configured to execute the program instructions to further cause the control plane function network element to send the tunnel information and the bearer identifier to a second control plane function network element, wherein the control plane function network element is a home control plane network element of the terminal, and wherein the second control plane function network element is a visited control plane network element of the terminal.

8. The control plane function network element of claim 1, wherein the processor is configured to execute the program instructions to further cause the control plane function network element to send a session management request to a user plane function network element corresponding to the PDU session, wherein the session management request comprises an uplink data transmission rule, and wherein the uplink data transmission rule indicates to the user plane function network element how to forward uplink data received through a user plane tunnel corresponding to each bearer of the at least one bearer.

9. The control plane function network element of claim 1, wherein the tunnel information further comprises control plane tunnel information corresponding to the PDN connection.

10. A method in a communications system, the method comprising:
during an establishment or a modification of a protocol data unit (PDU) session of a terminal in a first network:
sending, by a first control plane function network element, a bearer identifier request to a mobility management network element to request to allocate a bearer identifier for the PDU session;
receiving, by the first control plane function network element, a bearer identifier allocated to each bearer of at least one bearer from the mobility management network element, wherein the at least one bearer is included in a packet data network (PDN) connection in a second network that corresponds to the PDU session in the first network; and
obtaining, by the first control plane function network element, tunnel information of the PDN connection, wherein the tunnel information comprises user plane tunnel information corresponding to each bearer of the at least one bearer.

11. The method of claim 10, further comprising determining, by the first control plane function network element, that the PDU session supports interworking of the first network and the second network.

12. The method of claim 10, further comprising allocating, by the first control plane function network element, the user plane tunnel information to each bearer of the at least one bearer.

13. The method of claim 10, further comprising:
requesting, by the first control plane function network element, a user plane function network element corresponding to the PDU session to allocate the user plane tunnel information to each bearer of the at least one bearer; and
receiving, by the first control plane function network element, the user plane tunnel information from the user plane function network element.

14. The method of claim 10, further comprising:
sending, by the first control plane function network element via a second control plane function network element, the bearer identifier request to the mobility management network element; and
receiving, by the first control plane function network element via the second control plane function network element, the bearer identifier, wherein the control plane function network element is a home control plane network element of the terminal, and wherein the second control plane function network element is a visited control plane network element of the terminal.

15. The method of claim 10, further comprising storing, by the first control plane function network element, the tunnel information and the bearer identifier into a bearer context corresponding to the PDN connection.

16. The method of claim 10, further comprising sending, by the first control plane function network element, the tunnel information and the bearer identifier to a second control plane function network element, wherein the first control plane function network element is a home control plane network element of the terminal, and wherein the second control plane function network element is a visited control plane network element of the terminal.

17. The method of claim 10, further comprising sending, by the first control plane function network element, a session management request to a user plane function network element corresponding to the PDU session, wherein the session management request comprises an uplink data transmission rule, and wherein the uplink data transmission rule indicates to the user plane function network element how to forward uplink data that is received through a user plane tunnel corresponding to each bearer of the at least one bearer.

18. The method of claim 10, wherein the tunnel information compri further comprises control plane tunnel information corresponding to the PDN connection.

19. A non-transitory computer readable storage medium comprising instructions, which when run on an apparatus, cause the apparatus to perform the following during an establishment or a modification of a protocol data unit (PDU) session of a terminal in a first network:
send a bearer identifier request to a mobility management network element to request to allocate a bearer identifier for the PDU session;
receive a bearer identifier allocated to each bearer of at least one bearer from the mobility management network element, wherein the at least one bearer is included in a packet data network (PDN) connection in a second network that corresponds to the PDU session in the first network; and obtain tunnel information of the PDN connection,
wherein the tunnel information comprises user plane tunnel information corresponding to each bearer of the at least one bearer.

20. The non-transitory computer readable storage medium of claim 19, wherein the tunnel information further comprises control plane tunnel information corresponding to the PDN connection.

* * * * *

UNITED STATES PATENT AND TRADEMARK OFFICE
CERTIFICATE OF CORRECTION

PATENT NO. : 11,930,406 B2
APPLICATION NO. : 17/584993
DATED : March 12, 2024
INVENTOR(S) : Zaifeng Zong and Fenqin Zhu It is certified that error appears in the above-identified patent and that said Letters Patent is hereby corrected as shown below:

In the Claims

Claim 18, Column 58, Line 52: "compri further comprises" should read "further comprises"

Signed and Sealed this
Thirtieth Day of April, 2024

Katherine Kelly Vidal
*Director of the United States Patent and Trademark Office*